US012748451B2

(12) United States Patent
Forbes, Jr.

(10) Patent No.: US 12,748,451 B2
(45) **Date of Patent: *Sep. 29, 2026**

(54) SYSTEM AND METHODS FOR ACTIVELY MANAGING ELECTRIC POWER OVER AN ELECTRIC POWER GRID

(71) Applicant: Causam Enterprises, Inc., Raleigh, NC (US)

(72) Inventor: Joseph W. Forbes, Jr., Raleigh, NC (US)

(73) Assignee: Causam Enterprises, Inc., Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/391,425

(22) Filed: Nov. 17, 2025

(65) Prior Publication Data

US 2026/0072462 A1 Mar. 12, 2026

Related U.S. Application Data

(63) Continuation of application No. 19/024,448, filed on Jan. 16, 2025, now Pat. No. 12,517,539, which is a (Continued)

(51) Int. Cl.
*G05F 1/66* (2006.01)
*G06F 1/26* (2006.01)

(Continued)

(52) U.S. Cl.
CPC ................ *G05F 1/66* (2013.01); *G06F 1/266* (2013.01); *H02J 3/14* (2013.01); *H02J 3/38* (2013.01);

(Continued)

(58) Field of Classification Search
CPC .... G05F 1/66; G06F 1/266; H02J 3/14; H02J 3/38; H02J 3/388; H02J 3/466; H02J 3/48;

(Continued)

(56) References Cited

U.S. PATENT DOCUMENTS

| | | | |
|---|---|---|---|
| 3,906,242 | A | 9/1975 | Stevenson |
| 4,023,043 | A | 5/1977 | Stevenson |

(Continued)

FOREIGN PATENT DOCUMENTS

| | | | |
|---|---|---|---|
| AU | 2003218484 | A1 | 10/2003 |
| CA | 2904829 | C | 12/2017 |

(Continued)

OTHER PUBLICATIONS

B.J. Kirby, Spinning Reserve from Responsive Loads, Oak Ridge National Laboratory, United States Dept. of Energy, Mar. 2003 (54 pages).

(Continued)

*Primary Examiner* — Yuhui R Pan
(74) *Attorney, Agent, or Firm* — Neo IP

(57) ABSTRACT

Systems and methods for managing power on an electric power grid including a server for communicating IP-based messages over a network with distributed power consuming devices and/or power supplying devices, the IP-based messages including information including a change in state of the power consuming device(s), a directive for a change in state of the power consuming device(s), a priority message, an alert, a status, an update, a location with respect to the electric power grid, a function, device attributes, and combinations thereof.

20 Claims, 40 Drawing Sheets

Related U.S. Application Data continuation of application No. 18/887,766, filed on Sep. 17, 2024, now Pat. No. 12,210,367, which is a continuation of application No. 17/077,517, filed on Oct. 22, 2020, now Pat. No. 12,124,285, which is a continuation of application No. 16/751,719, filed on Jan. 24, 2020, now Pat. No. 11,228,184, which is a continuation of application No. 15/288,246, filed on Oct. 7, 2016, now Pat. No. 10,547,178, which is a continuation of application No. 13/839,610, filed on Mar. 15, 2013, now Pat. No. 9,465,398, which is a continuation-in-part of application No. 13/528,596, filed on Jun. 20, 2012, now Pat. No. 9,207,698.

(51) Int. Cl.

| | |
|---|---|
| ***H02J 3/14*** | (2026.01) |
| ***H02J 3/38*** | (2026.01) |
| ***H02J 3/388*** | (2026.01) |
| ***H02J 3/466*** | (2026.01) |
| ***H02J 3/48*** | (2026.01) |
| ***H04L 41/50*** | (2022.01) |
| *H02J 3/32* | (2026.01) |

(52) U.S. Cl.

CPC .............. *H02J 3/388* (2020.01); *H02J 3/466* (2020.01); *H02J 3/48* (2013.01); *H04L 41/50* (2013.01); *H02J 3/32* (2013.01); *Y02B 70/3225* (2013.01); *Y02P 90/84* (2015.11); *Y02P 90/845* (2015.11); *Y04S 20/222* (2013.01)

(58) Field of Classification Search

CPC ........ H02J 3/32; H04L 41/50; Y02B 70/3225; Y02P 90/84; Y02P 90/845; Y04S 20/222

See application file for complete search history.

(56) References Cited

U.S. PATENT DOCUMENTS

| | | | |
|---|---|---|---|
| 4,589,075 | A | 5/1986 | Buennagel |
| 4,799,059 | A | 1/1989 | Grindahl et al. |
| 4,819,180 | A | 4/1989 | Hedman et al. |
| 4,819,229 | A | 4/1989 | Pritty et al. |
| 5,237,507 | A | 8/1993 | Chasek |
| 5,361,982 | A | 11/1994 | Liebl et al. |
| 5,388,101 | A | 2/1995 | Dinkins |
| 5,481,546 | A | 1/1996 | Dinkins |
| 5,502,339 | A | 3/1996 | Hartig |
| 5,544,036 | A | 8/1996 | Brown et al. |
| 5,570,002 | A | 10/1996 | Castleman |
| 5,592,491 | A | 1/1997 | Dinkins |
| 5,640,153 | A | 6/1997 | Hildebrand et al. |
| 5,644,173 | A | 7/1997 | Elliason et al. |
| 5,675,503 | A | 10/1997 | Moe et al. |
| 5,696,695 | A | 12/1997 | Ehlers et al. |
| 5,721,936 | A | 2/1998 | Kikinis et al. |
| 5,926,776 | A | 7/1999 | Glorioso et al. |
| 5,973,481 | A | 10/1999 | Thompson et al. |
| 6,018,690 | A | 1/2000 | Saito et al. |
| 6,078,785 | A | 6/2000 | Bush |
| 6,102,487 | A | 8/2000 | Oevreboe |
| 6,107,693 | A | 8/2000 | Mongia et al. |
| 6,115,676 | A | 9/2000 | Rector et al. |
| 6,154,859 | A | 11/2000 | Norizuki et al. |
| 6,216,956 | B1 | 4/2001 | Ehlers et al. |
| 6,233,327 | B1 | 5/2001 | Petite |
| 6,254,009 | B1 | 7/2001 | Proffitt et al. |
| 6,304,552 | B1 | 10/2001 | Chapman et al. |
| 6,366,217 | B1 | 4/2002 | Cunningham et al. |
| 6,374,101 | B1 | 4/2002 | Gelbien |
| 6,437,692 | B1 | 8/2002 | Petite et al. |
| 6,519,509 | B1 | 2/2003 | Nierlich et al. |
| 6,535,797 | B1 | 3/2003 | Bowles et al. |
| 6,577,962 | B1 | 6/2003 | Afshari |
| 6,583,521 | B1 | 6/2003 | Lagod et al. |
| 6,601,033 | B1 | 7/2003 | Sowinski |
| 6,621,179 | B1 | 9/2003 | Howard |
| 6,622,097 | B2 | 9/2003 | Hunter |
| 6,622,925 | B2 | 9/2003 | Carner et al. |
| 6,633,823 | B2 | 10/2003 | Bartone et al. |
| 6,636,977 | B1 | 10/2003 | Chen |
| 6,671,586 | B2 | 12/2003 | Davis et al. |
| 6,681,154 | B2 | 1/2004 | Nierlich et al. |
| 6,687,574 | B2 | 2/2004 | Pietrowicz et al. |
| 6,732,055 | B2 | 5/2004 | Bagepalli et al. |
| 6,747,368 | B2 | 6/2004 | Jarrett, Jr. |
| 6,778,882 | B2 | 8/2004 | Spool et al. |
| 6,784,807 | B2 | 8/2004 | Petite et al. |
| 6,832,135 | B2 | 12/2004 | Ying |
| 6,834,811 | B1 | 12/2004 | Huberman et al. |
| 6,836,737 | B2 | 12/2004 | Petite et al. |
| 6,862,498 | B2 | 3/2005 | Davis et al. |
| 6,865,450 | B2 | 3/2005 | Masticola et al. |
| 6,868,293 | B1 | 3/2005 | Schurr et al. |
| 6,879,059 | B2 | 4/2005 | Sleva |
| 6,891,838 | B1 | 5/2005 | Petite et al. |
| 6,904,336 | B2 | 6/2005 | Raines et al. |
| 6,906,617 | B1 | 6/2005 | Van der Meulen |
| 6,909,942 | B2 | 6/2005 | Andarawis et al. |
| 6,914,533 | B2 | 7/2005 | Petite |
| 6,914,893 | B2 | 7/2005 | Petite |
| 6,934,316 | B2 | 8/2005 | Cornwall et al. |
| 6,961,641 | B1 | 11/2005 | Forth et al. |
| 6,990,593 | B2 | 1/2006 | Nakagawa |
| 7,003,640 | B2 | 2/2006 | Mayo et al. |
| 7,019,667 | B2 | 3/2006 | Petite et al. |
| 7,035,719 | B2 | 4/2006 | Howard et al. |
| 7,039,532 | B2 | 5/2006 | Hunter |
| 7,053,767 | B2 | 5/2006 | Petite et al. |
| 7,088,014 | B2 | 8/2006 | Nierlich et al. |
| 7,103,511 | B2 | 9/2006 | Petite |
| 7,123,994 | B2 | 10/2006 | Weik et al. |
| 7,133,750 | B2 | 11/2006 | Raines et al. |
| 7,141,321 | B2 | 11/2006 | McArthur et al. |
| 7,142,949 | B2 | 11/2006 | Brewster et al. |
| 7,177,728 | B2 | 2/2007 | Gardner |
| 7,181,320 | B2 | 2/2007 | Whiffen et al. |
| 7,184,861 | B2 | 2/2007 | Petite |
| 7,200,134 | B2 | 4/2007 | Proctor et al. |
| 7,206,670 | B2 | 4/2007 | Pimputkar et al. |
| 7,209,804 | B2 | 4/2007 | Curt et al. |
| 7,209,840 | B2 | 4/2007 | Petite et al. |
| 7,233,843 | B2 | 6/2007 | Budhraja et al. |
| 7,263,073 | B2 | 8/2007 | Petite et al. |
| 7,274,975 | B2 | 9/2007 | Miller |
| 7,289,887 | B2 | 10/2007 | Rodgers |
| 7,295,128 | B2 | 11/2007 | Petite |
| 7,305,282 | B2 | 12/2007 | Chen |
| 7,313,465 | B1 | 12/2007 | O'Donnell |
| 7,343,341 | B2 | 3/2008 | Sandor et al. |
| 7,345,998 | B2 | 3/2008 | Cregg et al. |
| 7,346,463 | B2 | 3/2008 | Petite et al. |
| 7,366,164 | B1 | 4/2008 | Habib et al. |
| 7,379,981 | B2 | 5/2008 | Elliott et al. |
| 7,397,907 | B2 | 7/2008 | Petite |
| 7,406,364 | B2 | 7/2008 | Rissanen et al. |
| 7,412,304 | B2 | 8/2008 | Uenou |
| 7,424,527 | B2 | 9/2008 | Petite |
| 7,430,459 | B1 | 9/2008 | Papalia et al. |
| 7,440,871 | B2 | 10/2008 | McConnell et al. |
| 7,451,019 | B2 | 11/2008 | Rodgers |
| 7,468,661 | B2 | 12/2008 | Petite et al. |
| 7,480,501 | B2 | 1/2009 | Petite |
| 7,486,681 | B2 | 2/2009 | Weber |
| 7,528,503 | B2 | 5/2009 | Rognli et al. |
| 7,536,240 | B2 | 5/2009 | McIntyre et al. |
| 7,541,941 | B2 | 6/2009 | Bogolea et al. |
| 7,565,227 | B2 | 7/2009 | Richard et al. |
| 7,650,425 | B2 | 1/2010 | Davis et al. |
| 7,697,492 | B2 | 4/2010 | Petite |
| 7,711,796 | B2 | 5/2010 | Gutt et al. |

(56) References Cited

U.S. PATENT DOCUMENTS 7,715,951 B2 5/2010 Forbes et al.
7,734,380 B2 6/2010 Ransom et al.
7,738,999 B2 6/2010 Petite
7,739,378 B2 6/2010 Petite
8,010,812 B2 8/2011 Forbes et al.
8,032,233 B2 10/2011 Forbes et al.
8,095,233 B1 1/2012 Shankar et al.
8,145,361 B2 3/2012 Forbes et al.
8,260,470 B2 9/2012 Forbes et al.
8,307,225 B2 11/2012 Forbes et al.
8,315,717 B2 11/2012 Forbes et al.
8,359,124 B2 1/2013 Zhou et al.
8,364,609 B2 1/2013 Ozog
8,417,569 B2 4/2013 Gross
8,457,802 B1 6/2013 Steven et al.
8,473,111 B1 6/2013 Shankar et al.
8,570,999 B1 10/2013 Nguyen et al.
8,571,930 B1 10/2013 Galperin
8,583,520 B1 11/2013 Forbes
8,588,991 B1 11/2013 Forbes
8,738,327 B2 5/2014 Steinberg et al.
8,751,036 B2 6/2014 Thomas et al.
8,855,829 B2 10/2014 Golden et al.
9,207,698 B2 12/2015 Forbes, Jr.
9,282,114 B1 3/2016 Dotan et al.
2001/0030468 A1 10/2001 Anderson et al.
2001/0038343 A1 11/2001 Meyer et al.
2002/0019758 A1 2/2002 Scarpelli
2002/0019802 A1 2/2002 Malme et al.
2002/0035496 A1 3/2002 Fukushima et al.
2002/0036430 A1 3/2002 Welches et al.
2002/0109607 A1 8/2002 Cumeralto et al.
2002/0138176 A1 9/2002 Davis et al.
2002/0143693 A1 10/2002 Soestbergen et al.
2002/0161648 A1 10/2002 Mason et al.
2002/0198629 A1 12/2002 Ellis
2003/0009705 A1 1/2003 Thelander et al.
2003/0036820 A1 2/2003 Yellepeddy et al.
2003/0050737 A1 3/2003 Osann
2003/0083980 A1 5/2003 Satake
2003/0144864 A1 7/2003 Mazzarella
2003/0149937 A1 8/2003 McElfresh et al.
2003/0171851 A1 9/2003 Brickfield et al.
2003/0176952 A1 9/2003 Collins
2003/0225483 A1 12/2003 Santinato et al.
2003/0229572 A1 12/2003 Raines et al.
2003/0233201 A1 12/2003 Horst et al.
2004/0006439 A1 1/2004 Hunter
2004/0024483 A1 2/2004 Holcombe
2004/0044571 A1 3/2004 Bronnimann et al.
2004/0088083 A1 5/2004 Davis et al.
2004/0095237 A1 5/2004 Chen et al.
2004/0107025 A1 6/2004 Ransom et al.
2004/0117330 A1 6/2004 Ehlers et al.
2004/0128266 A1 7/2004 Yellepeddy et al.
2004/0153170 A1 8/2004 Santacatterina et al.
2004/0158478 A1 8/2004 Zimmerman
2004/0162793 A1 8/2004 Scott et al.
2004/0193329 A1 9/2004 Ransom et al.
2004/0225514 A1 11/2004 Greenshields et al.
2004/0230533 A1 11/2004 Benco
2004/0249775 A1 12/2004 Chen
2005/0004858 A1 1/2005 Foster et al.
2005/0021397 A1 1/2005 Cui et al.
2005/0033481 A1 2/2005 Budhraja et al.
2005/0043860 A1 2/2005 Petite
2005/0055432 A1 3/2005 Rodgers
2005/0065742 A1 3/2005 Rodgers
2005/0080772 A1 4/2005 Bem
2005/0096856 A1 5/2005 Lubkeman et al.
2005/0096857 A1 5/2005 Hunter
2005/0096979 A1 5/2005 Koningstein
2005/0097204 A1 5/2005 Horowitz et al.
2005/0125243 A1 6/2005 Villalobos
2005/0127680 A1 6/2005 Lof et al.
2005/0132115 A1 6/2005 Leach
2005/0137959 A1 6/2005 Yan et al.
2005/0138432 A1 6/2005 Ransom et al.
2005/0192711 A1 9/2005 Raines et al.
2005/0192713 A1 9/2005 Weik et al.
2005/0216302 A1 9/2005 Raji et al.
2005/0216580 A1 9/2005 Raji et al.
2005/0234600 A1 10/2005 Boucher et al.
2005/0240314 A1 10/2005 Martinez
2005/0240315 A1 10/2005 Booth et al.
2005/0246190 A1 11/2005 Sandor et al.
2005/0267642 A1 12/2005 Whiffen et al.
2005/0276222 A1 12/2005 Kumar et al.
2005/0288954 A1 12/2005 McCarthy et al.
2006/0020544 A1 1/2006 Kaveski
2006/0020596 A1 1/2006 Liu et al.
2006/0022841 A1 2/2006 Hoiness et al.
2006/0025891 A1 2/2006 Budike
2006/0031934 A1 2/2006 Kriegel
2006/0047369 A1 3/2006 Brewster et al.
2006/0064205 A1 3/2006 Ying
2006/0069616 A1 3/2006 Bau
2006/0106635 A1 5/2006 Ulrich et al.
2006/0142900 A1 6/2006 Rothman et al.
2006/0142961 A1 6/2006 Johnson et al.
2006/0161450 A1 7/2006 Carey et al.
2006/0168191 A1 7/2006 Ives
2006/0190354 A1 8/2006 Meisel et al.
2006/0195334 A1 8/2006 Reeb et al.
2006/0212350 A1 9/2006 Ellis et al.
2006/0224615 A1 10/2006 Korn et al.
2006/0271244 A1 11/2006 Cumming et al.
2006/0271314 A1 11/2006 Hayes
2006/0276938 A1 12/2006 Miller
2006/0282328 A1 12/2006 Gerace et al.
2007/0021874 A1 1/2007 Rognli et al.
2007/0038563 A1 2/2007 Ryzerski
2007/0043478 A1 2/2007 Ehlers et al.
2007/0058453 A1 3/2007 Shaffer et al.
2007/0058629 A1 3/2007 Luft
2007/0070895 A1 3/2007 Narvaez
2007/0085702 A1 4/2007 Walters et al.
2007/0091900 A1 4/2007 Asthana et al.
2007/0100503 A1 5/2007 Balan et al.
2007/0100961 A1 5/2007 Moore
2007/0150353 A1 6/2007 Krassner et al.
2007/0156621 A1 7/2007 Wright et al.
2007/0156887 A1 7/2007 Wright et al.
2007/0174114 A1 7/2007 Bigby et al.
2007/0177319 A1 8/2007 Hirst
2007/0192333 A1 8/2007 Ali
2007/0203722 A1 8/2007 Richards et al.
2007/0204176 A1 8/2007 Shaffer et al.
2007/0213878 A1 9/2007 Chen
2007/0214118 A1 9/2007 Schoen et al.
2007/0214132 A1 9/2007 Grubb et al.
2007/0255457 A1 11/2007 Whitcomb et al.
2007/0260540 A1 11/2007 Chau et al.
2007/0271006 A1 11/2007 Golden et al.
2007/0286210 A1 12/2007 Gutt et al.
2007/0291644 A1 12/2007 Roberts et al.
2007/0299562 A1 12/2007 Kates
2008/0010212 A1 1/2008 Moore et al.
2008/0015976 A1 1/2008 Sandor et al.
2008/0040223 A1 2/2008 Bridges et al.
2008/0091625 A1 4/2008 Kremen
2008/0104026 A1 5/2008 Koran
2008/0109387 A1 5/2008 Deaver et al.
2008/0130673 A1 6/2008 Cregg et al.
2008/0147465 A1 6/2008 Raines et al.
2008/0154801 A1 6/2008 Fein et al.
2008/0165714 A1 7/2008 Dettinger et al.
2008/0172312 A1 7/2008 Synesiou et al.
2008/0177423 A1 7/2008 Brickfield et al.
2008/0177678 A1 7/2008 Di Martini et al.
2008/0195462 A1 8/2008 Magdon-Ismail et al.
2008/0211481 A1 9/2008 Chen
2008/0224892 A1 9/2008 Bogolea et al.
2008/0231114 A1 9/2008 Tolnar et al.

(56) References Cited

U.S. PATENT DOCUMENTS

| | | | |
|---|---|---|---|
| 2008/0238710 | A1 | 10/2008 | Tolnar et al. |
| 2008/0249832 | A1 | 10/2008 | Richardson et al. |
| 2008/0255899 | A1 | 10/2008 | McConnell et al. |
| 2008/0263025 | A1 | 10/2008 | Koran |
| 2008/0270223 | A1 | 10/2008 | Collins et al. |
| 2008/0281473 | A1 | 11/2008 | Pitt |
| 2008/0306824 | A1 | 12/2008 | Parkinson |
| 2008/0306830 | A1 | 12/2008 | Lasa et al. |
| 2008/0319893 | A1 | 12/2008 | Mashinsky et al. |
| 2009/0012996 | A1 | 1/2009 | Gupta et al. |
| 2009/0018884 | A1 | 1/2009 | McConnell et al. |
| 2009/0024718 | A1 | 1/2009 | Anagnostopoulos et al. |
| 2009/0043519 | A1 | 2/2009 | Bridges et al. |
| 2009/0043520 | A1 | 2/2009 | Pollack et al. |
| 2009/0045804 | A1 | 2/2009 | Durling et al. |
| 2009/0048718 | A1 | 2/2009 | Richard et al. |
| 2009/0049316 | A1 | 2/2009 | Khatri et al. |
| 2009/0055031 | A1 | 2/2009 | Slota et al. |
| 2009/0062970 | A1 | 3/2009 | Forbes et al. |
| 2009/0063228 | A1 | 3/2009 | Forbes, Jr. |
| 2009/0088907 | A1 | 4/2009 | Lewis et al. |
| 2009/0112701 | A1 | 4/2009 | Turpin |
| 2009/0112758 | A1 | 4/2009 | Herzig |
| 2009/0124241 | A1 | 5/2009 | Krishnaswamy et al. |
| 2009/0125462 | A1 | 5/2009 | Krishnaswamy et al. |
| 2009/0135836 | A1 | 5/2009 | Veillette |
| 2009/0138362 | A1 | 5/2009 | Schroedl et al. |
| 2009/0157529 | A1 | 6/2009 | Ehlers et al. |
| 2009/0187344 | A1 | 7/2009 | Brancaccio et al. |
| 2009/0187499 | A1 | 7/2009 | Mulder et al. |
| 2009/0195349 | A1 | 8/2009 | Frader-Thompson et al. |
| 2009/0198384 | A1 | 8/2009 | Ahn |
| 2009/0228335 | A1 | 9/2009 | Niyogi et al. |
| 2009/0240381 | A1 | 9/2009 | Lane |
| 2009/0240677 | A1 | 9/2009 | Parekh et al. |
| 2009/0281673 | A1 | 11/2009 | Taft |
| 2009/0281674 | A1 | 11/2009 | Taft |
| 2009/0319415 | A1 | 12/2009 | Stoilov et al. |
| 2009/0326726 | A1 | 12/2009 | Ippolito et al. |
| 2010/0045232 | A1 | 2/2010 | Chen et al. |
| 2010/0076835 | A1 | 3/2010 | Silverman |
| 2010/0082176 | A1 | 4/2010 | Chang |
| 2010/0106575 | A1 | 4/2010 | Bixby |
| 2010/0106641 | A1 | 4/2010 | Chassin et al. |
| 2010/0117856 | A1 | 5/2010 | Sonderegger |
| 2010/0131117 | A1 | 5/2010 | Mattiocco et al. |
| 2010/0138452 | A1 | 6/2010 | Henkin et al. |
| 2010/0145534 | A1 | 6/2010 | Forbes et al. |
| 2010/0145542 | A1 | 6/2010 | Chapel et al. |
| 2010/0145544 | A1 | 6/2010 | Forbes et al. |
| 2010/0161148 | A1 | 6/2010 | Forbes, Jr. et al. |
| 2010/0169175 | A1 | 7/2010 | Koran |
| 2010/0179670 | A1 | 7/2010 | Forbes et al. |
| 2010/0191862 | A1 | 7/2010 | Forbes et al. |
| 2010/0198713 | A1 | 8/2010 | Forbes et al. |
| 2010/0199188 | A1 | 8/2010 | Abu-Hakima et al. |
| 2010/0217452 | A1 | 8/2010 | McCord et al. |
| 2010/0217549 | A1 | 8/2010 | Galvin et al. |
| 2010/0217550 | A1 | 8/2010 | Crabtree et al. |
| 2010/0217642 | A1 | 8/2010 | Crubtree et al. |
| 2010/0217651 | A1 | 8/2010 | Crabtree et al. |
| 2010/0218108 | A1 | 8/2010 | Crabtree et al. |
| 2010/0222935 | A1 | 9/2010 | Forbes et al. |
| 2010/0232451 | A1 | 9/2010 | Groves et al. |
| 2010/0235008 | A1 | 9/2010 | Forbes, Jr. et al. |
| 2010/0256846 | A1 | 10/2010 | Shaffer |
| 2010/0262313 | A1 | 10/2010 | Chambers et al. |
| 2010/0274407 | A1 | 10/2010 | Creed |
| 2010/0293045 | A1 | 11/2010 | Burns et al. |
| 2010/0306033 | A1 | 12/2010 | Oved et al. |
| 2010/0332373 | A1 | 12/2010 | Crabtree et al. |
| 2011/0010016 | A1 | 1/2011 | Giroti |
| 2011/0025556 | A1 | 2/2011 | Bridges et al. |
| 2011/0040666 | A1 | 2/2011 | Crabtree et al. |
| 2011/0055036 | A1 | 3/2011 | Helfan |
| 2011/0060474 | A1 | 3/2011 | Schmiegel et al. |
| 2011/0080044 | A1 | 4/2011 | Schmiegel |
| 2011/0106729 | A1 | 5/2011 | Billingsley et al. |
| 2011/0115302 | A1 | 5/2011 | Slota et al. |
| 2011/0133655 | A1 | 6/2011 | Recker et al. |
| 2011/0141902 | A1 | 6/2011 | Brown et al. |
| 2011/0145061 | A1 | 6/2011 | Spurr et al. |
| 2011/0161250 | A1 | 6/2011 | Koeppel et al. |
| 2011/0172841 | A1 | 7/2011 | Forbes, Jr. |
| 2011/0185303 | A1 | 7/2011 | Katagi et al. |
| 2011/0196546 | A1 | 8/2011 | Muller et al. |
| 2011/0204717 | A1 | 8/2011 | Shaffer |
| 2011/0208366 | A1 | 8/2011 | Taft |
| 2011/0235656 | A1 | 9/2011 | Pigeon |
| 2011/0251730 | A1 | 10/2011 | Pitt |
| 2011/0257809 | A1 | 10/2011 | Forbes et al. |
| 2011/0258022 | A1 | 10/2011 | Forbes, Jr. et al. |
| 2011/0320834 | A1 | 12/2011 | Ingels et al. |
| 2012/0196482 | A1 | 8/2012 | Stokoe |
| 2012/0205977 | A1 | 8/2012 | Shin et al. |
| 2012/0221162 | A1 | 8/2012 | Forbes |
| 2012/0223840 | A1 | 9/2012 | Guymon et al. |
| 2012/0226384 | A1 | 9/2012 | Forbes |
| 2012/0232709 | A1 | 9/2012 | Robinett et al. |
| 2012/0232816 | A1 | 9/2012 | Oh et al. |
| 2012/0239218 | A1 | 9/2012 | Forbes |
| 2012/0259760 | A1 | 10/2012 | Sgouridis et al. |
| 2012/0271686 | A1 | 10/2012 | Silverman |
| 2012/0296479 | A1 | 11/2012 | Millar et al. |
| 2012/0296799 | A1 | 11/2012 | Playfair et al. |
| 2012/0316697 | A1 | 12/2012 | Boardman et al. |
| 2012/0324119 | A1 | 12/2012 | Imes et al. |
| 2013/0035802 | A1 | 2/2013 | Khaitan et al. |
| 2013/0079939 | A1 | 3/2013 | Darden et al. |
| 2013/0079943 | A1 | 3/2013 | Darden |
| 2013/0090935 | A1 | 4/2013 | Uselton |
| 2013/0110621 | A1 | 5/2013 | Gupta et al. |
| 2013/0116846 | A1 | 5/2013 | Galsim et al. |
| 2013/0144768 | A1 | 6/2013 | Rohrbaugh |
| 2013/0184888 | A1 | 7/2013 | Forbes et al. |
| 2013/0231793 | A1 | 9/2013 | Elliott et al. |
| 2013/0326610 | A1 | 12/2013 | Al-Khabbaz et al. |
| 2013/0345884 | A1 | 12/2013 | Forbes, Jr. |
| 2013/0345888 | A1 | 12/2013 | Forbes, Jr. |
| 2013/0346768 | A1 | 12/2013 | Forbes |
| 2014/0025486 | A1 | 1/2014 | Bigby et al. |
| 2014/0039699 | A1 | 2/2014 | Forbes, Jr. |
| 2014/0039701 | A1 | 2/2014 | Forbes |
| 2014/0039703 | A1 | 2/2014 | Forbes |
| 2014/0316876 | A1 | 10/2014 | Silverman |
| 2015/0142201 | A1 | 5/2015 | Forbes, Jr. |
| 2017/0025860 | A1 | 1/2017 | Forbes, Jr. |
| 2018/0246536 | A1 | 8/2018 | Forbes, Jr. |
| 2018/0275708 | A1 | 9/2018 | Forbes, Jr. |
| 2019/0041887 | A1 | 2/2019 | Forbes, Jr. |
| 2020/0161870 | A1 | 5/2020 | Forbes, Jr. |
| 2021/0066926 | A1 | 3/2021 | Forbes, Jr. |
| 2021/0080989 | A1 | 3/2021 | Forbes, Jr. |
| 2022/0140616 | A1 | 5/2022 | Forbes, Jr. |
| 2022/0179440 | A1 | 6/2022 | Forbes, Jr. |
| 2022/0382312 | A1 | 12/2022 | Forbes, Jr. |
| 2023/0019014 | A1 | 1/2023 | Forbes, Jr. |
| 2023/0359236 | A1 | 11/2023 | Forbes, Jr. |
| 2025/0013255 | A1 | 1/2025 | Forbes, Jr. |
| 2025/0172961 | A1 | 5/2025 | Forbes, Jr. |

FOREIGN PATENT DOCUMENTS

| | | | |
|---|---|---|---|
| CN | 102193538 | A | 9/2011 |
| CN | 102625942 | A | 8/2012 |
| EP | 1441430 | A1 | 7/2004 |
| EP | 1729223 | A2 | 12/2006 |
| EP | 2544333 | A1 | 1/2013 |
| GB | 2479060 | A | 9/2011 |
| JP | 2000078748 | A | 3/2000 |
| JP | 2001306839 | A | 11/2001 |
| JP | 2004180412 | A | 6/2004 |
| JP | 2004248174 | A | 9/2004 |
| JP | 2006060911 | A | 3/2006 |

(56) References Cited

FOREIGN PATENT DOCUMENTS

| | | | |
|---|---|---|---|
| JP | 2007132553 | A | 5/2007 |
| JP | 5103425 | B2 | 12/2012 |
| KR | 20050045272 | A | 5/2005 |
| KR | 20060036171 | A | 4/2006 |
| KR | 20070008321 | A | 1/2007 |
| KR | 100701298 | B1 | 3/2007 |
| KR | 20070098172 | A | 10/2007 |
| KR | 20080112692 | A | 12/2008 |
| WO | 2000057259 | A2 | 9/2000 |
| WO | 2001006432 | A1 | 1/2001 |
| WO | 0207365 | A2 | 1/2002 |
| WO | 2007136456 | A2 | 11/2007 |
| WO | 2008125696 | A2 | 10/2008 |
| WO | 2010079747 | A1 | 7/2010 |
| WO | 2006096854 | A3 | 11/2011 |
| WO | 2011156776 | A2 | 12/2011 |

OTHER PUBLICATIONS

Byers J. Risk Management and Monetizing the Commodity Storage Option. Natural Gas & Electricity [serial online]. Jul. 2005; 21 (12):1-8. Available from: Business Source Complete, Ipswich, MA.

C.W. Gellings and W.M. Smith, Integrating Demand-Side Management into Utility Planning, Proceedings of the IEEE, vol. 77, Issue: 6, Jun. 1989, pp. 908-918 (Abstract only).

Eric Hirst and Brendan Kirby, Opportunities for Demand Participation in New England Contingency-Reserve Markets, New England Demand Response Initiative, Feb. 2003 (15 pages).

Eric Hirst and Richard Cowart, Demand Side Resources and Reliability, New England Demand Response Initiative, Mar. 20, 2002 (32 pages).

Galvin Electricity Institute: Frequently Asked Questions, printed Apr. 23, 2014, same page available through archive.org unchanged Mar. 1, 2008.

GE Digital Energy Residential Electrical Metering Brochure. Sep. 12, 2012. https://web.archive.org/web/20120912144353/http://www.gedigitalenergy.com/products/brochures/1210-Family.pdf.

Illinois General Assembly: Public Act 094-0977, Effective Date: Jun. 30, 2006.

Kamat R., Oren S. Two-Settlement Systems for Electricity Markets under Network Uncertainty and Market Power Journal of Regulatory Economics [serial online]. Jan. 2004; 25(1):5-37.

Kathleen Spees and Lester B. Lave, Demand Response and Electricity Market Efficiency, The Electricity Journal, vol. 20, Issue 3, Apr. 2007 (online Mar. 27, 2007), pp. 69-85 (Abstract only).

L. T. Anstine, R.E. Burke, J.E. Casey, R. Holgate, R.S. John, and H.G. Stewart, Application of Probability Methods to the Determination of Spinning Reserve Requirements for the Pennsylvania-New Jersey-Maryland Interconnection; IEEE Transactions on Power Apparatus and Systems, vol. 82, Issue 68, Oct. 1963, pp. 726-735 (Abstract only).

Lobsenz G. Maryland Regulators Reject BG&E Smart Grid Proposal. Energy Daily [serial online]. Jun. 23, 2010; (118): 3. Available from: Business Source Complete, Ipswich, MA.

M. Rashidi-Nejad, Y.H. Song, and M.H. Javidi-Dasht-Bayaz, Operating Reserve Provision in Deregulated Power Markets, IEEE Power Engineering Society Winter Meeting, vol. 2, 2002, pp. 1305-1310 (Abstract only).

Michael Ahlheim and Friedrich Schneider; "Allowing for Household Preferences in Emission Trading, A Contribution to the Climate Policy Debate"; Environmental and Resource Economics, vol. 21, pp. 317-342; Kluwer Academic Publishers; The Netherlands; 2002.

Olivier Rousse; "Environmental and economic benefits resulting from citizens' participation in CO.sub.2 emissions trading: An efficient alternative solution to the voluntary compensation of CO.sub.2 emissions", Energy Policy 36 (2008), pp. 388-397; Oct. 29, 2007 (online).

Pablo A. Ruiz and Peter W. Sauer, Valuation of Reserve Services, IEEE Proceedings of the 41 .sup.st Hawaii International Conference on System Sciences, 2008 (9 pages).

Paul Darbee, Insteon Compared, SmartLabs, Inc., Jan. 2, 2006, 69 pages.

Paul Darbee, Insteon The Details, Smarthome, Inc., Aug. 11, 2005, 68 pages.

United States of America Federal Energy Regulatory Commission (FERC), Order No. 745, "Demand Response Compensation in Organized Wholesale Energy Markets", 134 FERC ¶ 61,187 (Docket No. RM10-17-000, issued Mar. 15, 2011) (entire document).

Zhu Jinxiang, G. Jordan, and S. Ihara, The Market for Spinning Reserve and Its Impacts on Energy Prices, IEEE Power Engineering Society Winter Meeting, vol. 2, 2000, pp. 1202-1207 (Abstract Only).

ALC Smart Meter Use Case

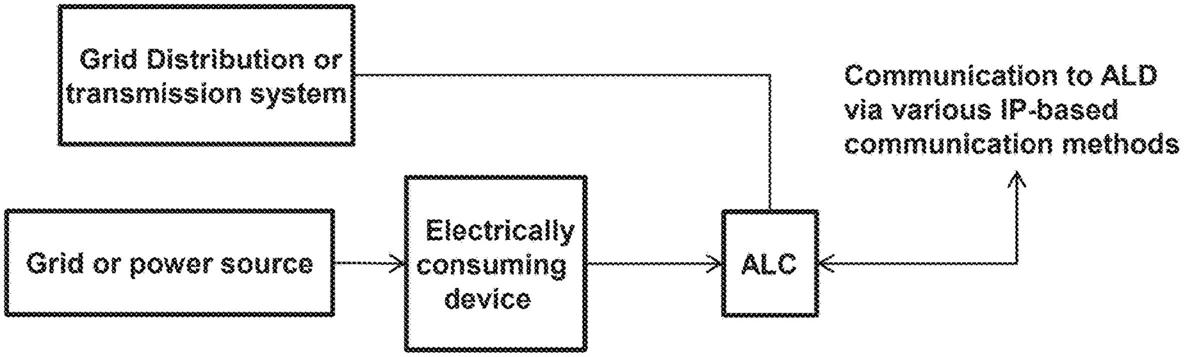

ALC as a smart meter

- Measurement to revenue grade as established by governing body
- Grid stabilizing values stored in memory/processor
- Memory/Processor
- IDR and other IEEE/ANSI or approved tables in memory used to calculate PST and PTB
- Communications interface
- Remote/autonomous ALD function
- IP Multimedia Gateway
- Router
- Security interface(s)
- Customer interface(s)
- Disconnect capability
- Advanced metering infrastructure features and functions

FIG. 1B

Prior Art Fig. 4
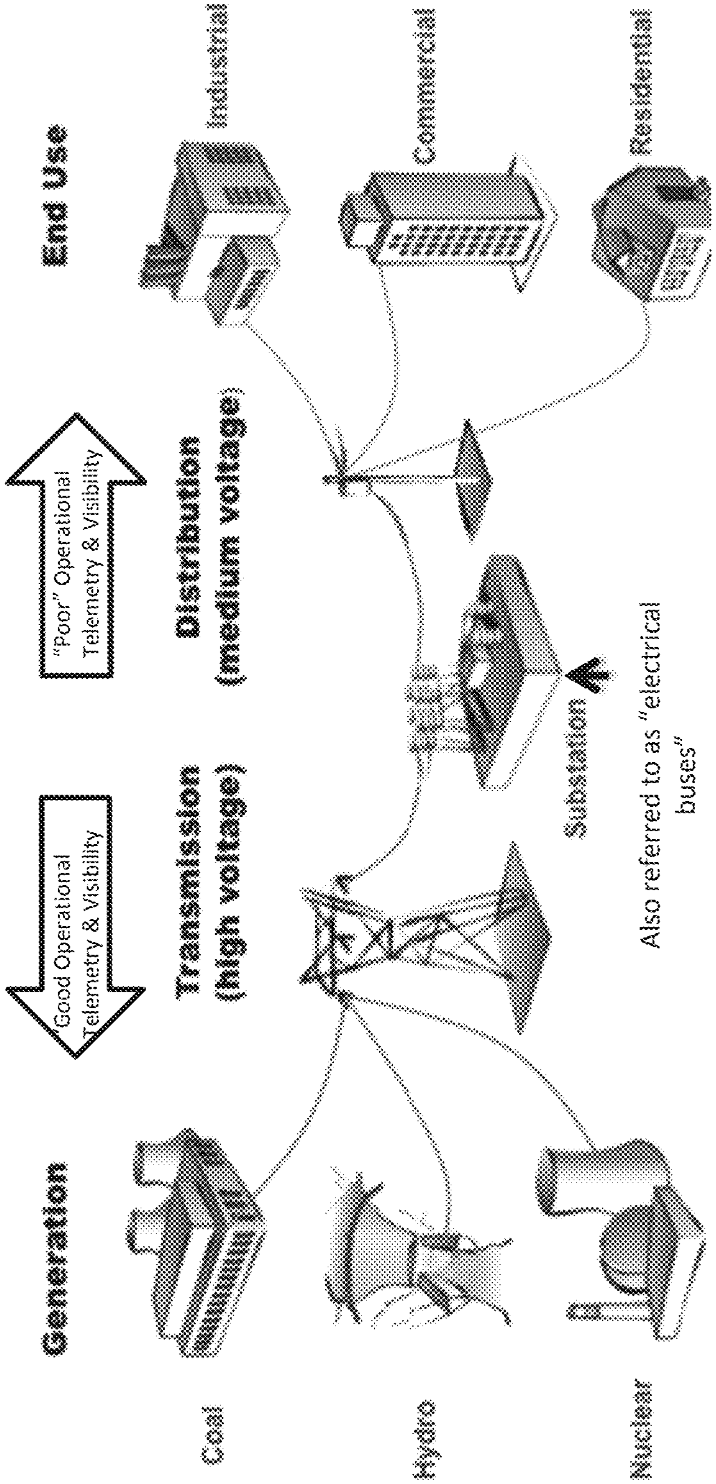

Prior Art Fig. 5
Transmission systems connect electric power sources to distribution facilities as well as neighboring power systems
"Smart Meters" have been placed on homes and businesses whose primary function is "Advanced Metering" or historical metering information & limited utility operational benefits
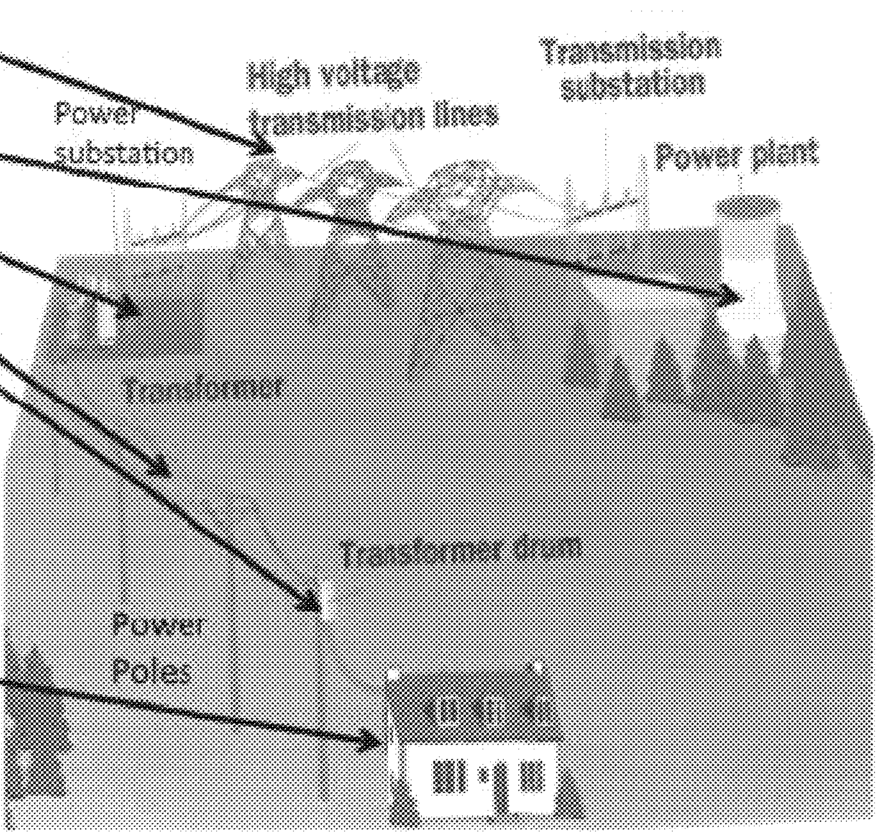

Prior Art Fig. 6
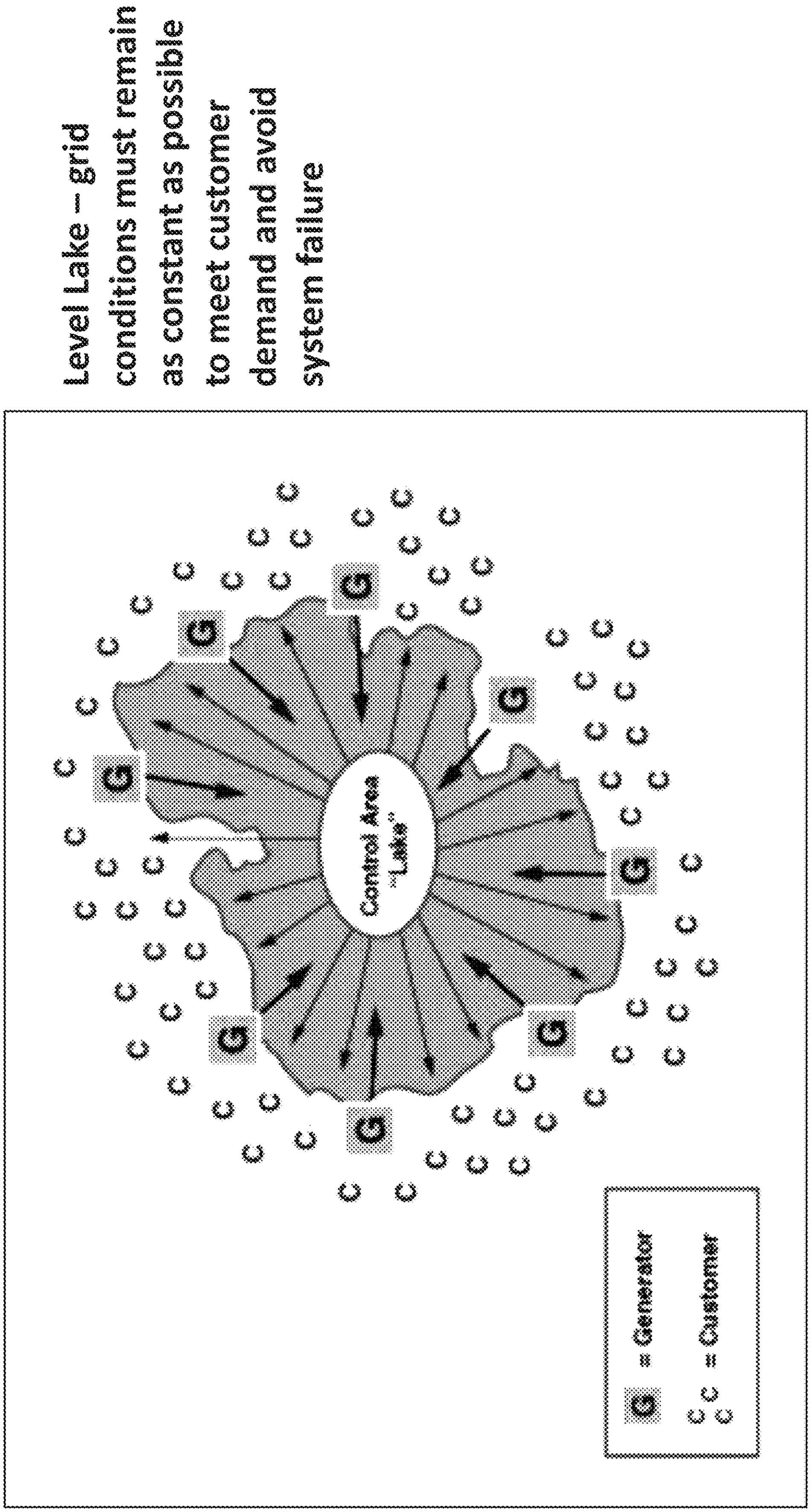

Prior Art Fig. 7
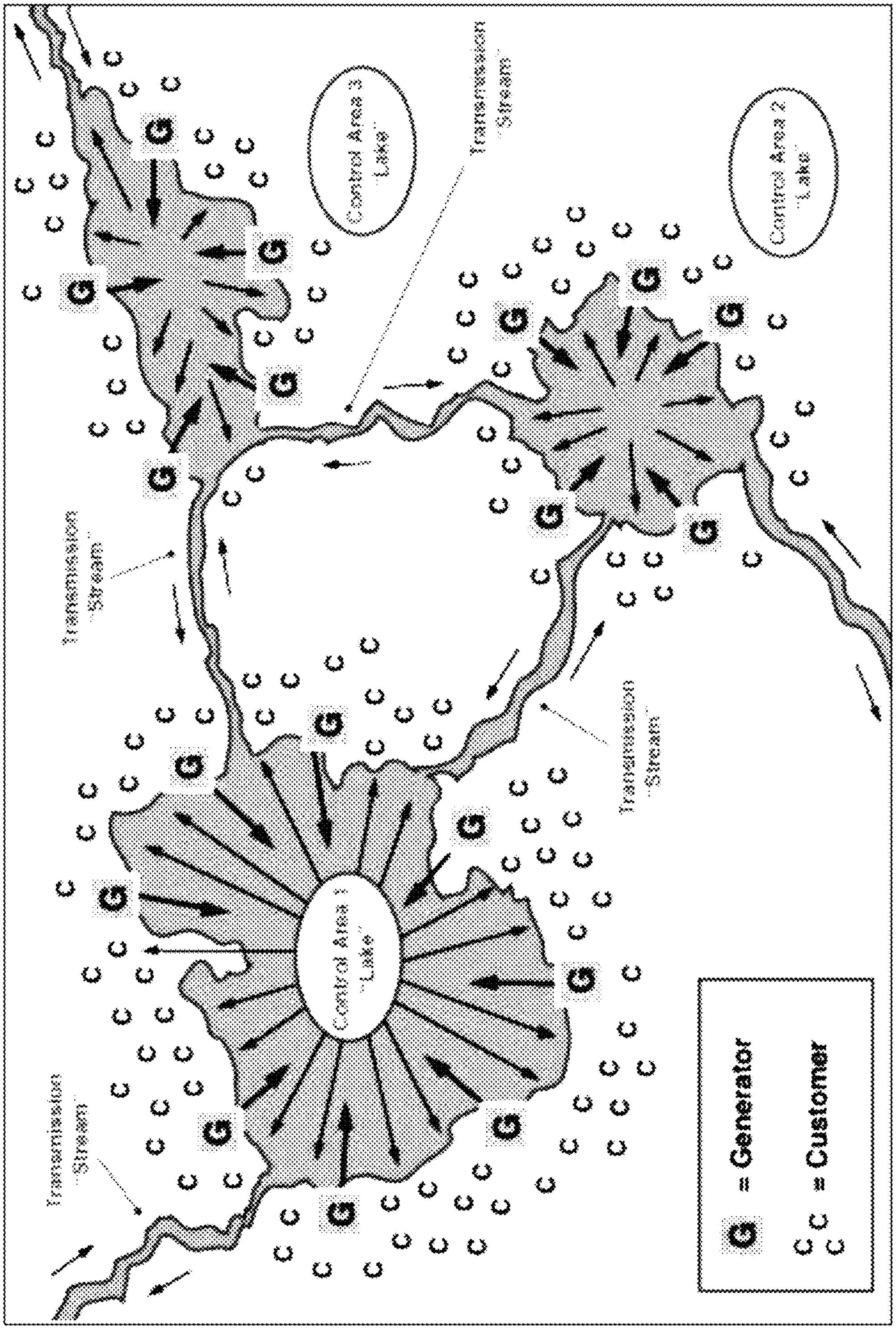
Now add the complexity of balancing the flows & metering the interconnections Prior Art Fig. 8
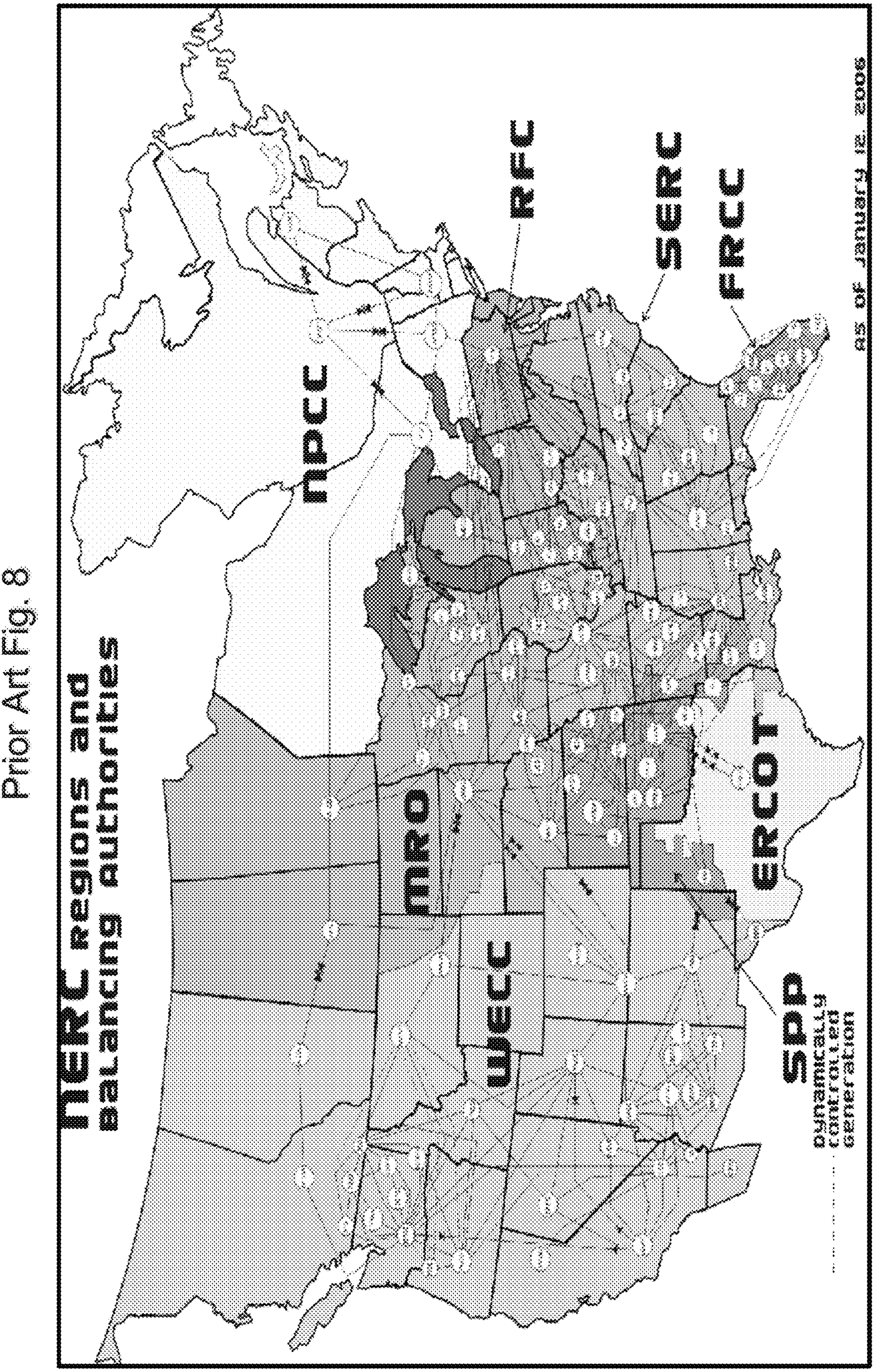

Prior Art Fig. 9
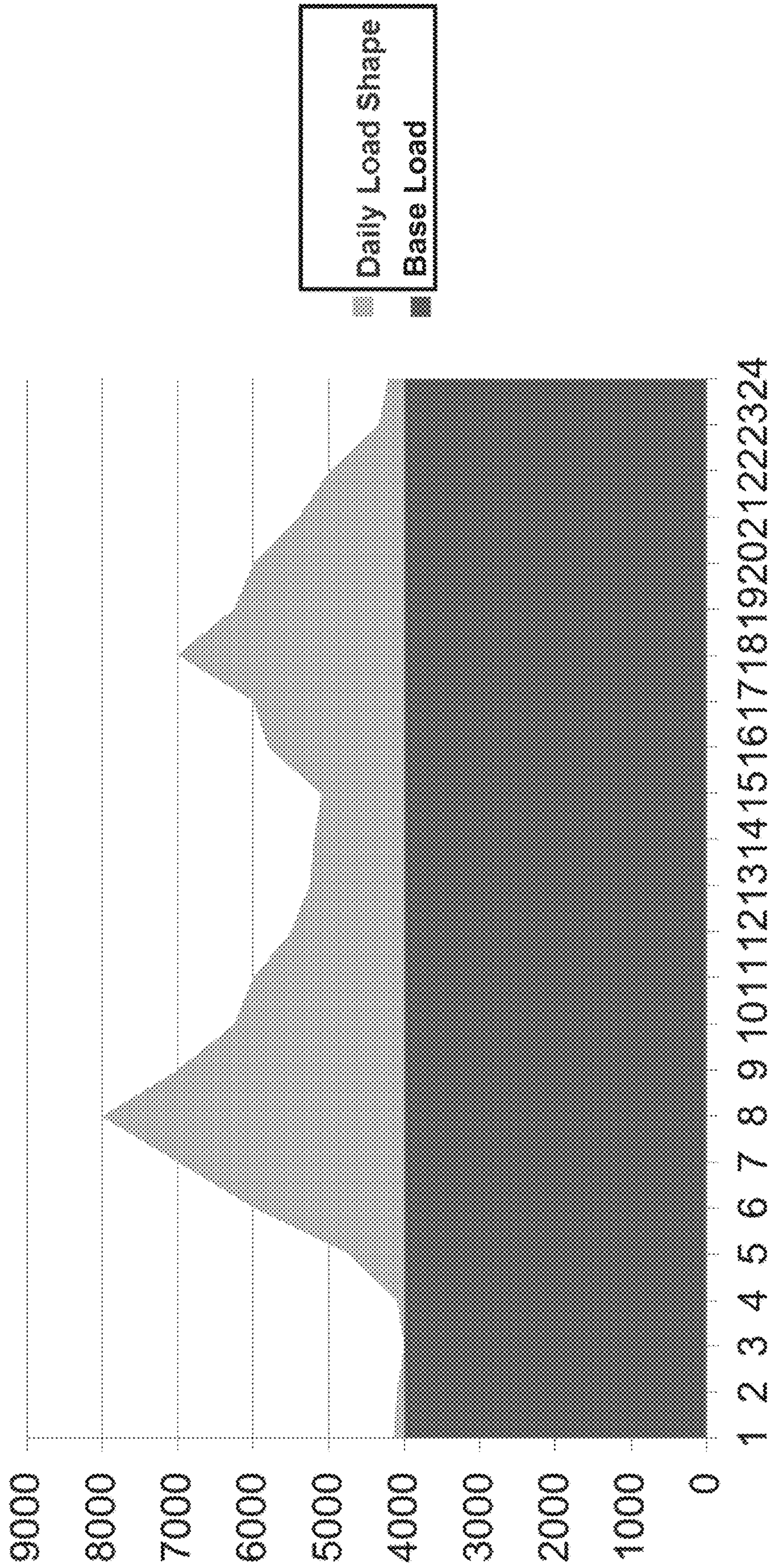
A utility must maintain sufficient operating reserves to address their peaks

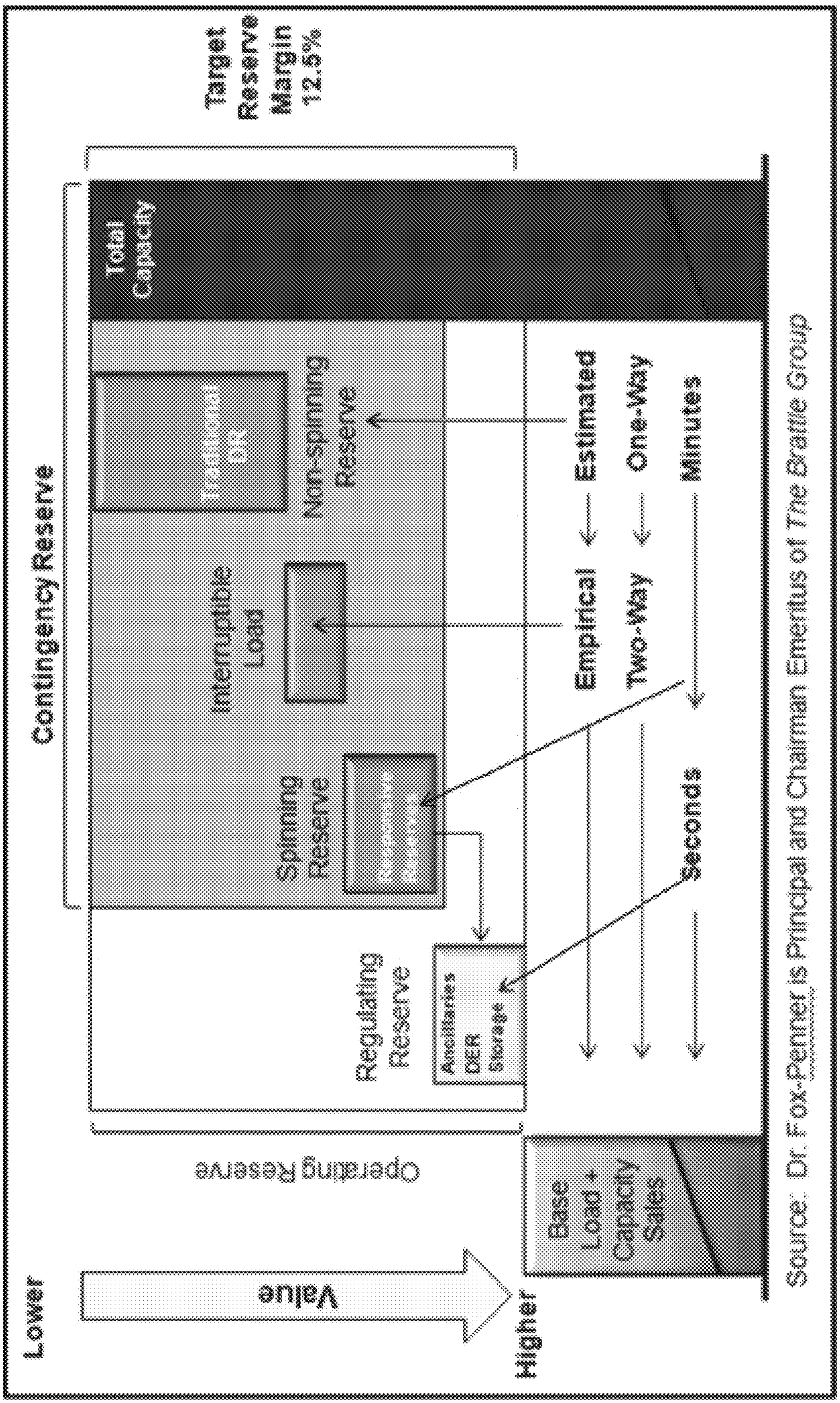
Prior Art Fig. 10
Target Reserve Margin 12.5%
Contingency Reserve
Total Capacity
Traditional DR
Non-spinning Reserve
Interruptible Load
Spinning Reserve
Regulating Reserve
Ancillaries DER Storage
Estimated
One-Way
Minutes
Empirical
Two-Way
Seconds
Operating Reserve
Base Load + Capacity Sales
Lower
Value
Higher
Source: Dr. Fox-Penner is Principal and Chairman Emeritus of The Brattle Group Prior Art Fig. 11
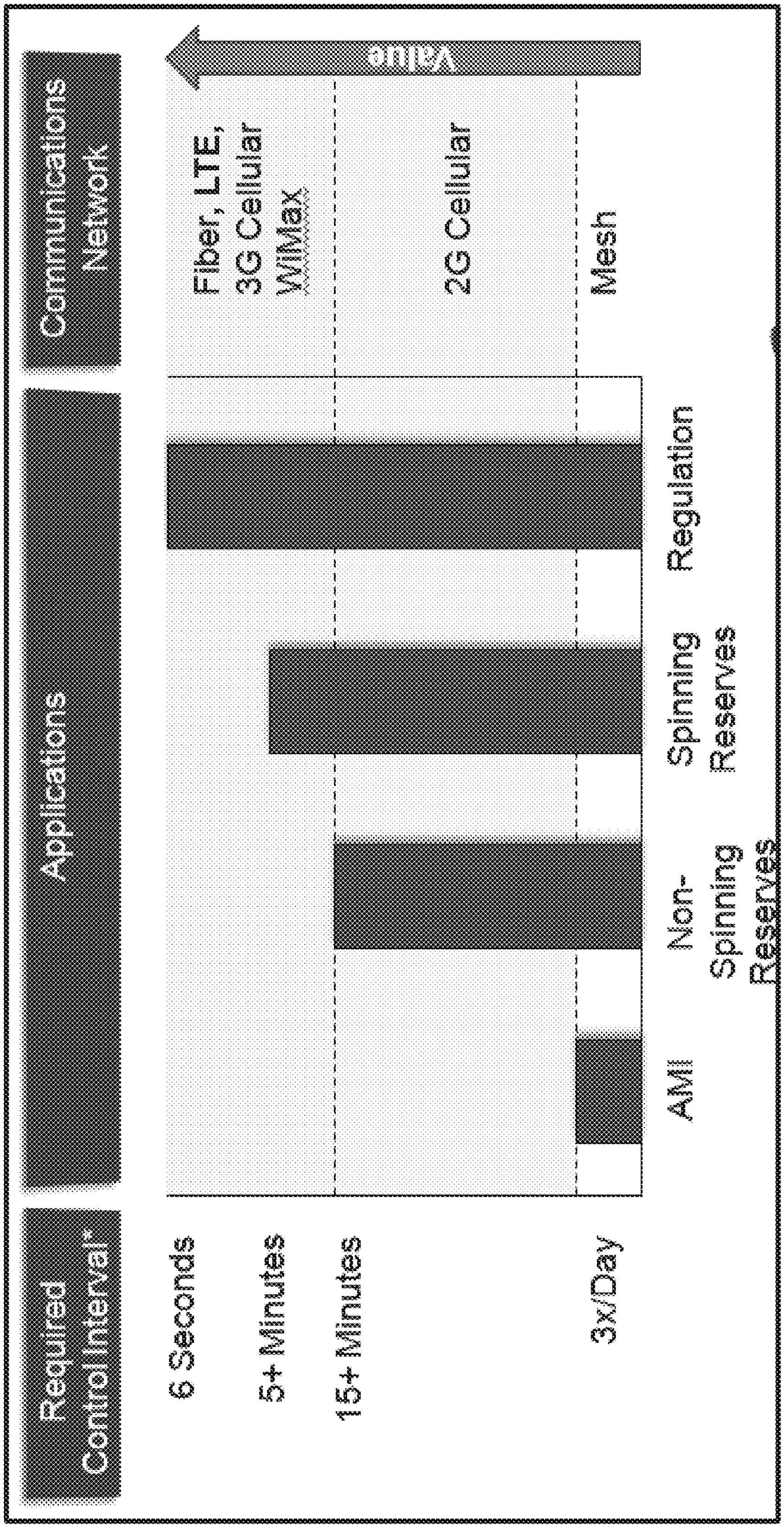

Prior Art Fig. 12
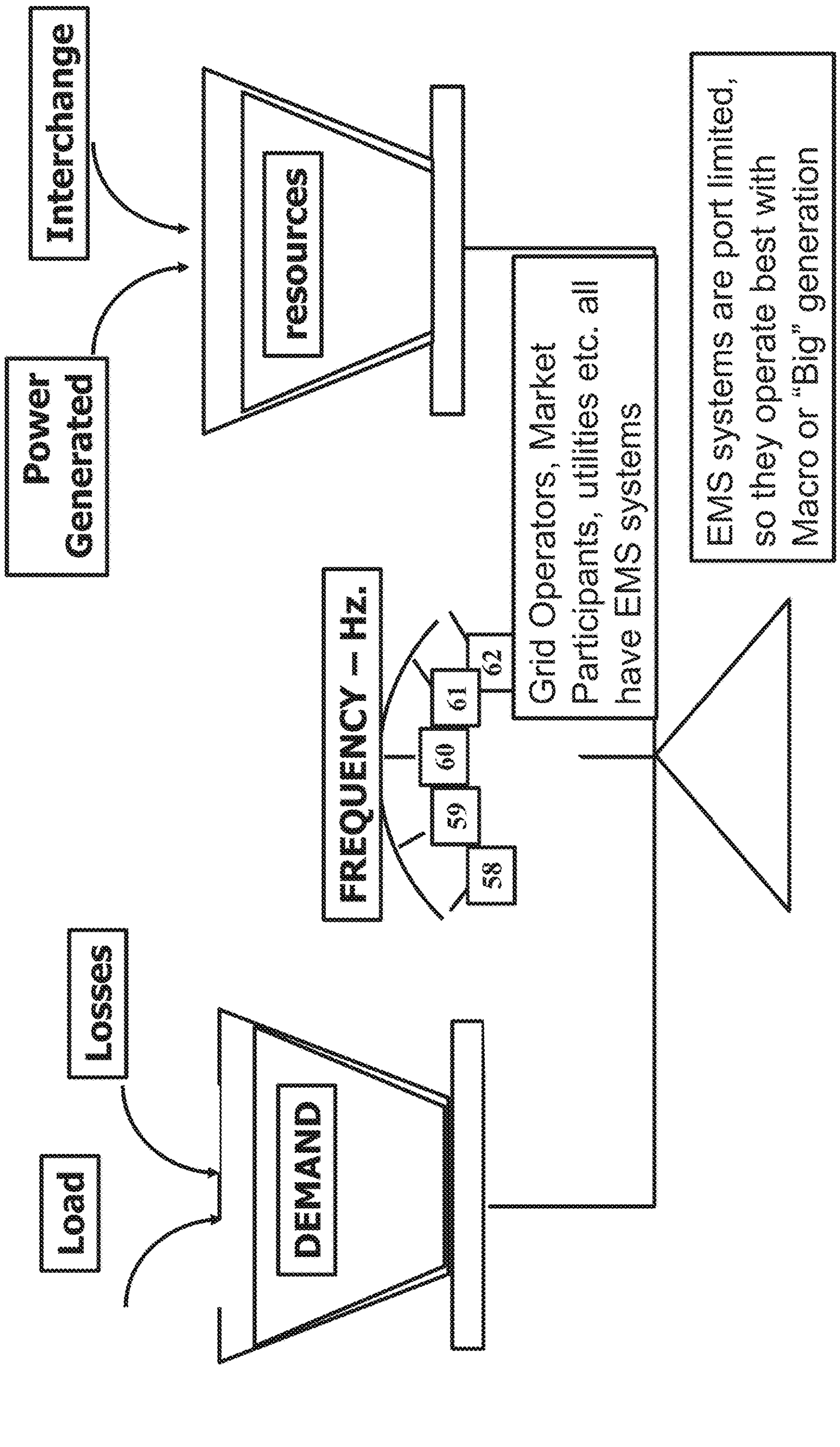

Decentralized networks (like telecom) that function & interoperate AND standards based

Fig. 17B

FERC 745

- Enables Load Resources/DR
- Applies to ALL ISOs/RTOs
- Focused fast acting DR
- Hard for "dumb" DR
- Justifies
- High performance CVR

"Negawatts" are equal to "Megawatts IF they meet criteria

- Low latency communication
- NERC Dispatch & Control
- Measurement & Verification
- Analytics & Settlement
- QSE, EMS, ICCP, for AS

FERC 750

- Enables storage technologies
- Enabled Fast acting Frequency response
- Higher $ compensation than CSP models if fast response

Batteries, EV + batteries, compressed air etc. compensated for Ancillaries

- Low latency communication
- NERC Dispatch & Control
- Measurement & Verification
- Analytics & Settlement
- QSE, EMS, ICCP, for AS
- Balancing important

FERC 755

- Enables Distributed Energy
- Enables micro-grids
- Enables attachment at distribution level of grid
- Higher $ compensation due to fast acting ancillaries

Micro generation, micro turbines, micro grids compensated for Ancillaries

- Low latency communication
- NERC Dispatch & Control
- Measurement & Verification
- Analytics & Settlement
- QSE, EMS, ICCP, for AS
- Balancing important

EXAMPLE ADJUSTABLE PARAMETERS:

Consumer-adjustable parameters:

- Pool pump
    - Time of day, day of week, month
- HVAC and water heater temperatures:
    - Seasonal temperature range
    - Away temperatures
    - Time of day temperature schedule
    - Day of week temperature schedule
    - Month of year temperature range
    - Location temperature set points (upstairs, downstairs)
- Windows (open/close)
- Fans
- Dryer – time of use
- Dishwasher – time of use

- Commercial building control
    - Chiller
    - Cooling tower
    - Discharge air
    - Boiler
    - Hydronic
    - Built-up air handling unit Supplier-adjustable parameters:
- Pool pump – time of use
- Water heater – temperature range
- Thermostat – temperature range
- HVAC – temperature range
- Dryer – time of use
- Dishwasher – time of use Rates
- Supplied by one of market participants per spec
- Example: pricing and time of use dependent upon grid stability and usage

FIG. 22

SYSTEM AND METHODS FOR ACTIVELY MANAGING ELECTRIC POWER OVER AN ELECTRIC POWER GRID

CROSS-REFERENCE TO RELATED APPLICATIONS

This Application relates to and claims priority from the followings U.S. patent applications. This Application is a continuation of U.S. application Ser. No. 19/024,448, filed Jan. 16, 2025, which is a continuation of U.S. application Ser. No. 18/887,766, filed Sep. 17, 2024, which is a continuation of U.S. application Ser. No. 17/077,517, filed Oct. 22, 2020 and issued as U.S. Pat. No. 12,124,285, which is a continuation of U.S. application Ser. No. 16/751,719, filed Jan. 24, 2020 and issued as U.S. Pat. No. 11,228,184, which is a continuation of U.S. application Ser. No. 15/288,246, filed Oct. 7, 2016 and issued as U.S. Pat. No. 10,547,178, which is a continuation of U.S. application Ser. No. 13/839,610, filed Mar. 15, 2013 and issued as U.S. Pat. No. 9,465,398, which is a continuation-in-part of U.S. application Ser. No. 13/528,596, filed Jun. 20, 2012 and issued as U.S. Pat. No. 9,207,698, each of which is incorporated herein by reference in its entirety.

BACKGROUND OF THE INVENTION

1. Field of the Invention

The present invention relates generally to the field of electrical power load control systems, and more particularly, to a method and system and apparatus for actively controlling power load management for customers attached to the electric power grid and for creating operating reserves for utilities and market participants.

2. Description of Related Art

The increased awareness of the impact of carbon emissions from the use of fossil fueled electric generation combined with the increased cost of producing base load, intermediate, and peak power during high load conditions has increased the need for alternative solutions utilizing load control as a mechanism to defer, or in some cases eliminate, the need for the deployment of additional generation capacity by electric utilities, generating utilities, or distributing utilities or any grid operator or market participant whose primary function is to facilitate the production, distribution, operation and sale of electricity to individual consumers. Existing electric utilities are pressed for methods to defer or eliminate the need for construction of fossil-based or macro large scale electricity generation while dealing with the need to integrate new sources of generation such as renewable energy sources or distributed energy resources whose production and integration into the electric grid is problematic.

Today, a patchwork of systems exist to implement demand response load management programs, whereby various radio subsystems in various frequency bands utilize "one-way" transmit only methods of communication or most recently deployed a plurality of proprietary two-way methods of communications with electric customers or their load consuming device and measurement instruments including, by way of example, "smart meters." Under these programs, radio frequency (RF)-controlled relay switches are typically attached to a customer's air conditioner, water heater, or pool pumps, or other individual load consuming devices. A blanket command is sent out to a specific geographic area whereby all receiving units within the range of the transmitting station (e.g., typically a paging network) are turned off during peak hours at the election of the power utility. After a period of time when the peak load has passed, a second blanket command is sent to turn on those devices that have been turned off. This "load shifting" has the undesired effect of occasionally causing "secondary peaks" and generally require consumer incentives for adoption.

Most recent improvements that follow the same concepts are RF networks that utilize a plurality of mesh based, non-standard communications protocols that utilize IEEE 802.15.4 or its derivatives, or "ZigBee" protocol end devices to include load control switches, programmable thermostats that have pre-determined set points for accomplishing the "off" or "cut" or reduce command simultaneously or preloaded in the resident memory of the end device. The programmable thermostats or building control systems (PCTs) move the set point of the HVAC (or affect another inductive or resistive device) or remove a resistive device from the electric grid thus accomplishing the same "load shifting" effect previously described. All of these methods require and rely on statistical estimations for measuring their effectiveness and use historical information that are transmitted via these same "smart meters" to provide after-the-fact evidence that an individual device or consumer complied with the demand response event. Protocols that are employed for these methods include "Smart Energy Profiles Versions 1 & 2" and its derivatives to provide utilities and their consumers an attempt at standardization amongst various OEMs of PCTs, switching, and control systems through a plurality of protocols and interfaces. These methods remain crude and do not include real time, measurement, verification, settlement and other attributes necessary to have their Demand Response effects utilized for effective Operating Reserves with the exception of limited programs for "Emergency" Capacity Programs. Furthermore, for effective settlement and control of mobile storage devices such as Electric Vehicles, these early "Smart Grid" devices are not capable of meeting the requirements of Federal Energy Regulatory Commission (FERC), North American Electric Reliability Corp. (NERC) or other standards setting bodies such as the National Institute of Science & Technology (NIST) Smart Grid Roadmap.

While telemetering has been used for the express purpose of reporting energy usage, no cost effective techniques exist for calculating power consumption, carbon gas emissions, sulfur dioxide ($SO_2$) gas emissions, and/or nitrogen dioxide ($NO_2$) emissions, and reporting the state of a particular device under the control of a two-way positive control load management device or other combinations of load control previously described. In particular, one way wireless communications devices have been utilized to de-activate electrical appliances, such as heating, ventilation, and air-conditioning (HVAC) units, water heaters, pool pumps, and lighting or any inductive or resistive device that is eligible as determined by a utility or market participant for deactivation, from an existing electrical supplier or distribution partner's network. These devices have typically been used in combination with wireless paging receivers or FM radio carrier data modulation, or a plurality of 2-way proprietary radio frequency (RF) technologies, that receive "on" or "off" commands from a paging transmitter or transmitter device. Additionally, the one-way devices are typically connected to a serving electrical supplier's control center via landline trunks, or in some cases, microwave transmission to the paging transmitter. The customer subscribing to the load management program receives a discount or some other form of economic incentive, including direct payments for allowing the serving electrical supplier (utility), retail electric provider or any other market participant to connect to their electrical appliances with a one-way load control switch and deactivate those appliances during high energy usage periods. This technique of demand response is used mostly by utilities or any market participant for "peak shifting" where the electric load demand curve is moved from a peak period to a less generation intensive time interval and are favored by rate-based utilities who earn capital returns of new power plants. These methods are previous art and generally no conservation of energy is measured. In many instances, secondary peak periods occur when the cumulative effect of all the resistive and inductive devices are released from the "off" state simultaneously.

While one-way devices are generally industry standard and relatively inexpensive to implement, the lack of a return path from the receiver, combined with the lack of information on the actual devices connected to the receiver, make the system highly inefficient and largely inaccurate for measuring the actual load shed to the serving utility or compliant with measurement and verification for presenting a balancing authority or independent system operator for operating reserves. While the differential current draw is measurable on the serving electric utility's transmission lines and at electrical bus or substations, the actual load shed is approximate and the location of the load deferral is approximated at the control center of the serving utility or other statistical methods are considered to approximate the individual or cumulative effect on an electric utility grid. The aforementioned "two-way" systems are simultaneously defective in addressing real time and near real time telemetry needs that produce generation equivalencies that are now recognized by FERC Orders such as FERC 745 where measurable, verifiable Demand Response "negawatts", defined as real time or near real time load curtailment where measurement and verification can be provided within the tolerances required under such programs presented by FERC, NERC, or the governing body that regulate grid operations. The aforementioned "smart meters" in combination with their data collection systems commonly referred to as "Advanced Metering Infrastructure" generally collect interval data from meters in HISTORICAL fashion and report this information to the utility, market participant or grid operator AFTER the utility or grid operator has sent notice for curtailment events or "control events" to initiate due to high grid stress that includes lack of adequate operating reserves to meet demand, frequency variations, voltage support and any other grid stabilizing needs as identified by the utility or grid operator and published and governed by FERC, NERC, or other applicable regulations.

One exemplary telemetering system is disclosed in U.S. Pat. No. 6,891,838 B1. This patent describes details surrounding a mesh communication of residential devices and the reporting and control of those devices, via WANs, to a computer. The stated design goal in this patent is to facilitate the "monitoring and control of residential automation systems." This patent does not explain how a serving utility or customer could actively control the devices to facilitate the reduction of electricity. In contrast, this patent discloses techniques that could be utilized for reporting information that is being displayed by the serving utility's power meter (as do many other prior applications in the field of telemetering).

An additional exemplary telemetering system is disclosed in U.S. Patent Application Publication No. 2005/0240315 A1. The primary purpose of this published application is not to control utility loads, but rather "to provide an improved interactive system for remotely monitoring and establishing the status of a customer utility load." A stated goal of this publication is to reduce the amount of time utility field personnel have to spend in the field servicing meters by utilizing wireless technology.

Another prior art system is disclosed in U.S. Pat. No. 6,633,823, which describes, in detail, the use of proprietary hardware to remotely turn off or turn on devices within a building or residence. While initially this prior art generally describes a system that would assist utilities in managing power load control, the prior art does not contain the unique attributes necessary to construct or implement a complete system. In particular, this patent is deficient in the areas of security, load accuracy of a controlled device, and methods disclosing how a customer utilizing applicable hardware might set parameters, such as temperature set points, customer preference information, and customer overrides, within an intelligent algorithm that reduces the probability of customer dissatisfaction and service cancellation or churn.

Attempts have been made to bridge the gap between one-way, un-verified power load control management systems and positive control verified power load control management systems. However, until recently, technologies such as smart breakers and command relay devices were not considered for use in residential and commercial environments primarily due to high cost entry points, lack of customer demand, and the cost of power generation relative to the cost of implementing load control or their ability to meet the measurement, telemetry, verification requirements of the grid operator or ISO. Furthermore, submetering technology within the smart breaker, load control device, command relay devices or building control systems have not existed in the prior art.

One such gap-bridging attempt is described in U.S. Patent Application Publication No. US 2005/0065742 A1. This publication discloses a system and method for remote power management using IEEE 802 based wireless communication links. The system described in this publication includes an on-premise processor (OPP), a host processor, and an end device. The host processor issues power management commands to the OPP, which in turn relays the commands to the end devices under its management.

While the disclosed OPP does provide some intelligence in the power management system, it does not determine which end devices under its control to turn-off during a power reduction event, instead relying on the host device to make such decision. For example, during a power reduction event, the end device must request permission from the OPP to turn on. The request is forwarded to the host device for a decision on the request in view of the parameters of the on-going power reduction event. The system also contemplates periodic reading of utility meters by the OPP and storage of the read data in the OPP for later communication to the host device. The OPP may also include intelligence to indicate to the host processor that the OPP will not be able to comply with a power reduction command due to the inability of a load under the OPP's control to be deactivated. However, neither the host processor nor the OPP determine which loads to remove in order to satisfy a power reduction command from an electric utility, particularly when the command is issued by one of several utilities under the management of a power management system. Further, neither the host processor nor the OPP tracks or accumulates power saved and/or carbon credits earned on a per customer or per utility basis for future use by the utility and/or customer. Still further, the system of this publication lacks a reward incentive program to customers based on their participation in the power management system. Still further, the system described in this publication does not provide for secure communications between the host processor and the OPP, and/or between the OPP and the end device. As a result, the described system lacks many features that may be necessary for a commercially viable implementation.

Customer profiles are often used by systems for a variety of reasons. One reason is to promote customer loyalty. This involves keeping information about not only the customer, but about the customer's actions as well. This may include information about what the customer owns (i.e., which devices), how they are used, when they are used, etc. By mining this data, a company can more effectively select rewards for customers that give those customers an incentive for continuing to do business with the company. This is often described as customer relationship management (CRM).

Customer profile data is also useful for obtaining feedback about how a product is used. In software systems, this is often used to improve the customer/user experience or as an aid to testing. Deployed systems that have customer profiling communicate customer actions and other data back to the development organization. That data is analyzed to understand the customer's experience. Lessons learned from that analysis is used to make modifications to the deployed system, resulting in an improved system.

Customer profile data may also be used in marketing and sales. For instance, a retail business may collect a variety of information about a customer, including what customers look at on-line and inside "brick-and-mortar" stores. This data is mined to try to identify customer product preferences and shopping habits. Such data helps sales and marketing determine how to present products of probable interest to the customer, resulting in greater sales.

However, the collection of customer profile information by power utilities, retail electric providers or any other market participant that sells retail electric commodity to end customers (residential or commercial) has been limited to customer account information of gross electrical consumption and inferential information about how power is being consumed but requires customers to take their own actions. Because power utilities, REPs, market participants typically are unable to collect detailed data about what is happening inside a customer's home or business, including patterns of energy consumption by device, there has been little opportunity to create extensive customer profiles.

Thus, none of the prior art systems, methods, or devices provide complete solutions for actively controlling power load management for customers attached to the electric grid, and for creating operating reserves for utilities and market participants. Therefore, a need exists for a system and method for active power load management that is optionally capable of tracking power savings for the individual customer as well as the electric utility and any other market participant to thereby overcome the shortcomings of the prior art.

SUMMARY OF THE INVENTION

For applications of electrical power load management, the present invention provides for systems and methods for actively controlling power load management for customers attached to the electric grid and for creating operating reserves for utilities and market participants. The present invention further provides additional tracking of power savings for both the individual customer, broadly defined as any consumer of electrical power whether this is an individual residential consumer, a large commercial/industrial customer or any combination thereof, inclusive of retail electric providers and market participants as well as the overall electric utility whether generating or distributing.

Accordingly, the present invention is directed to and methods for managing power on an electric power grid including a server for communicating IP-based messages over a network with distributed power consuming devices and/or power supplying devices, the IP-based messages including information including a change in state of the power consuming device(s), a directive for a change in state of the power consuming device(s), a priority message, an alert, a status, an update, a location with respect to the electric power grid, a function, device attributes, and combinations thereof.

These and other aspects of the present invention will become apparent to those skilled in the art after a reading of the following description of the preferred embodiment when considered with the drawings, as they support the claimed invention.

BRIEF DESCRIPTION OF THE DRAWINGS

FIG. 1B is a schematic diagram illustrating an exemplary active load client (ALC) smart meter use case example according to the present invention, wherein the ALC is shown as a component of the system of FIG. 1A.

PRIOR ART FIG. 4 is a schematic diagram illustrating generation, transmission, distribution, and load consumption within a traditional electric power grid.

PRIOR ART FIG. 5 is a schematic diagram illustrating traditional transmission systems that connect to electric power sources to distribution facilities, including smart metering and advanced metering.

PRIOR ART FIG. 6 is a schematic diagram illustrating power generation or supply balancing with customer demand for electric power within a grid.

PRIOR ART FIG. 7 is a schematic diagram illustrating balancing areas and their interaction for power generation or supply balancing with customer demand for electric power within a grid.

PRIOR ART FIG. 8 is a schematic diagram illustrating regions and balancing areas and their interaction for power generation or supply balancing with customer demand for electric power within a grid.

PRIOR ART FIG. 9 is a graphic illustration of daily load shape and base load for electric power grid operations, including sufficient operating reserves to address peak load conditions.

PRIOR ART FIG. 10 is a graph illustrating operating reserves of different types of responsiveness required for generation and operation of an electric power grid.

PRIOR ART FIG. 11 is a bar graph illustrating applications of operating reserves of different types and communications networks and timing for control events.

PRIOR ART FIG. 12 is a schematic illustration for balancing resources within an electric power grid, including grid stability elements of frequency.

FIG. 17B is a table illustrating three FERC orders and their applicability to the electric power grid load management addressed by the present invention.

FIG. 22 is a table of consumer-adjustable parameters as examples for systems and methods components according to the present invention.

DETAILED DESCRIPTION OF THE PRESENT INVENTION

Figure 34:
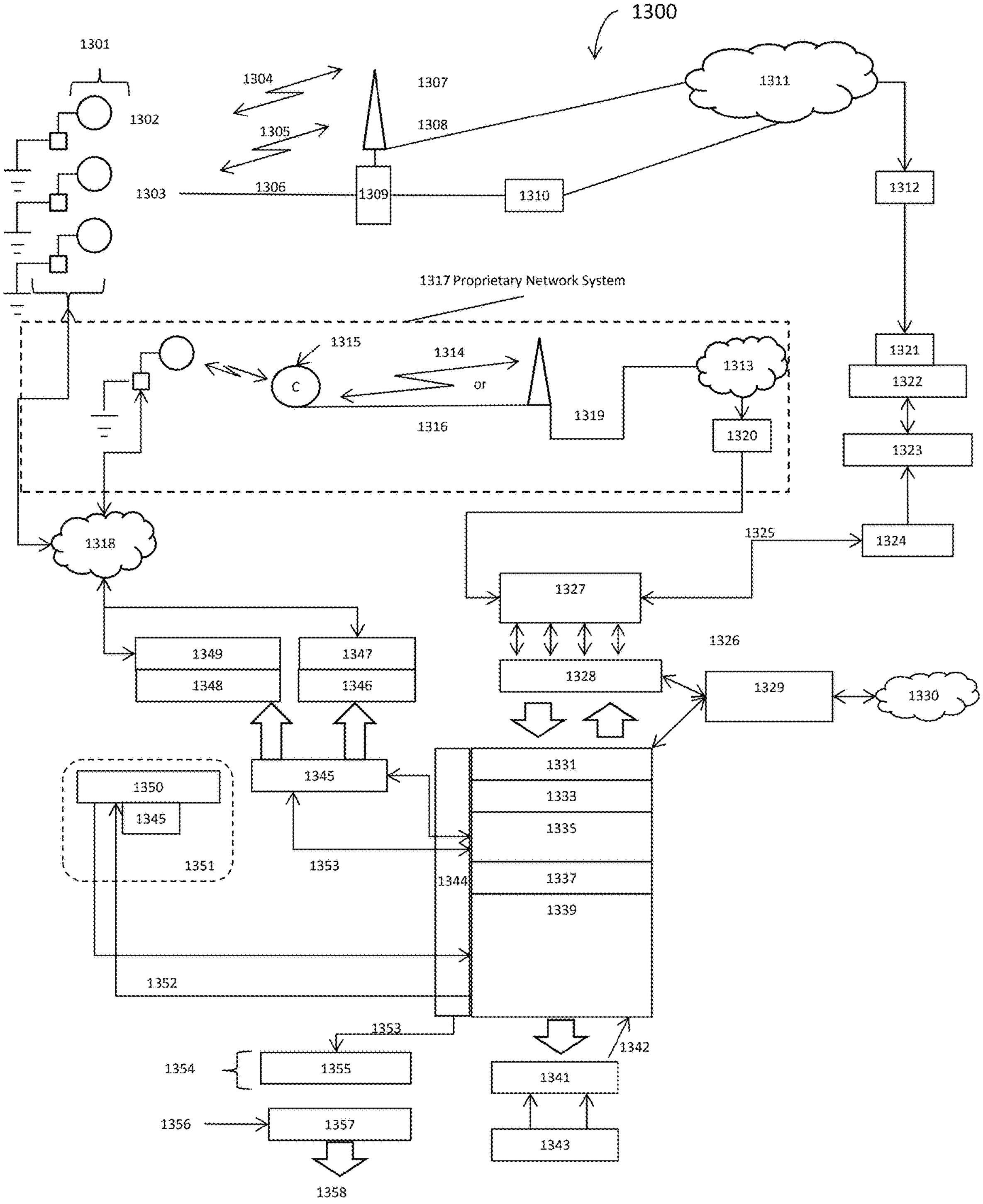
FIG. 34 is a schematic diagram illustrating one embodiment of the present invention.
Figure 35:
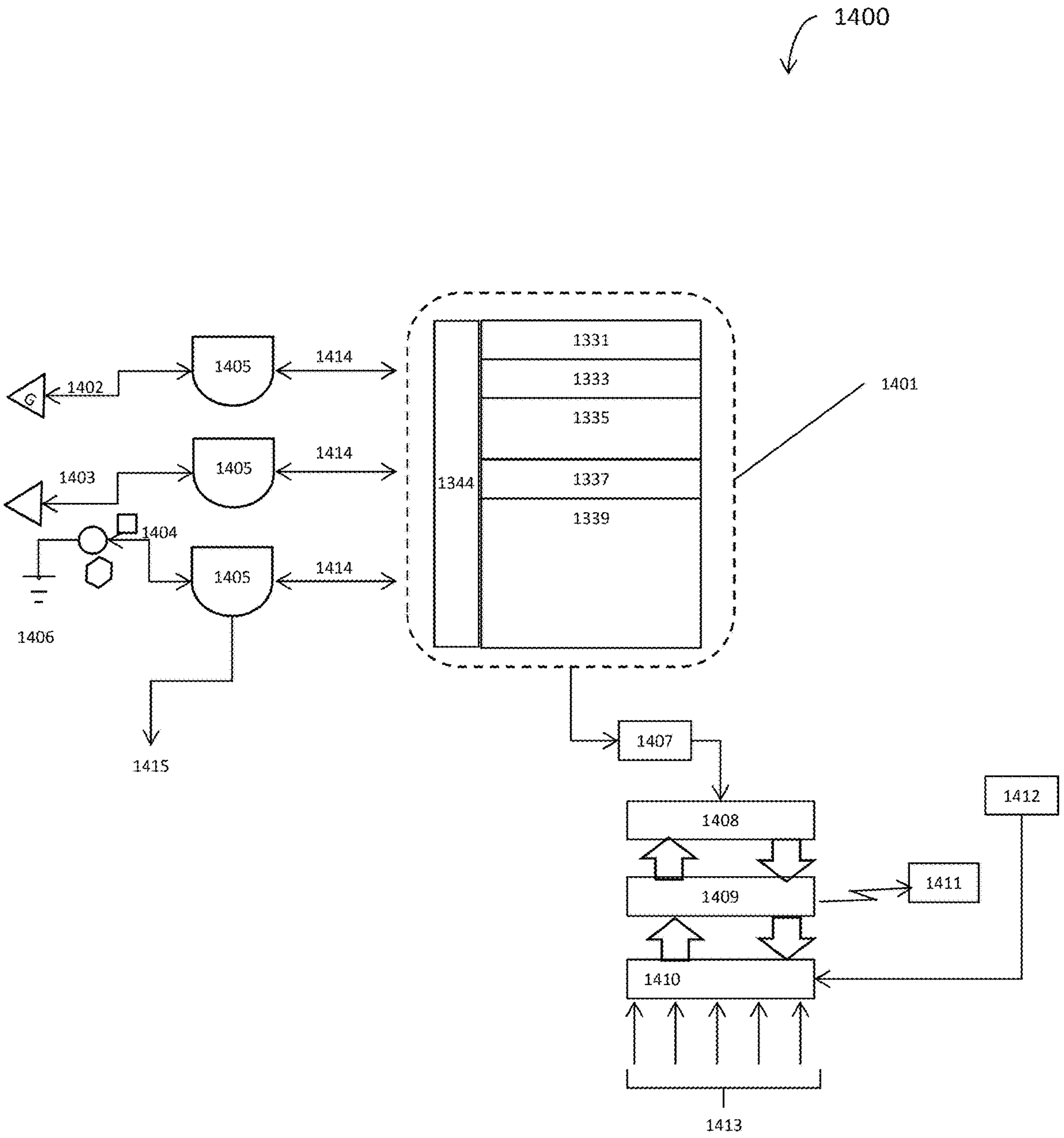
FIG. 35 is another schematic diagram illustrating the present invention.

Overall, the systems and methods of the present invention provide Operating Reserves for grid stability and reliability of an electric power grid. The present invention provides systems and methods for managing power on an electric power grid including a server for communicating IP-based messages over a network with distributed power consuming devices and/or power supplying devices, the IP-based messages including information including a change in state of the power consuming device(s), a directive for a change in state of the power consuming device(s), a priority message, an alert, a status, an update, a location with respect to the electric power grid, a function, device attributes, and combinations thereof. FIG. 34 and FIG. 35 provide schematic diagrams illustrating the present invention, including advanced FERC 745 load curtailment compliant system and method description, wherein active load clients or grid elements are aggregated to provide minimum amounts of power available to be curtailed by the devices controlled under the systems and methods of the present invention.

In a system for managing power on an electric power grid according to the present invention the following are provided: a server having a processor coupled with a memory, and constructed and configured for communication over a network for communicating IP-based messages with distributed power consuming devices and/or power supplying devices; a database for storing information relating to power consumed by the plurality of power consuming devices and the amount of power available to be reduced to each of the power consuming devices; wherein the IP-based messages include information including at least one of a change in state of the power consuming device(s), a directive for a change in state of the power consuming device(s), a priority message, an alert, a status, an update, a location with respect to the electric power grid, a function, and device attributes; and wherein the server is operable to receive or initiate power control commands and corresponding IP-based messages in communication with the power consuming devices. Preferably, the system is operable for providing operating reserves for grid stability, grid reliability, and/or operating reserves required for the electric power grid functioning. Thus, the server is responsive to messages from an EMS or a grid operator and their required operational sub-systems to provide stability and/or reliability for the electric grid. The information may be stored in the database and/or stored in persistence layer or cached, preferably by a coordinator that also functions for routing the IP-based messages between the server and the distributed devices; the information may further include a status of the power consuming device(s). The coordinator further provides persistence or cache of the IP-based messages and/or the information they contain, as an alternative to or in addition to the database storing the messages and/or the information. The information stored in the database is preferably aggregated in the amount of power available to be reduced to each of the power consuming devices, wherein the aggregation is made to reach a minimum capacity amount required to trade and settle the amount of power available to be reduced. In the case of a power supply device the information stored in the database also includes the aggregated amount of power to be supplied to the grid for either a curtailment/demand response program that has been set forth by the ISO/RTO/Utility or Governing body. The aggregation is provided by group, by asset, and combinations thereof. Preferably, the system and methods of the present invention aggregate load and supply resource information from the devices or grid elements and automatically transform the load and/or supply resource information into settlement grade data, which is used to make the financial settlement for the performance of load curtailment or supply of energy to the market by those devices or grid elements. The information is transformed by the application of standards, regulations, policies, requirements, and combinations thereof, as appropriate, based upon the grid operator, governing authority, market participant, etc., for example, PJM, ERCOT, MISO, and other regional organizations, and by application of NAESBY standards and guidelines applicable to the system. The transformation of the information into settlement grade data by the server may require aggregation to meet minimum requirements of the amount of load curtailed or power supplied, by way of example and not limitation, 100 kW.

At least one of the IP-based messages includes power control commands requiring a reduction in an amount of electric power consumed by the power consuming device(s). The power control commands include instructions for managing power control events and corresponding reduction in power to predetermined devices, which may further include alternating reduction in power to power consuming devices based upon profiles associated with each of the power consuming devices. The power control commands include a power inquiry command requesting the server to determine an amount of electric power available for temporary reduction from supply by a requesting electric utility, market participant or electric power grid operator(s). A command processor or the server operates to issue an associated power control event message responsive to the power inquiry command, and wherein the database stores current power usage information for the at least one electric utility or electric power grid operator(s). Preferably, the IP-based messages include at least one power consumption indicator and at least one power management status associated with each of the devices.

Additionally, the power consuming or supplying devices are operable for cross-communication with other power consuming or supplying devices over the communications network, either wired or wirelessly. Telemetry and standards for the communication of the IP-based messages include communication standards associated with the grid and the EMS, including ICCP and master SCADA. Preferably, each power consuming device, power supply device, or grid element includes telemetry, wherein the telemetry follows industry standard for EMS and/or SCADA control.

The profiles may further include customer profiles associated with the power consuming devices, the profiles having information about a status and an ability to change states that is based upon instructions provided by the market participant to any web-enabled device through an interface. Profiles are further described hereinbelow.

In the present invention, the power consuming devices, the power supplying devices, and grid elements that are supplying power (or load curtailed as power supply equivalent or comparable) to include but limited to distributed generators, fuel cells, batteries, electric vehicles, portable storage devices, compressed air, water storage and combinations thereof, the power control messages address supply side information for published load curtailment and/or demand response programs within the utility, ISO, RTO, or market as provided by the Governing Body for the electric power grid.

In one embodiment of the present invention, at least one smart meter is provided in network-based IP-based message communication with the server; the at least one smart meter includes an internal gateway or is coupled with an external gateway, and may further include meter data management software operable on the server for interpolating interval data from the at least one smart meter. The gateway provides IP multimedia gateway, an interface point for messages to route to and through the coordinator or other grid elements; it may serve as a mesh coordinator for multiple devices or grid elements; it may be 1 to 1, or 1 to many, as an aggregator. The gateway uses IP encapsulation and transforms the messages to comply with the purpose of the message, i.e., for load curtailment, supply, interface to control system, interface, and collection of metrology and revenue grade information; it can provide storage, host software agents, run autonomously or under direct control of one or more grid operational devices, subsystems, or the server. In addition to or alternative to the at least one smart meter, the system may further include at least one revenue grade sub-meter in network-based IP-based message communication with the server.

The systems and methods of the present invention may further include at least one of an event manager, a client device manager, a device control manager, and a coordinator that is operably coupled with one another and/or the controllable device(s).

An application layer for provisioning to supply information about the distributed power consuming devices and/or power supplying devices is also provided within the system, this information including at least one of device attributes, device functions, device locations, unique identifiers associated with each of the devices. The provisioning application may be externally supplied to the application layer via a PC, Smart Phone, Tablet device and include OEM information about the device or may collect information supplied by a RF-ID, standardized plug in interface, name plate information, tag, or any method wherein the mobile provisioning device can acquire device(s) and grid element(s) attributes that would be necessary for its incorporation and function into the electric power grid for purposes of providing grid stability, reliability, or metrology.

The Provisioning Layer also allows for a load consuming or supplying device to have its individual attributes and settings controlled by the preferences of the owner of the device/grid element, wherein the owner may include Consumers, Businesses, or any Commercial Enterprise that has enrolled the device or grid element in a Program with a Market Participant to participate in the programs for compensation or reduction in rates charged, loyalty/rewards or combinations thereof. By having the ability to set individual set points, time constraints, operational parameters or Program choices, the Market Participant is able through the application to have a firm block of load curtailment and/or supply that the Market Participant can bid to the Market within the parameters set forth in the Profiles that were incorporated by Provisioning. In its most basic form, the Provisioning layer verifies the operation of the device or grid element prior to its acceptance and operation by the system.

The system also preferably includes at least one remote terminal unit that function to control assets for an energy management system (EMS), the at least one remote terminal unit being operable to control assets using proprietary client software or web-based client software.

In preferred embodiments of the present invention, the system is operable for providing revenue grade metrology for real-time, near real-time, or the timing required by the grid operator entity for generating operating reserves for grid stability.

Before providing additional detailed exemplary embodiments that are in accordance with the present invention, note that the embodiments reside primarily in combinations of system and apparatus components, and method steps, all related to actively managing power load on an individual subscriber basis and optionally tracking power savings incurred by both individual subscribers and an electric utility or other market participant. Accordingly, the systems, apparatus, and method steps components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

Power Distribution Engineering: Fundamentals and Applications, James J. Burke, Marcel Dekker, Inc., NY (1994), describes basic power electric power systems, including distribution and transmission throughout an electric power grid, and grid elements and basic functionality of grid elements, is incorporated herein by reference in its entirety. Also, acronyms and abbreviations and definitions for terms related to electric power grids and systems and grid elements associated therewith, and regulations and authorities related thereto, are known in the art, and are also defined in the book Creating Competitive Power Markets: the PJM Model, Jeremiah D. Lambert, Pennwell (2001), and are incorporated herein by reference.

As set forth hereinbelow, the following terms are intended to be interpreted as follows: A grid element is any load-consuming or power-consuming device, power supplying device, transmission or distribution element, meter device, remote terminal unit (RTU), telemetry element, or control device that is required for grid reliability or grid stability; grid elements can receive and/or initiate or transmit messages within the system, and can function independently or as a group. Loads can be resistive, inductive or combinations. Preferably, all grid elements are operable to do at least one of the following: receive and/or initiate or transmit IP-based messages, communicate with other grid elements and/or the server and/or the coordinator, and accumulate settlement messages in intervals required by the grid operator or for providing operating reserves.

The aggregation of the longstanding, unmet needs in the relevant art is the basis for new innovation, including solutions offered by the present invention, having systems and apparatus components that include the following attributes:

a. The system, apparatus, methods and devices utilize standards based OSI Layer 1-3 communications protocols with a plurality of security encryption methods.
b. The communication layer is Internet Protocol based such that the instructions, commands, measurements and telemetry is transmitted via Ethernet, first generation wireless communications methods (analog or digital), second generation communications methods such as Code Division Multiple Access (1×RTT), Enhanced Data Rates for GSM Evolution (EDGE), third generation protocols such as Evolution for Data Only (EVDO), High Speed Packet Access (HSPA), Fourth Generation protocols Long Term Evolution (LTE), IEEE 802.11 (X) "WiFi" or any derivative standard approved by the IEEE, International Telecommunications Union or any domestic or international standards body or any proprietary protocols that can operate in near real time and contain an Internet Protocol packet for the transmittal of their command, control, telemetry, measurement, verification or settlement information.
c. The command and control for the purpose of (b) can be created and controlled from a centralized processor, a distributed processing apparatus, or at the device level.
d. The aggregation of these methods result in the creation of real time load curtailment that may be classified broadly as "Demand Response" but largely create Operating Reserves as defined by NERC, FERC, and/or any other governing body that regulates the operation of an electric power grid and/or utilities or other market participant providing power to an electric power grid.

The following descriptions and definitions are included herein for the purpose of clarifying terms used in the claims and specification of the present invention, in addition to explanation of the relevant prior art, including the PRIOR ART figures and those figures illustrating the present invention.

Figure 1A:
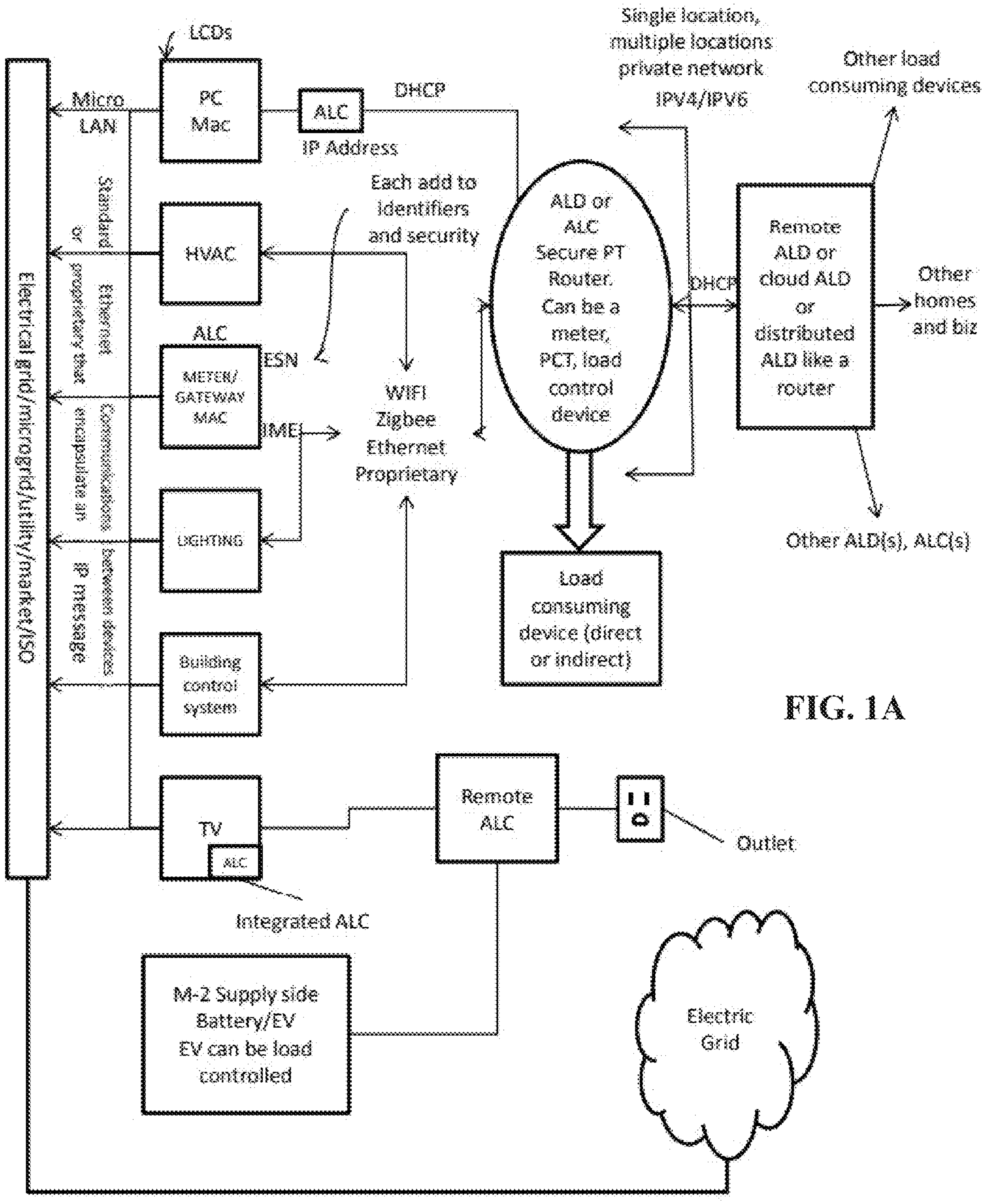
FIG. 1A illustrates a schematic diagram of an IP-based active power load management system in accordance with an exemplary embodiment of the present invention.
Figure 1C:
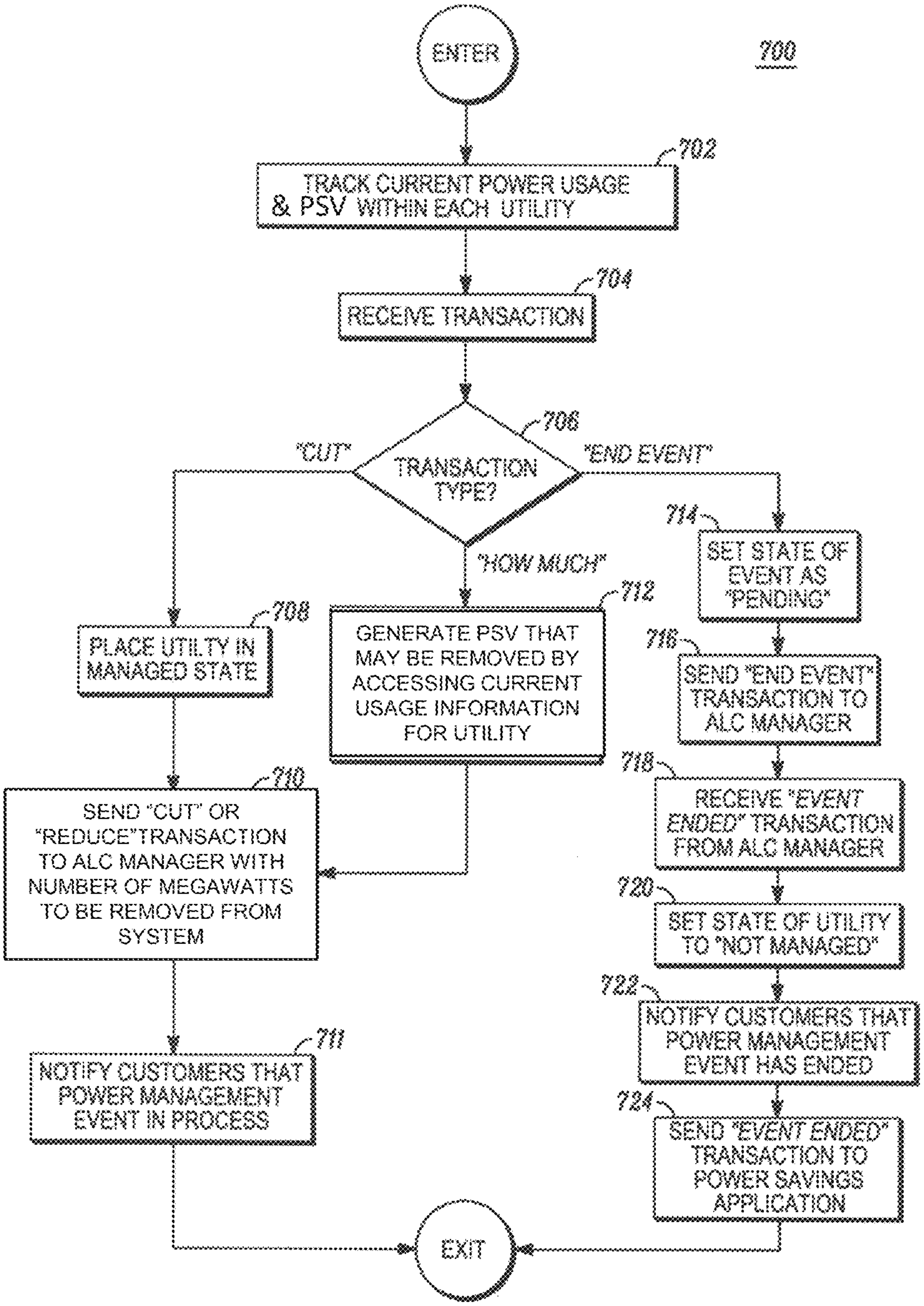
FIG. 1C illustrates a flow diagram of methods according to the present invention for tracking power usage and power supply value (PSV) generation.
Figure 1D:
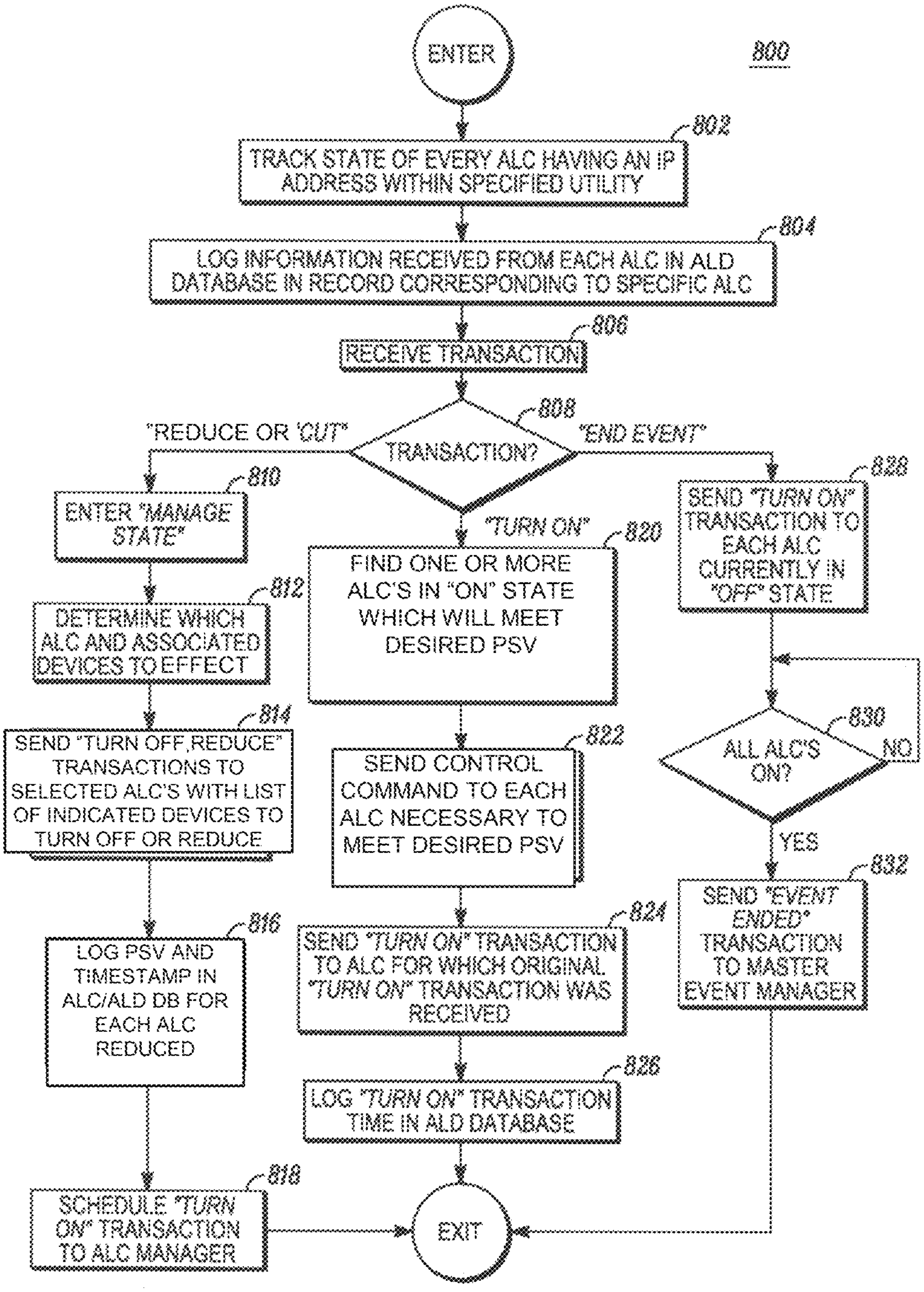
FIG. 1D illustrates a flow diagram of methods according to the present invention for tracking state of ALCs having an IP address within an electric power grid system.
Figure 2:
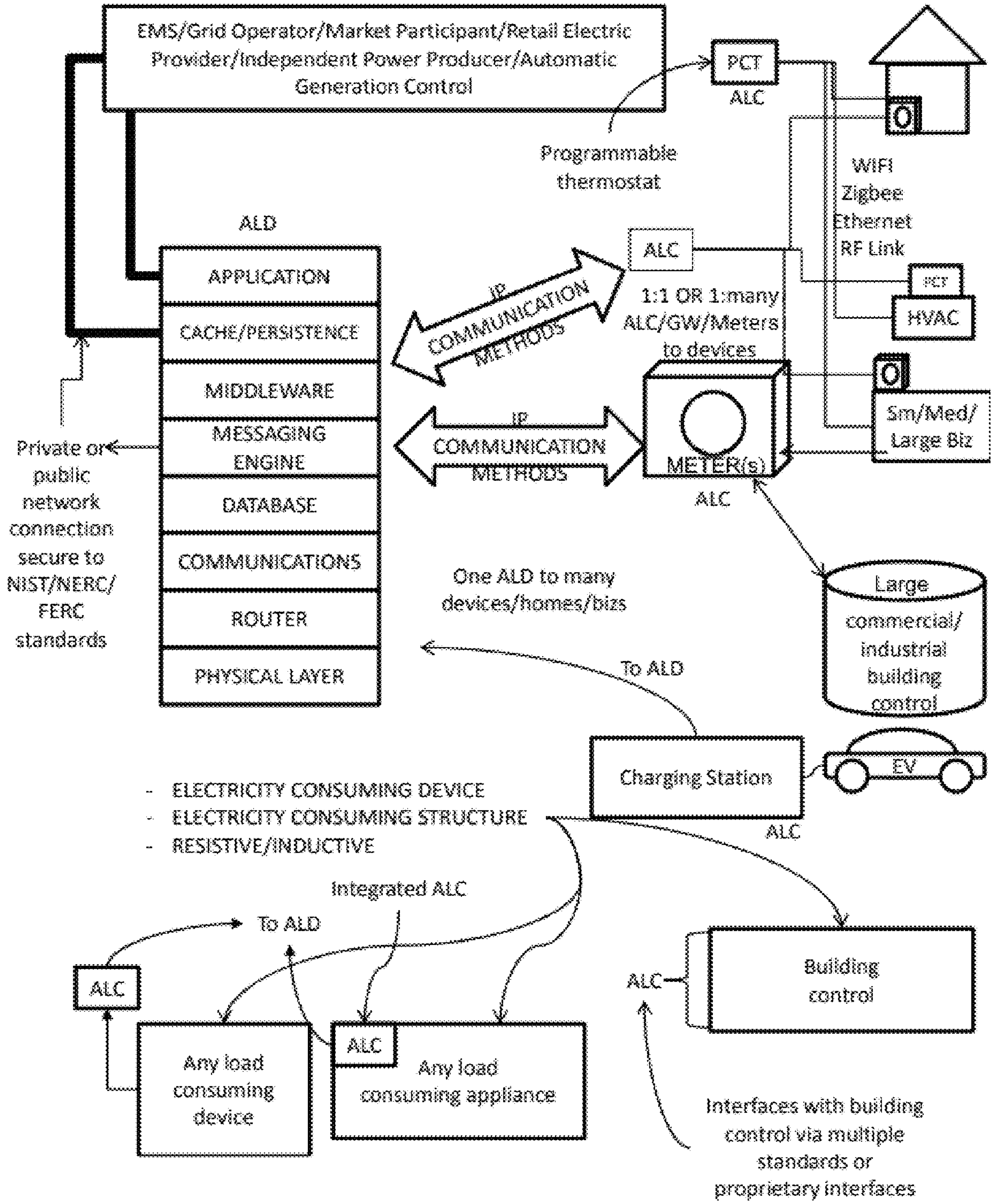
FIG. 2 is a schematic diagram illustrating an exemplary system arrangement for conservation voltage reduction.

By way of introduction to the present invention, FIG. 1A illustrates a schematic diagram of an IP-based active power load management system in accordance with an exemplary embodiment of the present invention. This diagram shows analogies for how load-consuming devices are addressable by an active load director (ALD), by comparison to communication networks such as the Internet. FIG. 1B provides a schematic diagram illustrating an exemplary active load client (ALC) smart meter use case example according to the present invention, wherein the ALC is shown as a component of the system of FIG. 1A. FIG. 1C illustrates a flow diagram of methods according to the present invention for tracking power usage and power supply value (PSV) generation, which is an important component of embodiments of the present invention, as will be described in more detail in the specification hereinbelow. In other method steps for the present invention, FIG. 1D illustrates a flow diagram of methods according to the present invention for tracking state of ALCs having an IP address within an electric power grid system. FIG. 2 is a schematic diagram providing an overview of an IP-based active energy management system (EMS) in accordance with the present invention, including components of ALC, ALD, IP-based communication, load control devices and power consuming devices, which are described in more detail in the following specification. As illustrated, the EMS/Grid Operator/Market Participant/Retail Electric Provider/Independent Power Producer/Automatic Generation Control component(s) of the system of the present invention are in networked communication with ALD(s) via IP-based communication methods, for communicating load control events to control devices and/or ALCs for managing load consumed by power consuming devices. A variety of system elements are illustrated for exemplary purposes, to show the interaction between the power generation or source provider and the power consuming devices. Notably, many devices may be constructed and configured for communication through the ALD such that they are controlled by an EMS, as illustrated in these figures, in particular in FIG. 2.

Figure 3:
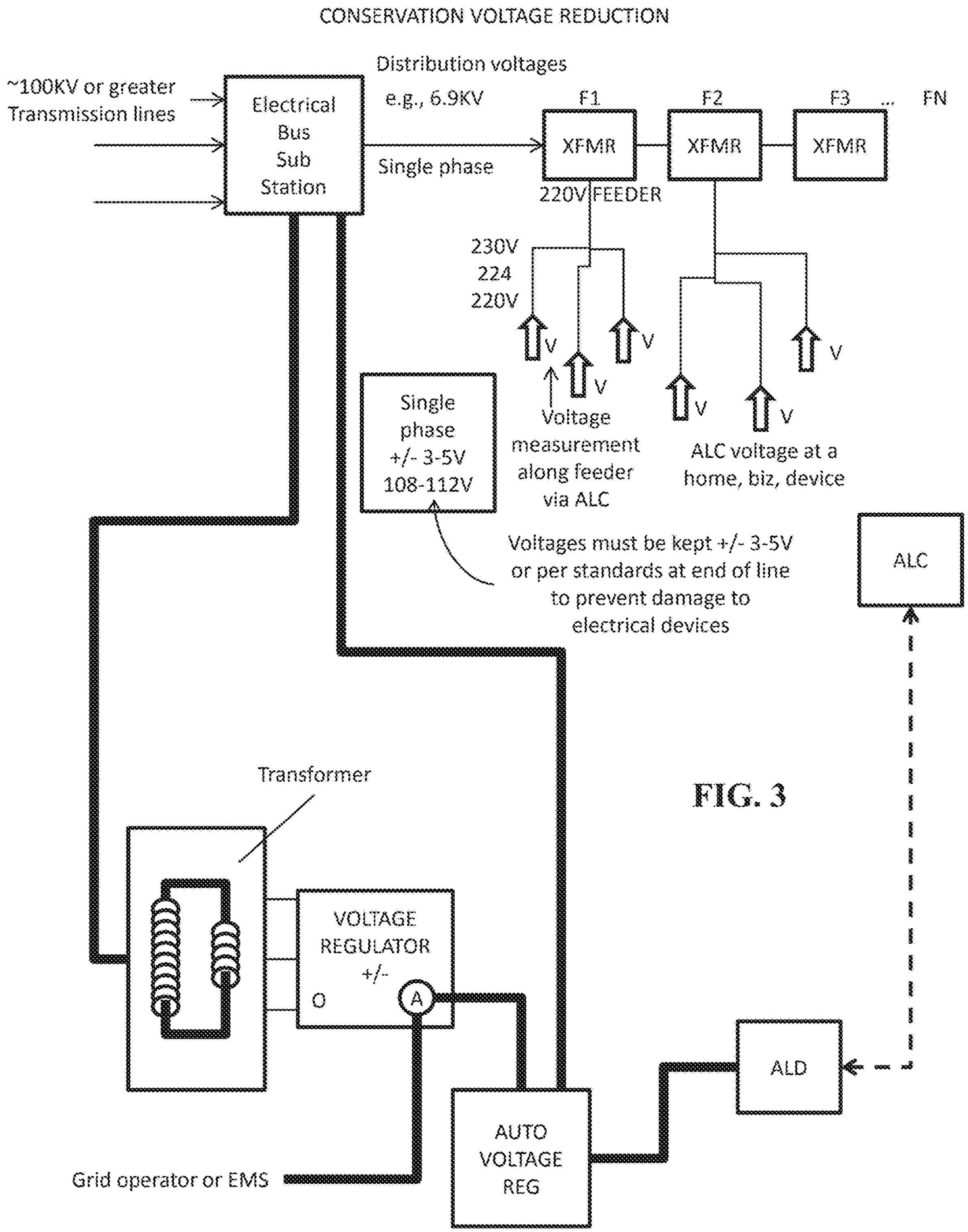
FIG. 3 is a schematic diagram an IP-based active energy management system in accordance with the present invention, including components of ALC, ALD, IP-based communication, load control devices and power consuming devices.

In another aspect of factors addressed by the present invention, FIG. 3 is a schematic diagram illustrating an exemplary system arrangement for conservation voltage reduction (CVR). Transmission lines, illustrated on the left side of the diagram, transfer electric power from the power generation source, which may be a utility, to an electrical bus or substation, where it is transformed to provide distribution voltages (e.g., about 6.9 kV in this example and single phase) to additional transformers, indicated as F1, F2, F3, . . . FN, where voltage measurement along the feeder via ALC(s). Under current standards, voltages must be kept at between about +/−3% and about +/−5%, but in any case maintained as required by standards, for final distribution at the end of the line to prevent damage to power consuming devices. The ALCs preferably transmit voltage information and line loss information to the ALD(s). The ALD establishes a phase/voltage "locked" loop to automatically control the voltages so that the CVR creates megawatts of operating reserves according to the methods and systems of the present invention.

Also, by way of introduction to the commercial application of the present invention, considering basic operations of the electric power grid is helpful, in conjunction with the PRIOR ART figures referenced herein. PRIOR ART FIG. 4 is a schematic diagram illustrating generation, transmission, distribution, and load consumption within a traditional electric power grid. PRIOR ART FIG. 5 is a schematic diagram illustrating traditional transmission systems that connect to electric power sources to distribution facilities, including smart metering and advanced metering.

PRIOR ART FIG. 6 is a schematic diagram illustrating power generation or supply balancing with customer demand for electric power within a grid. PRIOR ART FIG. 7 is a schematic diagram illustrating balancing areas and their interaction for power generation or supply balancing with customer demand for electric power within a grid, where utilities are connected by transmission lines and balancing areas. PRIOR ART FIG. 8 is a schematic diagram illustrating regions and balancing areas and their interaction for power generation or supply balancing with customer demand for electric power within a grid. These balancing areas (BAs) provide for opportunities for the electric power grid and/or a multiplicity of grids that are constructed and configured for networked communication and power distribution therebetween. One of the main reasons for collaboration across BAs is illustrated by PRIOR ART FIG. 9, showing a graphic illustration of daily load shape and base load for electric power grid operations, including sufficient operating reserves to address peak load conditions. A single grid or sector within a grid may not be operable to manage its operating reserves through curtailment or additional generation, in particular according to time requirements, as shown in PRIOR ART FIG. 10, where operating reserves are indicated as having different types of responsiveness required for generation and operation of an electric power grid. By way of further explanation, PRIOR ART FIG. 11 bar graph shows applications of operating reserves of different types and communications networks and timing for control events. Finally, PRIOR ART FIG. 12 illustrates balancing resources within an electric power grid, including grid stability elements of frequency.

The present invention systems and methods provide hereinbelow for power trade blocks (PTBs) for facilitating the collaboration across balancing areas and regions. In preferred embodiments of the present invention, at least one PTB is introduced and/or provided to the electric power grid, including method steps of: valuing, trading, selling, bartering, sharing, exchanging, crediting, and combinations thereof. Thus the present invention provides for electric trading market across BAs or microgrids or individual load consuming customers.

Telemetry, measurement, verification, PSV, and other factors described herein, in compliance with FERC 745, provide with the present invention the capacity for customers providing curtailment as operating reserves to be compensated for megawatts at the clearing price. Clearing prices are either determined by many attributes including their location of where the power is delivered or accepted by a generator of power or a purchaser of power. The term "Locational Marginal Pricing (LMP)" refers to a node where power is either delivered from a generator or accepted by a purchaser. A node corresponds to a physical bus or collection of buses within the network or any other geodetically defined boundary as specified by the governing entity. A load zone is defined as an aggregation of nodes. The zonal price is the load-weighted average of the prices of all nodes in the zone. A hub is defined as the representative selection of nodes to facilitate long-term commercial energy trading. The hub price is a simple average of LMPs at all hub locations. An external or proxy node is defined as the location that serves as a proxy for trading between ISO-Balancing area and its neighbors.

For vertically integrated utilities that do not have open markets as ISOs, their delivery or acceptance of power can occur at their boundaries of their "Balancing Area", which is defined as the geography where their transmission and distribution system extends and is subject to grid stability maintained by that utility. Balancing Authority boundaries can also be delivery points or (LMP) pricing points. It should be noted that vertically integrated utilities are subject to the same FERC and NERC rules as decoupled utilities in ISOs, except in vertically integrated utilities, local public utility commissions have more authority to enforce and enhance rules since the rate base is being charged for improvements to the grid within the balancing area (BA) that the utility serves. FIG. 17B is a table illustrating three FERC orders and their applicability to the electric power grid load management addressed by the present invention. The trend in the world market is to inject market forces to utilities such that they must follow new FERC rules that permit the use of demand response technologies/load curtailment technologies to promote the need for fewer large scale, primarily fossil fuel power plants.

Power is generally traded in terms of "Capacity" the reserved peak amount of power that a generator agrees to reserve for the utility, market participant, or REP; and "Energy" is defined as the amount of power consumed by the utility, market participant, REP or any entity that is authorized to buy, sell or distribute power for the electric power grid, consumers, particularly commercial accounts, also purchase power in this manner. Energy is settled on the wholesale market in "MegaWatt Hours", which is defined as one (1) million watts of electricity consumed at a metering point, or interchange of power such a LMP, transmission tie point between two utilities, a commercial customer large enough to consume such an amount, a utility (generating or distributing) or a market participant including a REP that generally purchases the power from a generating utility and utilizes the distribution network to supply its power purchased at the wholesale level and distributes its power to end consumers/customers generally in smaller increments of measurement "kilowatt hours (kWH)." These increments are important due to the introduction of programs involving utilizing curtailment technologies enabled by FERC Order 745 whereby utilities, market participants, REPs and CSPs may aggregate their curtailment/DR in increments of "kW-representing a capacity figure" and "kWH" which represents avoided energy. Peak "capacity" charges are settled based upon intervals whereby the instantaneous peak (kW/MW) determines the "capacity" charge.

In 2011, FERC issued a series of orders that have had a pronounced impact on the injection of new technologies, particularly distributed load resource, curtailment, demand response technologies, to the market to be implemented across all of the US and with direct applicability to World markets. FERC Order 745, issued Mar. 15, 2011 and adopted April 2011, and which is incorporated herein by reference in its entirety, provides that utilities, market participants, CSPs, REPs or any other entity that can aggregate a minimum trading block of power that can be accepted into the market, BA, or utility service area or regional trading area (RTO) must be compensated for such curtailment/load resource and demand response technology at the clearing price at the nearest LMP as though it was generation. Said plainly, "Negawatts" have the same value as "Megawatts." Controversial, particularly to those utilities that still have the antiquated practice of rate base recovery of assets to insure profits, the conditions of which these "Negawatts" are compensated as "Megawatts" place a high value on those curtailment/load resource/demand response technologies that can create utility Operating Reserves for the benefit of grid stability. Operating Reserves, previously defined, come in different capacity and energy products or their equivalencies in the case of curtailment/load resources/demand response and are compensated at the nearest LMP based upon their ability to perform to the same level of measurement, verification, responsiveness (latency) and settlement as generation. This high standard has the practical effect of rewarding those advanced technologies that can perform as generation equivalencies (load resources), while still allowing capacity products (traditional and advanced demand response) to also participate in the market and perform the valuable function of providing capacity and energy resources without the need for transmission losses (avoided power avoids transmission of kWH/MWH to the endpoint, therefore freeing up transmission and distribution lines to carry power elsewhere where it is needed). It should be noted that most utilities do not have accurate measurements of distribution losses below their electrical bus (substation levels) and as such high performance, IP based ALCs/service points that allow this information to be brought forward to the utility operations promote the Operating Reserves and "Negawatts" and add to their value.

Related U.S. patents and patent applications, including U.S. application Ser. No. 13/172,389, filed Jun. 29, 2011, which is a continuation of U.S. application Ser. No. 12/715,195, filed Mar. 1, 2010, now U.S. Pat. No. 8,032,233, which is a divisional of U.S. application Ser. No. 11/895,909 filed Aug. 28, 2007, now U.S. Pat. No. 7,715,951, all of which are incorporated herein by reference in their entirety; these documents include descriptions of some active load management within power grids, and provide additional background and context for the present invention systems and methods.

Also, in this document, relational terms, such as "first" and "second," "top" and "bottom," and the like, may be used solely to distinguish one entity or element from another entity or element without necessarily requiring or implying any physical or logical relationship or order between such entities or elements. The terms "comprises," "comprising," or any other variation thereof are intended to cover a non-exclusive inclusion, such that a process, method, article, or apparatus that comprises a list of elements does not include only those elements, but may include other elements not expressly listed or inherent to such process, method, article, or apparatus. The term "plurality of" as used in connection with any object or action means two or more of such object or action. A claim element proceeded by the article "a" or "an" does not, without more constraints, preclude the existence of additional identical elements in the process, method, article, or apparatus that includes the element.

By way of definition and description supporting the claimed subject matter, preferably, the present invention includes communication methodologies for messaging via a communication layer. IP-based communications over a network are most preferred. Correspondingly, and consistent with the communication methodologies for messaging according to the present invention, as used throughout this specification, figures and claims, the term "ZigBee" refers to any wireless communication protocol adopted by the Institute of Electronics & Electrical Engineers (IEEE) according to standard 802.15.4 or any successor standard(s), the term "Wi-Fi" refers to any communication protocol adopted by the IEEE under standard 802.11 or any successor standard (s), the term "WiMax" refers to any communication protocol adopted by the IEEE under standard 802.16 or any successor standard(s), and the term "Bluetooth" refers to any short-range communication protocol implementing IEEE standard 802.15.1 or any successor standard(s). Additionally or alternatively to WiMax, other communications protocols may be used, including but not limited to a "1G" wireless protocol such as analog wireless transmission, first generation standards based (IEEE, ITU or other recognized world communications standard), a "2G" standards based protocol such as "EDGE or CDMA 2000 also known as 1×RTT", a 3G based standard such as "High Speed Packet Access (HSPA) or Evolution for Data Only (EVDO), any accepted 4G standard such as "IEEE, ITU standards that include WiMax, Long Term Evolution "LTE" and its derivative standards, any Ethernet solution wireless or wired, or any proprietary wireless or power line carrier standards that communicate to a client device or any controllable device that sends and receives an IP based message. The term "High Speed Packet Data Access (HSPA)" refers to any communication protocol adopted by the International Telecommunication Union (ITU) or another mobile telecommunications standards body referring to the evolution of the Global System for Mobile Communications (GSM) standard beyond its third generation Universal Mobile Telecommunications System (UMTS) protocols. The term "Long Term Evolution (LTE)" refers to any communication protocol adopted by the ITU or another mobile telecommunications standards body referring to the evolution of GSM-based networks to voice, video and data standards anticipated to be replacement protocols for HSPA. The term "Code Division Multiple Access (CDMA) Evolution Date-Optimized (EVDO) Revision A (CDMA EVDO Rev. A)" refers to the communication protocol adopted by the ITU under standard number TIA-856 Rev. A.

It will be appreciated that embodiments of the invention described herein may be comprised of one or more conventional processors and unique stored program instructions that control the one or more processors to implement, in conjunction with certain non-processor circuits, some, most, or all of the functions for managing power load distribution and tracking individual subscriber power consumption and savings in one or more power load management systems as described herein. The non-processor circuits may include, but are not limited to, radio receivers, radio transmitters, antennas, modems, signal drivers, clock circuits, power source circuits, relays, meters, smart breakers, current sensors, and user input devices. As such, these functions may be interpreted as steps of a method to distribute information and control signals between devices in a power load management system. Alternatively, some or all functions could be implemented by a state machine that has no stored program instructions, or in one or more application specific integrated circuits (ASICs), in which each function or some combinations of functions are implemented as custom logic. Of course, a combination of the two approaches could be used. Thus, methods and means for these functions have been described herein. Further, it is expected that one of ordinary skill in the art, notwithstanding possibly significant effort and many design choices motivated by, for example, available time, current technology, and economic considerations, when guided by the concepts and principles disclosed herein, will be readily capable of generating such software instructions, programs and integrated circuits (ICs), and appropriately arranging and functionally integrating such non-processor circuits, without undue experimentation.

Recently, the IEEE and ITU have released improved WiMax and Long Term Evolution wireless standards that have facilitated the consideration of new technologies to improve the response and control of power load control devices employing smart breaker and smart disconnect switches that include advanced smart meters where IP multimedia gateways are embedded or attach as separate connected printed circuit boards, submetering technologies that possess sufficient "revenue grade" metrology such that the measurements provided by these devices may be accepted for settlement purposes. The term "revenue grade" is an industry term, as will be appreciated by one of ordinary skill in the art, a percentage of accuracy determined by ANSI, which means that power measurement must be within ½% of the actual value being consumed. Thus, calibration standards are provided accordingly to OEMs of power measuring devices and/or chips. In embodiments of the systems and methods of the present invention, these calibration standards are met via components including a chipset and related software, and the transmittal of the power measurement information via IP-based communications as set forth hereinabove. Baselining techniques that provide a reference power usage point, sampling techniques that allow for verification of the power "state" and power consumption data for electricity consuming devices (inductive or resistive), reactive power, Power Factor, start-up current, duty cycles, voltage, consumption forecasts and most importantly real-time or near real time power measurement sampling, etc. are required to derive a Power Supply Value (PSV) that includes an American National Standards Institute (ANSI), ISO, grid operator, governing body revenue measurement, etc., which is preferably aggregated to reach the size of at least a single Power Trade Block (PTB) unit for the purposes of optimally monetizing the active load management from the customer perspective. PTBs are dependent on a grid operator, regional transmission operator, or independent system operator to determine the capacity size (in kW or MW) or energy data in (kWH or MWH) that can be accepted for bidding, trading, settlement by the utility, the end consumer/customer, the market participant, the CSP, demand response aggregator or any entity authorized by the government entity that regulates grid operators such as FERC, NERC etc. Generally due to measurement, verification, transmission and/or distribution modeling (which considers the impact to the grid from the curtailment activities at any geodetic location on the grid, but generally modeled by electrical bus or substation), the minimum acceptable PTB is 100 kW at the time of the present invention. This limitation is not expected to be permanent, given these advancements in measurement/verification, the near real time or real time IP/Ethernet based telemetry capabilities presented by a plurality of various communications methods as discussed in this embodiment and the advancements in service oriented architecture based (SOA) software and hardware subsystems, when combined with an ALD and ALC that can perform at a sublevel such that the minimum PTB can be determined at the device, home, building, service point, commercial, industrial, transformer, feeder, substation, transmission line and any sub-point along the transmission and distribution feeder system of an electrical grid as so long as minimum telemetry, measurement, verifications, validation are met and are capable of being aggregated to a minimum PTB acceptable to the grid operator, ISO, RTO, BA or any other increment of grid topography used now or in the future for settling power block increments by sub-PTB.

Embodiments of the present invention expand upon and enhance prior technologies by, among other things, employing WiMax, High Speed Packet Access (HSPA), Evolution for Data Only (EVDO), both considered 3$^{rd}$ generation wireless standards, Long Term Evolution (LTE) and its derivative standards, IEEE 802.11 (X) also known as "WiFi" and its derivative standards inclusive of "Muliple Input Multiple Output" (MIMO), as set forth in the communication methodologies hereinabove, a plurality of proprietary mesh and point to point communications solutions or any Internet Protocol (IP)-based load control in a system with the ability to monitor and measure, in real time or in sufficient time increments to satisfy the telemetry performance standards as established by the Government or governing bodies (ex: National Electric Reliability Corporation (NERC), the Federal Energy Reliability Commission (FERC) the amount of power deferred, conserved or removed (or carbon, $SO_2$, or $NO_2$ eliminated), such as by way of example the Kyoto or Copenhagen Protocols that set up carbon credits. These improvements allow new options for electric utilities or any market participant to defer or invest in new power generation that is friendlier to the environment.

IP-based power management is advantageous over existing systems for many reasons. This is particularly true for communications and control that employ Internet Protocol Version 6 (V6) whereby each load consuming device (ALC), meter, load control device, programmable thermostat (PCT), building control system or any device utilized for the measurement and control of power, and/or derivation of PSV and/or PTB for the purpose of power management can have its own static IP address, virtual private network with enhanced security, to provide for operating reserves acceptable to the grid regulator, operator, or equivalent. Revenue grade metrology and IP-communication of a unique identifier, such as by way of example and not limitation, a static IP address or dynamically assigned IP address through IP V4 to provide for a unique identifier at that time, for each of the power consuming device(s), load control device(s), and combinations thereof are critical for the real-time aggregation of PSVs to form at least one PTB corresponding to the load curtailment event. Thus, every piece of hardware having an IMEI (international manufacturer equipment identifier) and electronic serial numbers or MAC address are combinable with IP V6 so that each device has a unique identifier that provides for enhanced security and settlement. Other well established methods of secure transmission include the use of encryption "keys" widely used amongst the transmission of information between two IP based or proprietary solutions for the secure communication of PSVs, PTBs, equipment identifiers, "states", or any other grid stabilizing command, control or status message necessary to implement advanced load curtailment, load resources, or demand response for purposes of creating or aggregating individual load sources, groups of load sources, or any sub increment to create Operating Reserves and other grid stabilizing reserves that improve grid stability and operation.

For example, positive control allows a system controller to receive a response from an end device installed at a customer location, which indicates that the actual target device has turned "off" or "on", or reduced, as in the case of a variable speed inductive device or a variable power consuming resistive device whereby complete operation is not interrupted but power consumption is reduced to create the operating reserve via curtailment of some but not all of the power from the power consuming device. Additionally, each equipment identifier is unique and each IP address is either dynamically assigned when the device is activated (e.g., through use of the dynamic host configuration protocol (DHCP)) or statically assigned by the serving IP network, thereby providing enhanced security to protect against an act of random terrorism or sabotage inadvertently shutting down power services. Existing power management systems, including those utilizing radio subsystems that operate in unlicensed and uncontrolled spectrum bands such as the FCC is in bands, do not address security problems adequately and thus are more likely susceptible to hostile or malicious acts. Further embodiments of these identifiers include the use of MAC addresses, standards based encryption keys, and the normal encryption technologies that are inherent with the use of standards based communications methods such as HSPA, EVDO and LTE where packets are encrypted from the point they leave the radio base station or in some cases the router and even the application layer itself. Further embodiments include Virtual Private Network (VPN) and VPN tunnels that form virtual physical layer connections via an IP transport layer.

IP-based systems are also bandwidth or network efficient. For example, IP devices are controlled via the 7-layer Open Systems Interconnection (OSI) model whereby the payload of each packet can contain a message or "change in state" or any other message required in the previous embodiments for purposes of stabilizing, statusing and the creation of Operating Reserves for an electric grid or microgrid and does not require synchronous communication. This method of transmission (for example "UDP" communications) allows for very minimum overhead and low data rates on a broadband network. For proprietary 'mesh' networks whose bandwidth performance is very poor and an IP message may be encapsulated in a proprietary data packet that may or may not contain encryption, an efficient asynchronous communication method may be the only way to send out a plurality of messages and message type for command and control or status reporting. Additionally, IP devices can report many states that are important to an electric grid operator, market participant. These states supply compliance information necessary for the entity to receive command and control to insure the safe and reliable operation of the grid, but are also necessary for measurement, verification, telemetry, settlement and Power Supply Values to provide the information needed to comply with the grid operator's standards to deliver Operating Reserves or any Demand response products where the end results improve grid stability and will allow the consumer, utility, market participant, REP, CSP etc. to receive monetary compensation for supplying these products as contemplated in FERC Order 745. These commands, including "no power" for outage or for simple demand response compliance measured and verified at the device level, the meter level, the electrical bus level or a plurality of all the above. Furthermore, these commands are aggregated and presented to the grid operator or utility so that "many" end points can be simultaneously operated as one resource and responsive to an EMS. For example, the active load client 300 may be implemented with a battery backup mechanism to provide backup or auxiliary power to the active load client 300 when AC power is lost. In this case, when battery backup is invoked, the active load client 300 can report a "no power" condition. Alternatively, a "no power" condition may be assumed if an active load client 300 fails to timely respond to a message (e.g., a poll or other message) from the ALD server 100, particularly where multiple active load clients 300 in a geographic area fail to timely respond to the ALD server messaging or multiple UDP packets receive no acknowledgement. Because the geographic location of each customer premises and active load client 300 may be known at the time of installation or thereafter (e.g., using GPS coordinates), such network outages may be located on a per meter basis, or per load consuming device basis.

A multiplicity of use cases for communications is provided under the systems and methods of the present invention. Messaging under the present invention includes any and all commands, queries, etc. that relate to the profiles of the devices, "health" of the grid, status information, etc. Profiles automatically drive what is started, when, for controlled restart, rather than only controlled restart commanded by the utility; the present invention provides for either the profiles and/or the utility to communicate for command and control, in particular for providing for grid stability.

Further embodiment allows the ALD server to provide prior to the loss of communication or power a set of profiles or commands to be executed at the ALC level such that they operate autonomously providing the operating reserves that the grid operator or utility desires, storing the measurement and verification information for transmittal later, or in the case of a power loss, very precise "re-start" procedures such that the simultaneous impact of a power restoration from a grid operator does not have the adverse effect of overloading the generation and distribution system. These embodiments of a "controlled restart" may also apply to a Customer Profile where the most mission critical devices at a consumer location are prioritized, known to the utility via a Power Supply Value and other load characteristics such as power factor, voltage, current, reactive power or any other grid stabilizing metric that is reported historically by the ALC such that the grid operator OR the customer can use these autonomous profiles, autonomous ALCs and memory in same to create "microgrids" that autonomously operate independent of the macro-grid operator and provide grid stablizing load resources to those consumers that are isolated via the microgrid where other supply sources that can power and operate the microgrid either under the operation of a computer controlled system and apparatus or a separate utility or microgrid operator exists and may operate autonomously until communication with a host ALD is re-established.

One of the most beneficial advantages of an IP-based power management system, as provided in one embodiment of the present invention, is accurate reporting of the actual amount of power available for the creation of Operating Reserves via a distinct PSV value at the time the reserves are needed, a forecast of Power available via the customer profiles due to a plurality of methods that include known "expected" behavior of customer and load consuming devices, the baseline methods previously described, and the ability to allocate different types of operating reserves based upon the Grid Operator, CSP, MP, Utility, and equivalent's needs at the given condition of the grid as well as power saved by each customer on an individual basis. Embodiments of the present invention monitor and calculate precisely how many kilowatts (or carbon credits) are being generated or saved per customer instead of merely providing an estimate. These values are stored in a Power Supply Value (PSV), wherein the historical consumption, the real time consumption, the baseline consumption data as provided by standards supplied by the governing body (NAESBY, FERC, NERC) establish the PSV that is used for transmitting via the IP message the information necessary for grid stabilizing operating reserves. Furthermore, embodiments of the present invention provide means for tracking the actual amount of deferred load and pollutants according to generation mix, serving utility and geographic area. These deferred pollutants are recognized as "Renewable Energy Credits" as exemplified by the recently passed North Carolina Law known as Senate Bill 567, where these PSV derived "Negawatts" count towards a generating and distributing utilities obligations for supplying renewable energy as a percentage of their total generation mix. According to the present invention, if device curtailment is measured, verified, settled within the parameters established, then utility can accept the supply that would have been available in the case of curtailment event, then renewable energy credits are available to the consumer/device, i.e., megawatts equal renewable energy credits.

The present invention provides systems and methods for managing power supplied over an electric power grid by an electric utility and/or other market participants to multiple power consuming devices, each of which having a Power Supply Value (PSV) associated with its energy consumption and/or reduction in consumption. Preferably, according the systems and methods of the present invention, generation of the PSV includes estimating and/or baselining. Furthermore, PSV applications for carbon credits may be geodetically dependent, measured, or computed based upon electricity consumed from a source; for carbon credits, PSV is then based upon fossil fuel electricity eliminated through efficiency, reduction and baselining, provided that the PSV is measurable and verifiable.

Power flow to the power consuming devices is selectively enabled, reduced and disabled by one or more controllable devices controlled by the client device measured with PSV accuracies that are able to be recognized by the governing bodies within revenue grade metrology such that the ALC becomes in essence a sub-meter with PSV values that can report over the IP connection a plurality of states necessary for grid stability and control over each ALC via the ALD such that each distribution point on the grid may be stabilized at each point of the distribution or transmission system to effect grid stabilization holistically rather than reacting to conditions as they occur. Power control messages from a controlling server indicate amounts of electric power to be reduced and/or Operating Reserves to be created and an identification of at least one controllable device to be instructed to disable, reduce or consume more a flow of electric power to one or more associated power consuming devices depending on the type of Operating Reserves needed at the time of activation by the ALD through the IP connection to the associated ALC to create the desired Operating Reserve or grid stabilizing reserves. Notably, the power control commands include a power inquiry command requesting the server to determine an amount of electric power available (PSV) for temporary reduction or increase from supply or adding to supply (for example, Auto Reg up for regulating/serves/Reg Down) by a requesting electric utility, market participant or electric power grid operator(s) and wherein the command processor issues an associated power control event message responsive to the power inquiry command, the server further comprising: a database that stores current power usage information for the at least one electric utility or electric power grid operator(s), wherein the event manager accesses the utility database responsive to receipt of the associated power control event message and communicates a response to the power inquiry command indicating the amount of power available for temporary reduction based on the current power usage information and the corresponding Power Supply Value derived or generated therefrom. This polling command also functions as an "alert" to provide the power consuming device via the ALC to report the PSV, state, reactive power, voltage, current, or any other grid stabilizing metric to the ALD such that the ALD can by electrical bus, by regional transmission organization, by Balancing Authority, by microgrid, by individual consumer or by individual transformer or any other system at any point on the distribution system of the grid or microgrid a plurality of information such that the ALD can prioritize the order, the type of curtailment, reduction in power or profile to effect to stabilize the grid or microgrid or to supply the utility, REP, market participant, CSF or other an instantaneous and accurate snapshot of the available resource for dispatch and to prepare the ALC to look for a priority message delivered via an IP flag or specially formatted message so that the message combined with the Alert has the grid stabilizing effect. Thus, the present invention systems and methods provide for creation of the grid stability product and/or operating reserve; messaging is used for status, grid "health", down to device level.

In preferred embodiments of the present invention, operating reserve messages are prioritized over network, including over other traffic on the network. Furthermore, priority messaging is further includes so that on standards-based or proprietary communications networks that have sufficient speed, measurement (PSV) and are responsive to an EMS that have network priority over other packets, such that emergency and/or critical infrastructure protection power management commands receive priority over any other power control commands, to transmit those messages over other non-critical traffic.

In one embodiment of the present invention, a system for managing power on an electric power grid that is constructed and configured for supplying and receiving power from a multiplicity of sources, where the power flows to a plurality of power consuming devices or is generated by a plurality of power generation and storage solutions that are enabled and disabled by a plurality of controllable devices, wherein the system includes: a server comprising a command processor operable to receive or initiate power control commands and issue power control event messages responsive thereto, at least one of the power control commands requiring a reduction or increase [more detail for regulating reserves here] in an amount of electric power consumed by the plurality of power consuming devices; an event manager operable to receive the power control event messages, maintain at least one power management status relating to each client device and issue power control event instructions responsive to the power control event messages that may be initiated from a market participant, a utility, or an electric grid operator; a database for storing, information relating to power consumed by the plurality of power consuming devices and based upon the amount of power to be reduced to each of the power consuming devices, generating a first power supply value (PSV); and a client device manager operably coupled to the event manager and the database, the client device manager selecting from the database, based on the information stored in the database, at least one client device to which to issue a power control message indicating at least one of an amount of electric power to be reduced or increased and identification of at least one controllable device to be instructed to disable a flow of electric power to one or more associated power consuming devices responsive to receipt of a power control event instruction requiring a reduction in a specified amount of electric power; the plurality of controllable device and corresponding device interfaces facilitating communication of power control instructions to the controllable devices, the power control instructions causing the at least one controllable device to selectively enable and disable a flow of power to the power consuming device(s); and a device control manager operably coupled to the controllable device interfaces for issuing a power control instruction to the controllable devices through the controllable device interfaces, responsive to the received power control message, the power control instruction causing the controllable device(s) to disable a flow of electric power to at least one associated power consuming device for reducing consumed power, and based upon the reduction in consumed power, generating a second power supply value (PSV) corresponding to the reduction in consumed power.

This embodiment may further include a combination of a processor, database, event manager, preferences manager and market conditions to include price of electric power, grid stabilization events and location of customer relative to the grid operator's generation, transmission, and distribution elements would effect a change on the electric grid by a change in the power consuming devices utilizes some or all of the information provided by the grid operator, market participant, or utility to automatically or manually through a plurality of communications methods (smart phone, computer, text response, phone message) elect to curtail or consume power to effect a change to the normal operation of a plurality of power consuming power devices in exchange for credits, economic/monetary incentives, rewards programs, or carbon/green credits. This provides that a customer receives a real time or near real time signal from a grid operator that alerts them to an economic event that would allow them to make substantial compensation for curtailing or accepting power at that minimum time interval for both reporting and responding as established by the governing entity. This is real-time pricing for grid stress/stabilization or very high commodity pricing.

Preferably, market pricing conditions via a customer profile that can be loaded to a smart phone or moreover a profile that automated controls based upon previously selected economic messages.

Embodiments of the present invention include an exemplary system for supporting a serving utility or power distributor (e.g., such as a municipality, electric cooperative, or any other wholesale or retail producer of electric power, and/or any market participant associated with electric power consumption, reduction of consumption, and/or supply, and combinations thereof), methods for providing continuous, real time active power control in the system, and a method for determining how much actual load may be controlled at any given time for the purposes of conservation, alternative power generation and the creation of carbon (and other gaseous emissions) credits, which are all under the authority of grid operator, governing authority, or equivalent, and based upon corresponding regulations such as by way of example and not limitation FERC, NERC, etc.

Additional embodiments of the present invention provide a system that implements the exemplary methods through the unique use of load information, location of customers consuming electricity, changes in state of controlled devices, current sensing, customer set points/preferences and artificial intelligence (e.g., as implemented through software) to optimize the presentation of load available to the serving utility for control.

Generally, the embodiments disclosed in the present invention are directed towards the real time (active) control of residential and commercial electrical devices that generally are 240V or less. However, specific features and functions may also be applicable to larger commercial installations that are greater than 240V. The description herein is intended to provide a practical implementation of real time load management for either voluntary or involuntary participants over large geographies and ideally for many serving electrical power producers, wholesalers or distributors. The exemplary methods and systems disclosed in the present invention may be implemented by an individual utility provider, or a third party monitoring service that tracks and manages power loading for one or more utilities. This application describes the necessary methods and generally describes software subsystems for both a host function (e.g., an active load director (ALD) server) and a companion active load client (ALC).

One embodiment of the present invention controls power distribution for a variety of electric utility companies or any other electric power grid operator(s) by actively monitoring the amount of power needed by each utility and supplying the required power by redirecting power from participating customers. In this embodiment, customers agree to allow the power management system to disable certain power-consuming devices during peak loading times of the day. Smart breakers, load control switches (submetering ALCs) or any other device that can be interfaced or added within an electric consuming device or added at the point where the electric consuming devices receives power from a wall socket or any other electrical connection which have the ability to be switched on or off remotely, are installed for specific devices in an electric service control panel accessed by a known IP address. Alternatively, IP-addressable smart appliances may be used. The power management system determines the amount of steady-state power each device consumes when turned on and logs the information in a database for each subscriber. For example, a current sensor on each smart appliance or within each smart breaker or power measurement circuit that is incorporated in the device that serves as a de-facto ALC with metrology sufficient to be accepted as a PSV for aggregation to the ALD for the creation of Operating Reserves may measure the amount of current consumed by each monitored device. An active load client then multiplies the amount of current consumed by the operating voltage of the device to obtain the power consumption, and transmits the power consumption to the ALD server. When the serving utility needs more power than it is currently able to supply, the power load management system automatically adjusts the power distribution by turning off or reducing specific loads on an individual device or subscriber basis. Because the amount of power consumed by each specific load is known via the PSV and aggregated via the PTB, the system can determine precisely which loads to turn off or reduce and tracks the power savings generated by each customer as a result of this short-term outage.

Furthermore, based upon the reduction in consumed power, the systems and methods of the present invention provide for generating at the control center a power supply value (PSV) corresponding to the reduction in consumed power by the power consuming device(s). Importantly, the PSV is an actual value that includes measurement and verification of the reduction in consumed power; such measurement and verification methods may be determined by the appropriate governing body or authority for the electric power grid(s). Power Supply Value (PSV) is calculated at the meter or submeter or at building control system or at any device or controller that measures power within the standard as supplied by the regulatory body(ies) that govern the regulation of the grid. PSV variations may depend on operating tolerances, operating standard for accuracy of the measurement. PSV further includes forecasting, statistical sampling, baselining, and combinations thereof. The PSV enables transformation of curtailment or reduction in power at the device level by any system that sends or receives an IP message to be related to or equated to supply as presented to the governing entity that accepts these values and award supply equivalence, for example of a power generating entity or an entity allowed to control power consuming devices as permitted by the governing body of the electric power grid, e.g., FERC, NERC, etc.

PSV may be provided in units of capacity, demand, electrical power flow, time, monetary equivalent, and combinations thereof. Thus, the PSV provides an actual value that is confirmed by measurement and/or verification, thereby providing for a curtailment value as a requirement for providing supply to the power grid, wherein the supply to the power electric power grid is provided for grid stability, voltage stability, reliability, and combinations thereof, and is further provided as responsive to an energy management system or equivalent for providing grid stability, reliability, frequency as determined by governing authority for the electric power grid and/or grid operator(s).

Figure 13:
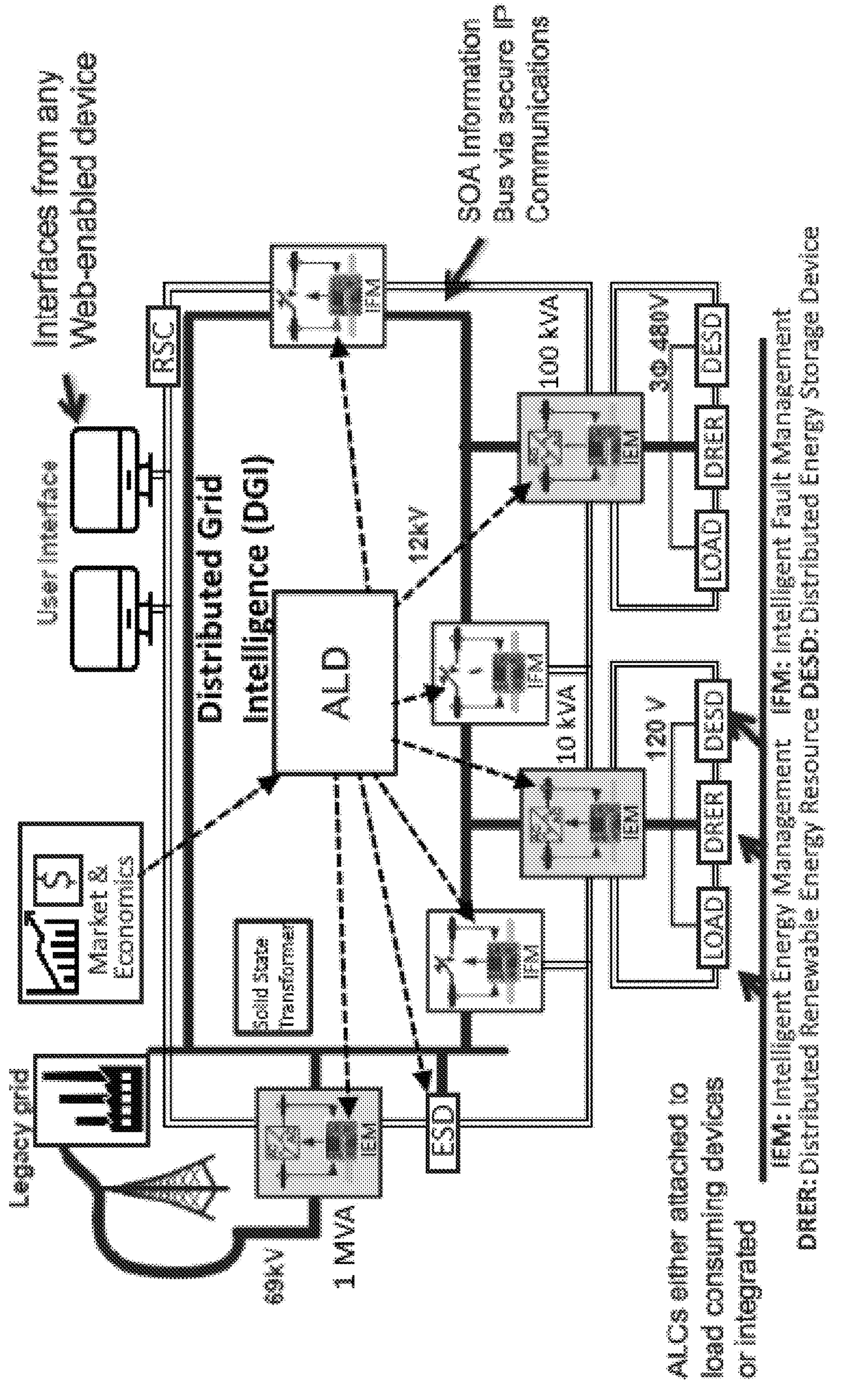
FIG. 13 is a schematic diagram illustrating components including ALD, ALC, and IP communications for distributed grid intelligence within systems of the present invention.

The present invention can be more readily understood with reference to the Figures. FIG. 13 provides a schematic diagram illustrating components including ALD, ALC, and IP communications for distributed grid intelligence within systems of the present invention.

Figure 14:
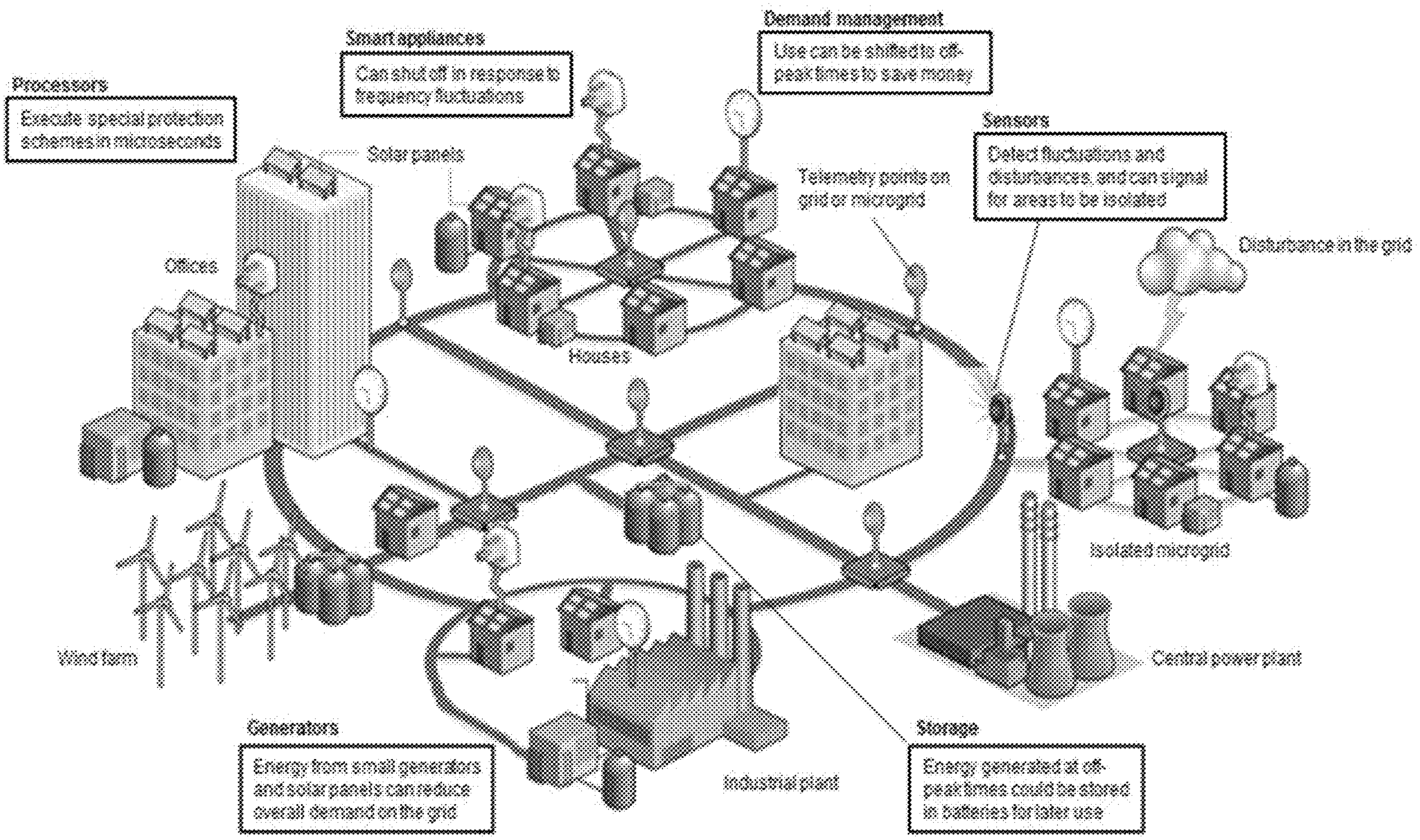
FIG. 14 is a schematic diagram that illustrates smart grid with decentralized networks according to systems and methods of the present invention.
Figure 15:
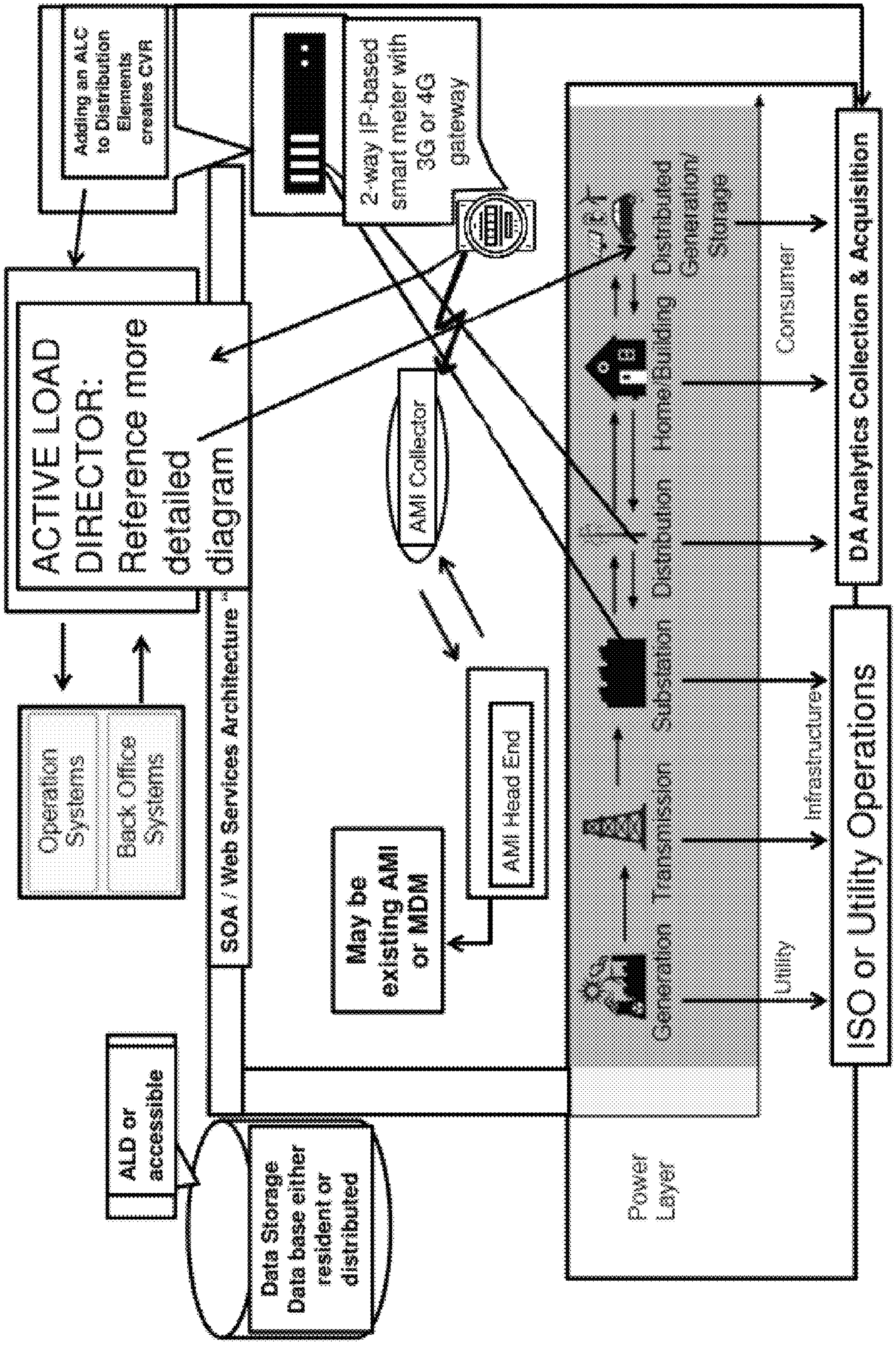
FIG. 15 is another schematic diagram that illustrates smart grid with decentralized networks according to systems and methods of the present invention.
Figure 16:
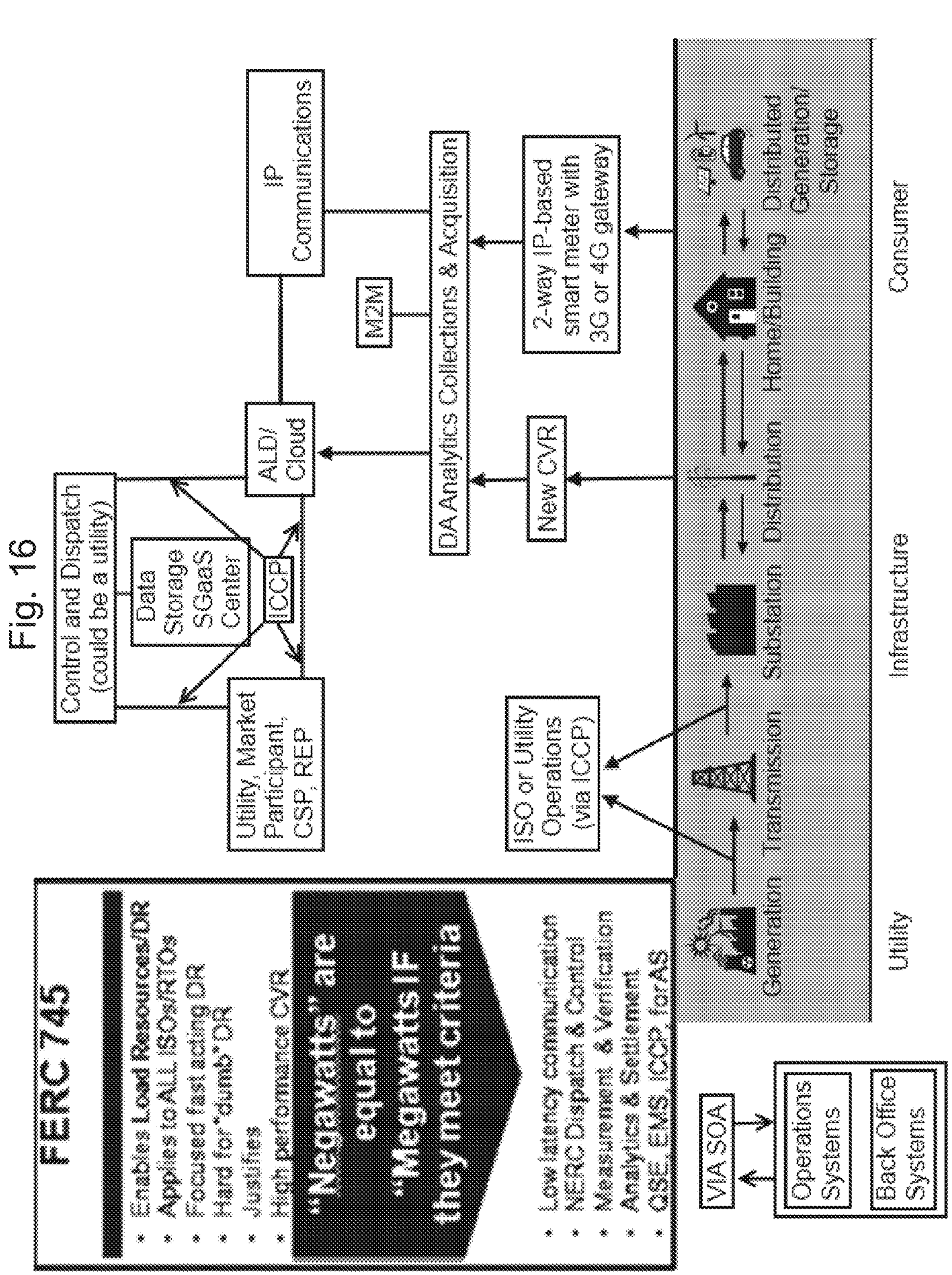
FIG. 16 is yet another schematic diagram that illustrates smart grid with decentralized networks according to systems and methods of the present invention.

Smart grid configurations are preferred under systems and methods of the present invention. By way of example, consider embodiments in FIGS. 14-16, which provide schematic diagrams that illustrate smart grid with decentralized networks according to systems and methods of the present invention.

Figure 17A:
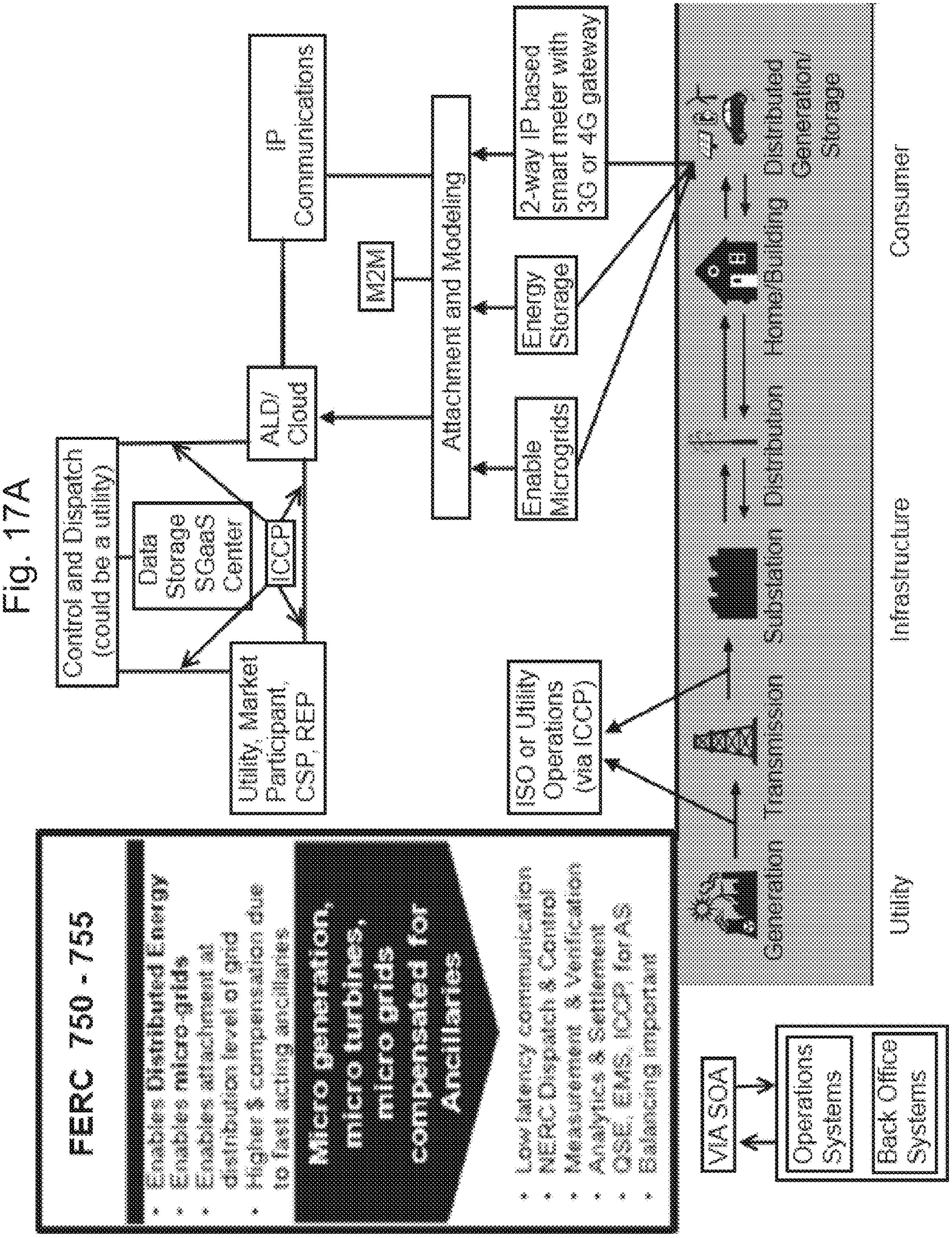
FIG. 17A shows a schematic diagram for supply from utility, market participant, CSP, and/or REP, ALD/cloud layer, ICCP, control and dispatch, and microgrid enablement according to systems and methods of the present invention.

FIG. 17A shows a schematic diagram for supply from utility, market participant, CSP, and/or REP, ALD/cloud layer, ICCP, control and dispatch, and microgrid enablement according to systems and methods of the present invention.

Figure 18:
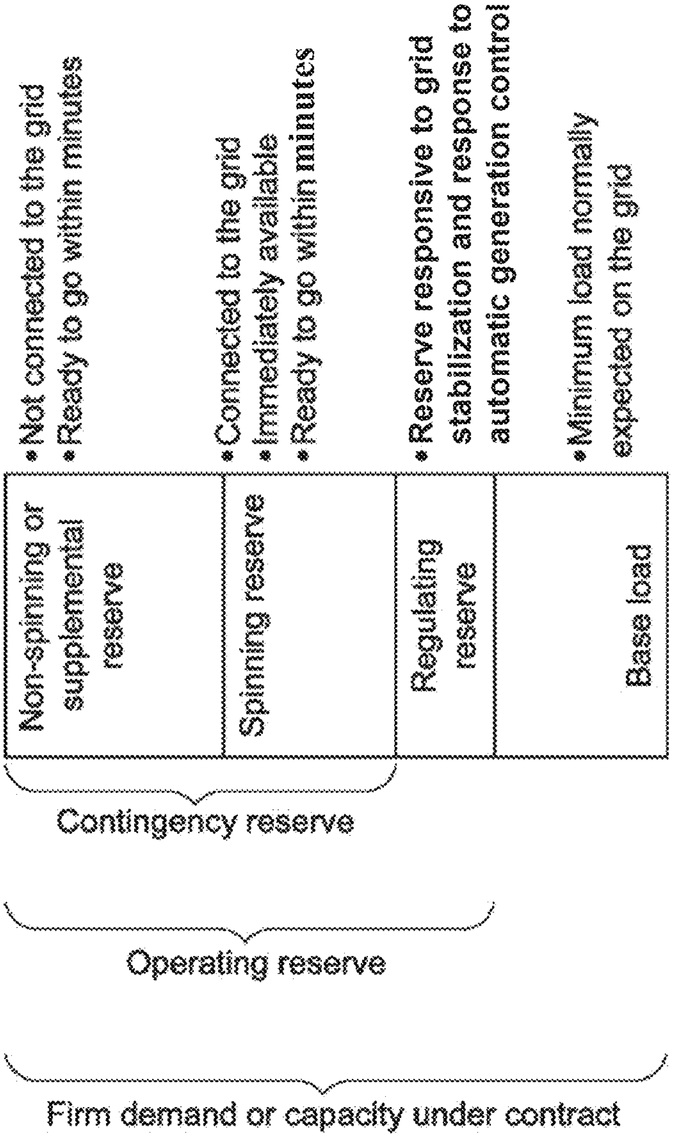
FIG. 18 is a graphic illustration of operating reserves categories and base load.
Figure 19:
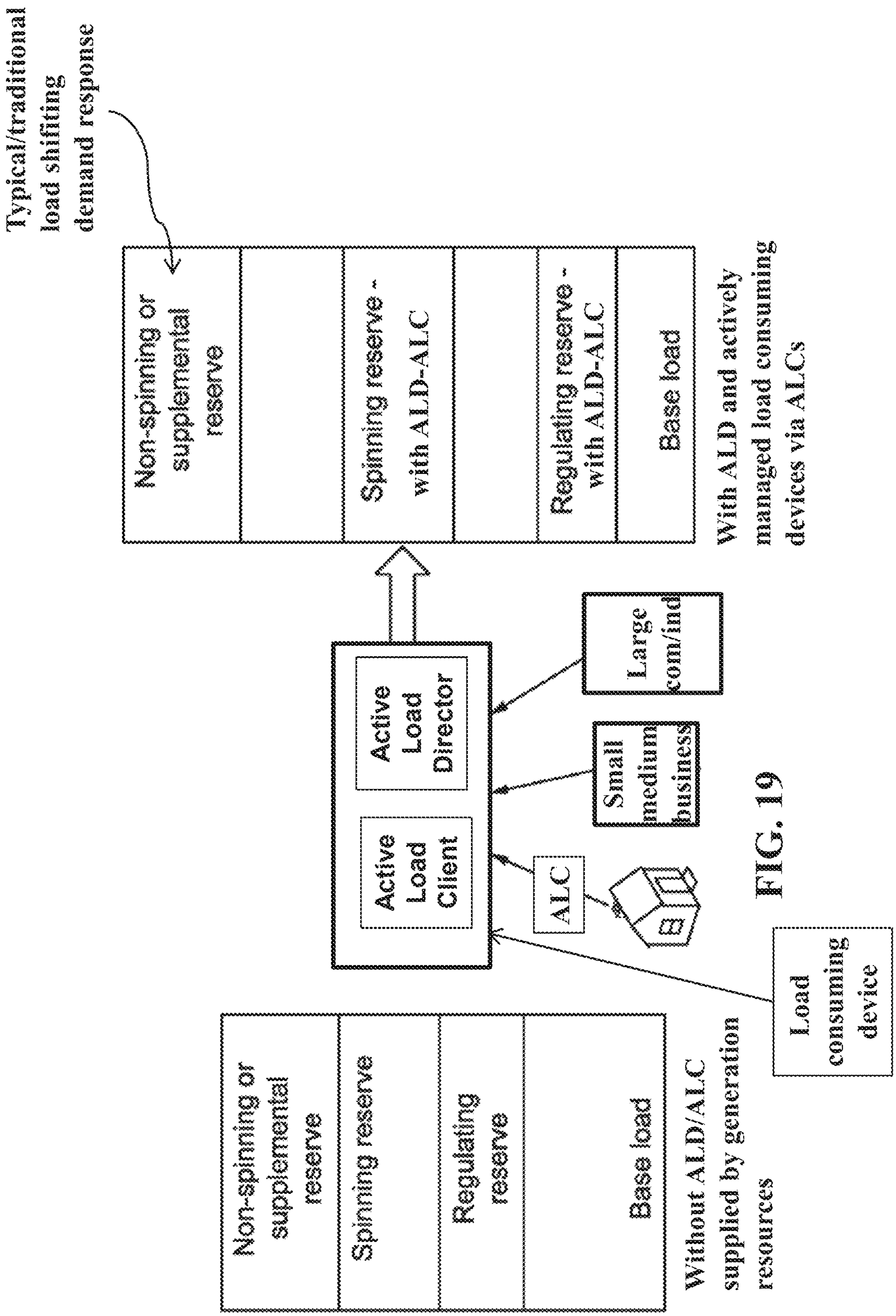
FIG. 19 is a schematic diagram representing operating reserves for supply side generation of electric power for a grid, active load director (ALD), active load client (ALC), power consuming devices, and other components of the systems and methods of the present invention for generating operating reserves of different categories.

As set forth hereinabove, the present invention provides systems and methods for generating operating reserves for an electric power grid. Correspondingly, FIG. 18 provides a graphic illustration of operating reserves categories and base load; FIG. 19 is a schematic diagram representing operating reserves for supply side generation of electric power for a grid, ALD, ALC, power consuming devices, and other components of the systems and methods of the present invention for generating operating reserves of different categories.

Figure 20:
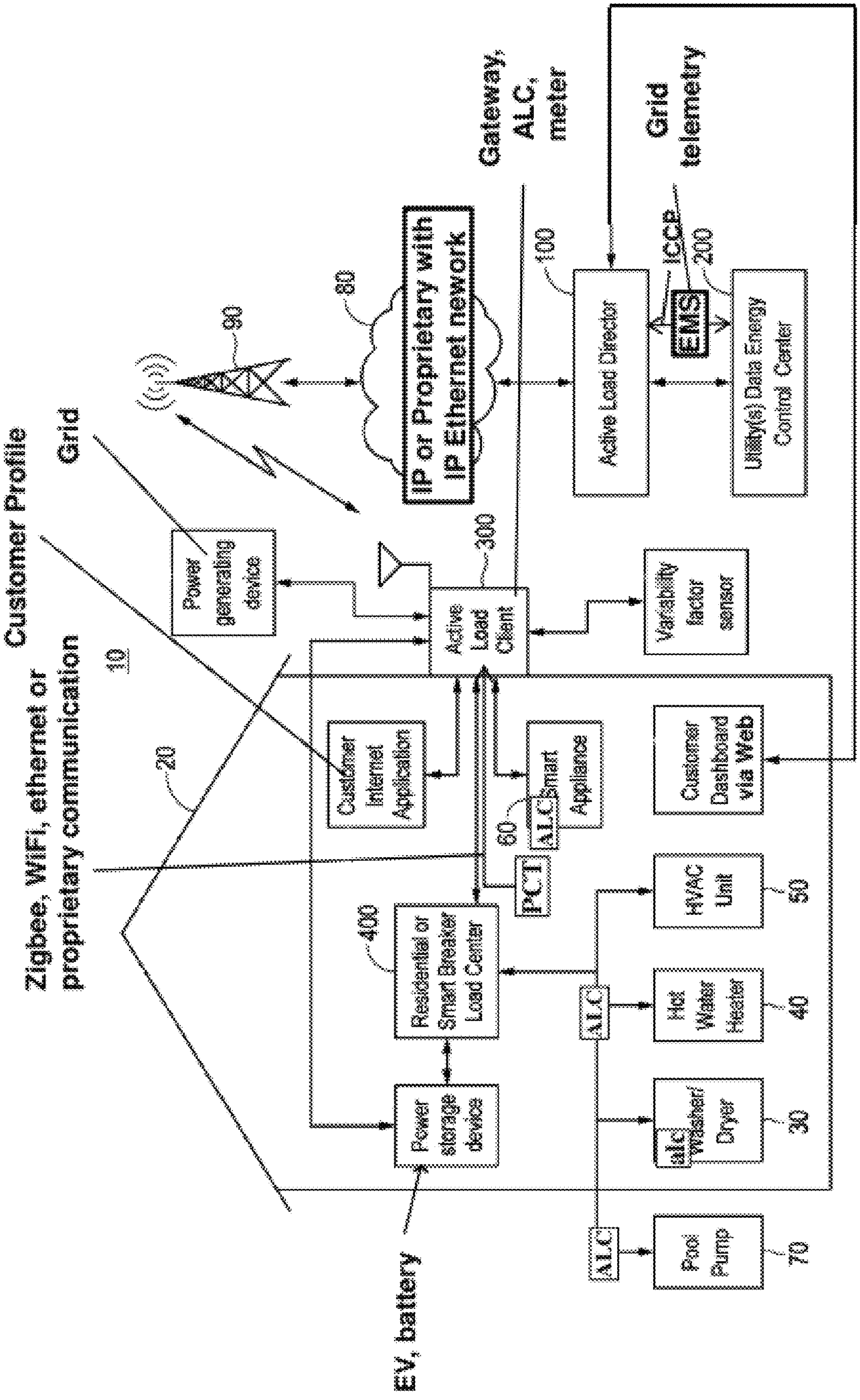
FIG. 20 is a schematic diagram showing one embodiment of the present invention including power consuming devices, control devices, ALC, ALD, customer profile, IP communication network, and grid telemetry components of systems and methods of the present invention.

FIG. 20 is a schematic diagram showing one embodiment of the present invention including power consuming devices, control devices, ALC, ALD, customer profile, IP communication network, and grid telemetry components of systems and methods of the present invention.

Figure 21A:
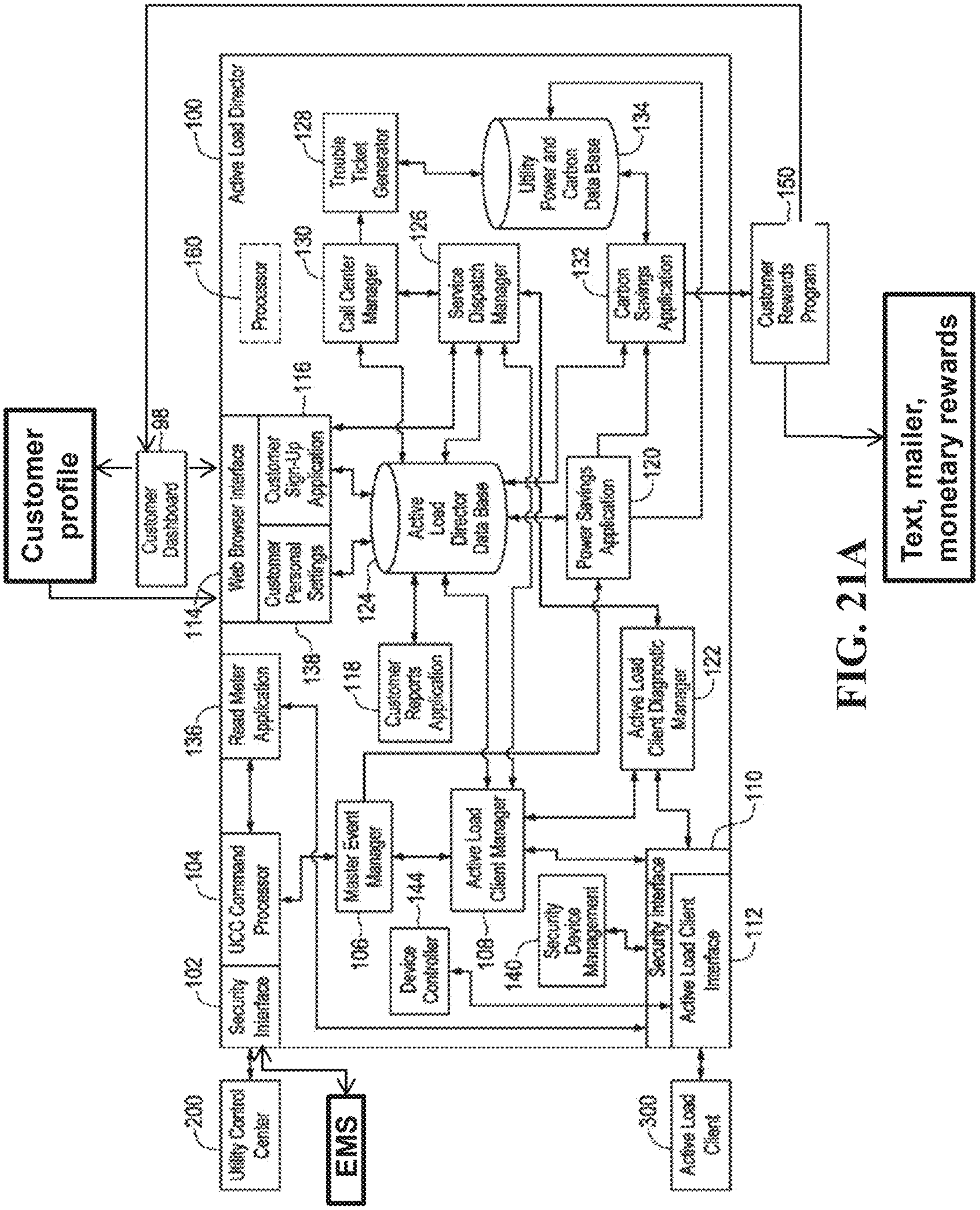
FIG. 21A is a schematic diagram showing one embodiment of the present invention including energy management system (EMS), power consuming devices, control devices, ALC, ALD, customer profile, IP communication network, and grid telemetry components of systems and methods of the present invention.
Figure 21B:
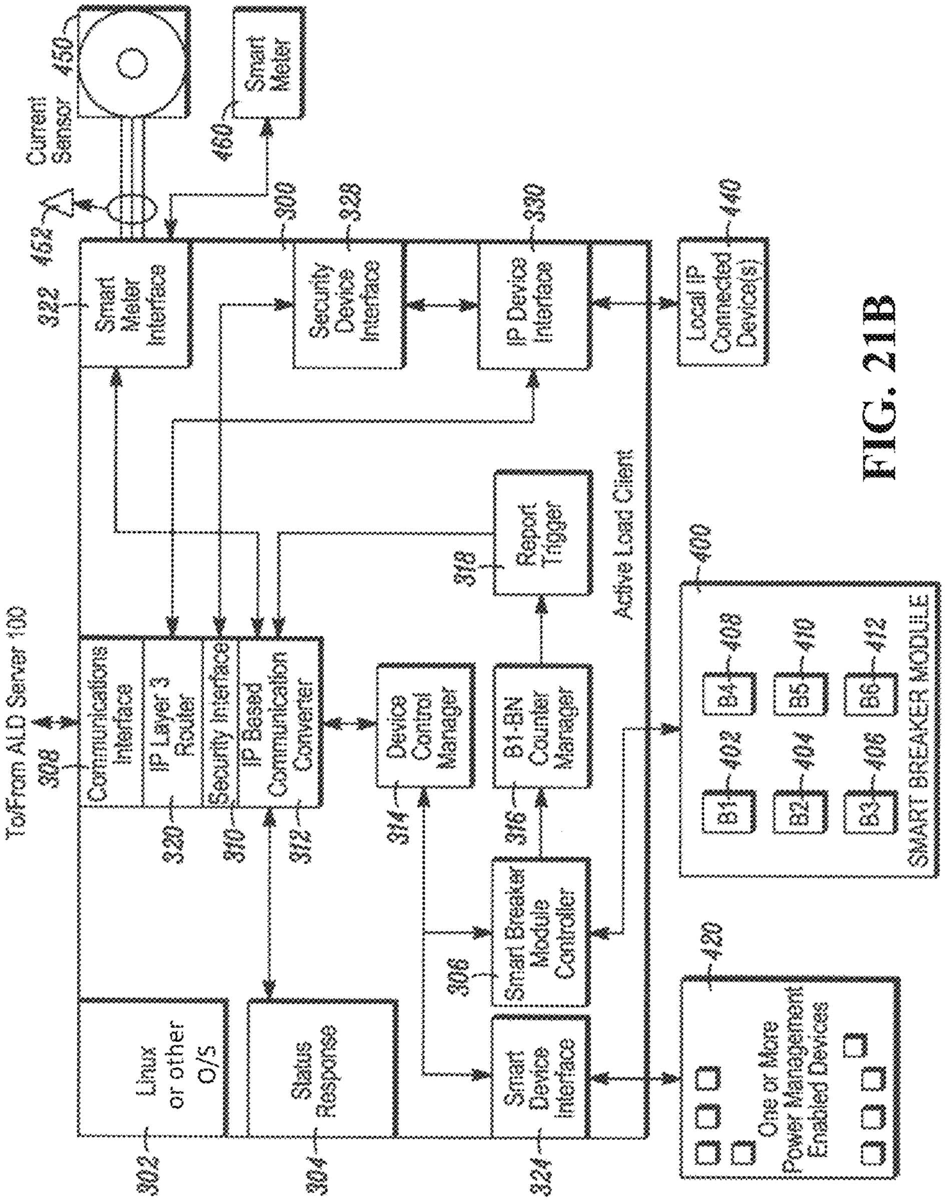
FIG. 21B is a schematic diagram showing one embodiment of the present invention including EMS, power consuming devices, control devices, ALC, ALD, customer profile, IP communication network, and grid telemetry components of systems and methods of the present invention.

FIG. 21A is a schematic diagram showing one embodiment of the present invention including EMS, power consuming devices, control devices, ALC, ALD, customer profile, IP communication network, and grid telemetry components of systems and methods of the present invention. In another illustration, FIG. 21B shows a schematic diagram for one embodiment of the present invention including EMS, power consuming devices, control devices, ALC, ALD, customer profile, IP communication network, and grid telemetry components of systems and methods of the present invention.

Figure 23:
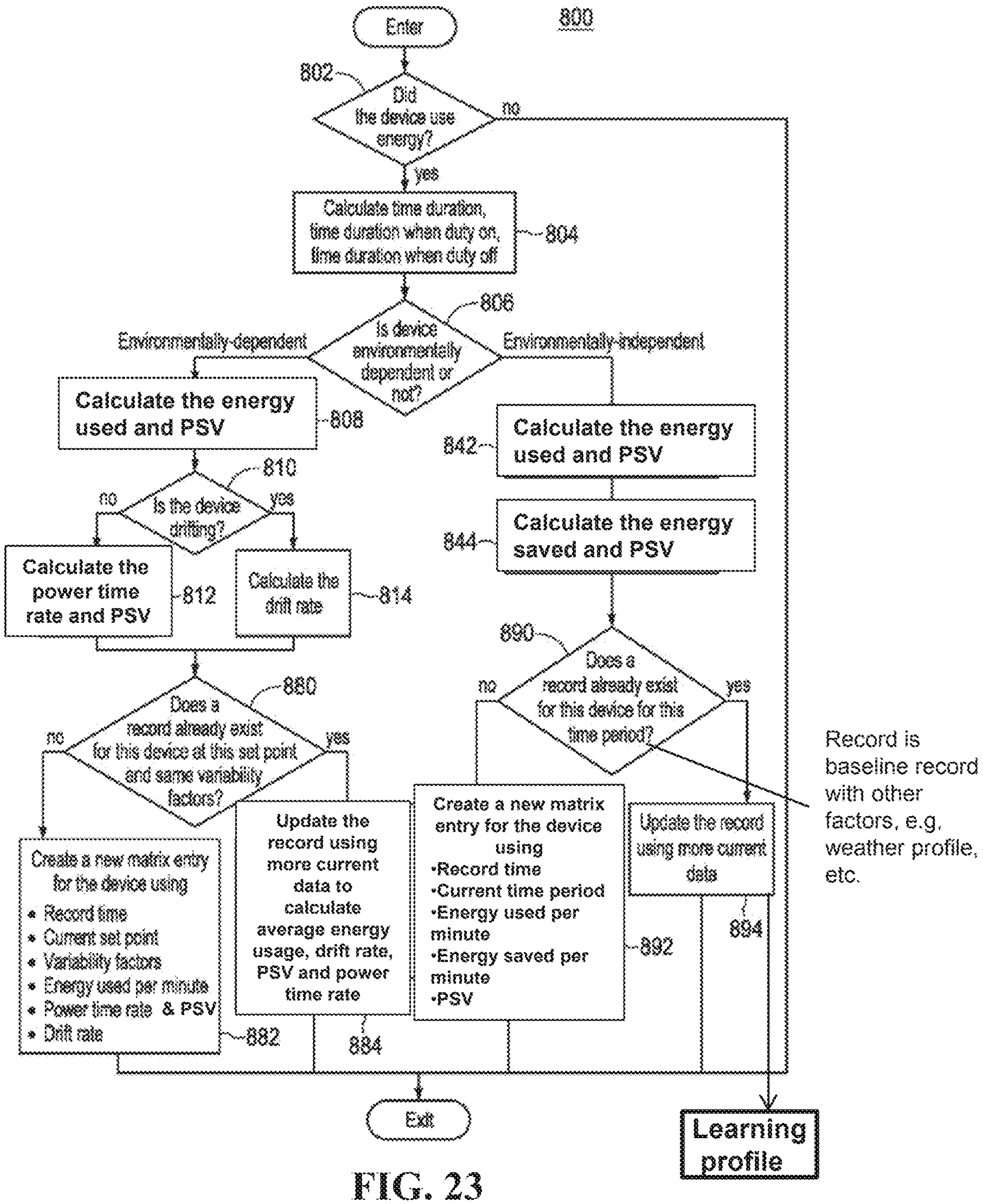
FIG. 23 is a flow diagram illustrating method steps for energy consuming devices and the generation of power supply value (PSV) according to embodiments of the present invention, including learning profile.
Figure 26:
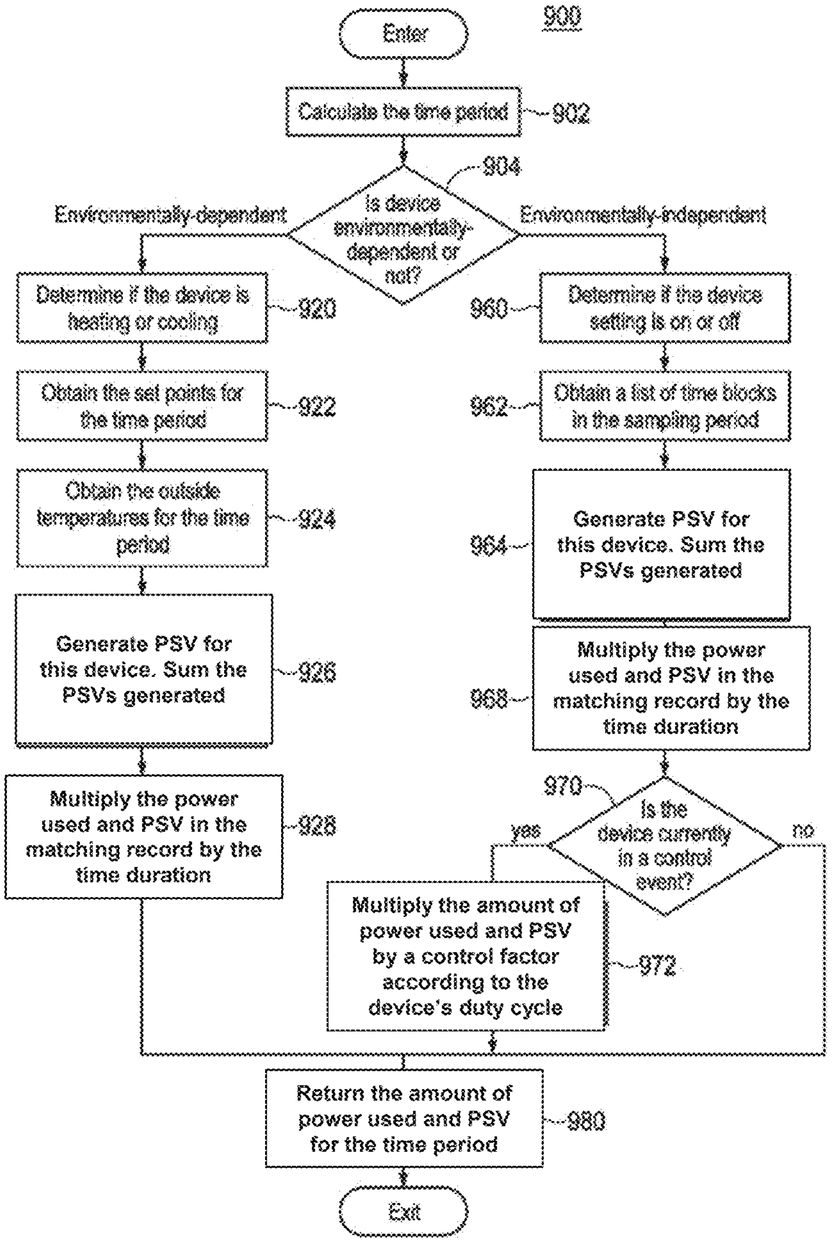
FIG. 26 is a flow diagram for methods of the present invention for calculating the time period for environmentally dependent and independent devices and determining or generating power supply value (PSV) for those power-consuming devices.

FIG. 22 is a table of consumer-adjustable parameters as examples for systems and methods components according to the present invention. FIG. 23 is a flow diagram illustrating method steps for energy-consuming devices and the generation of power supply value (PSV) for those devices, according to embodiments of the present invention, including learning profile. Furthermore, FIG. 26 shows a flow diagram for methods of the present invention for calculating the time period for environmentally dependent and independent devices and determining or generating power supply value (PSV) for those power-consuming devices.

Figure 24:
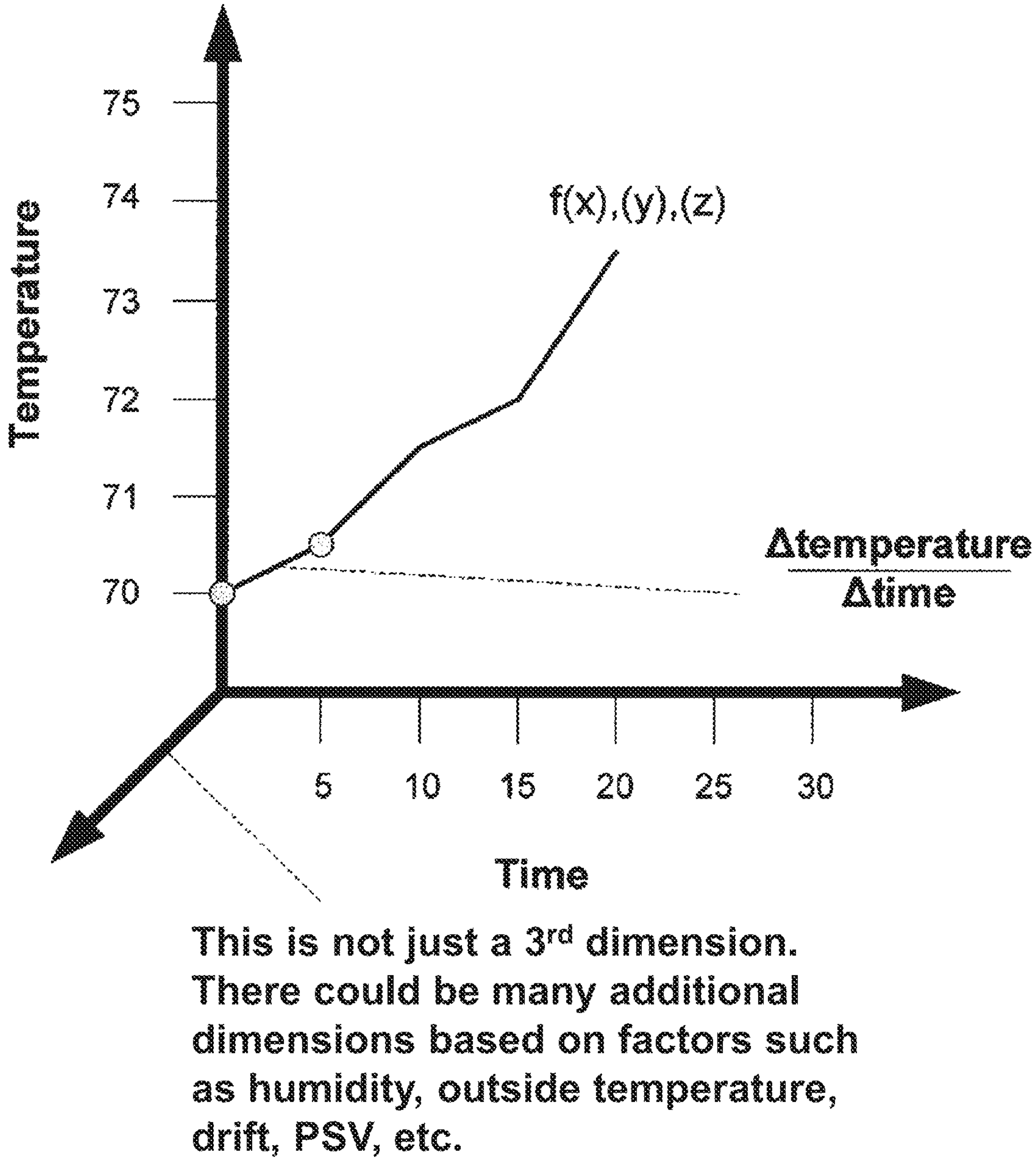
FIG. 24 is a graph showing at least three (3) dimensions for factors associated with load consumption and devices managing temperature control for corresponding power consuming devices, including the change in factors over time.
Figure 25:
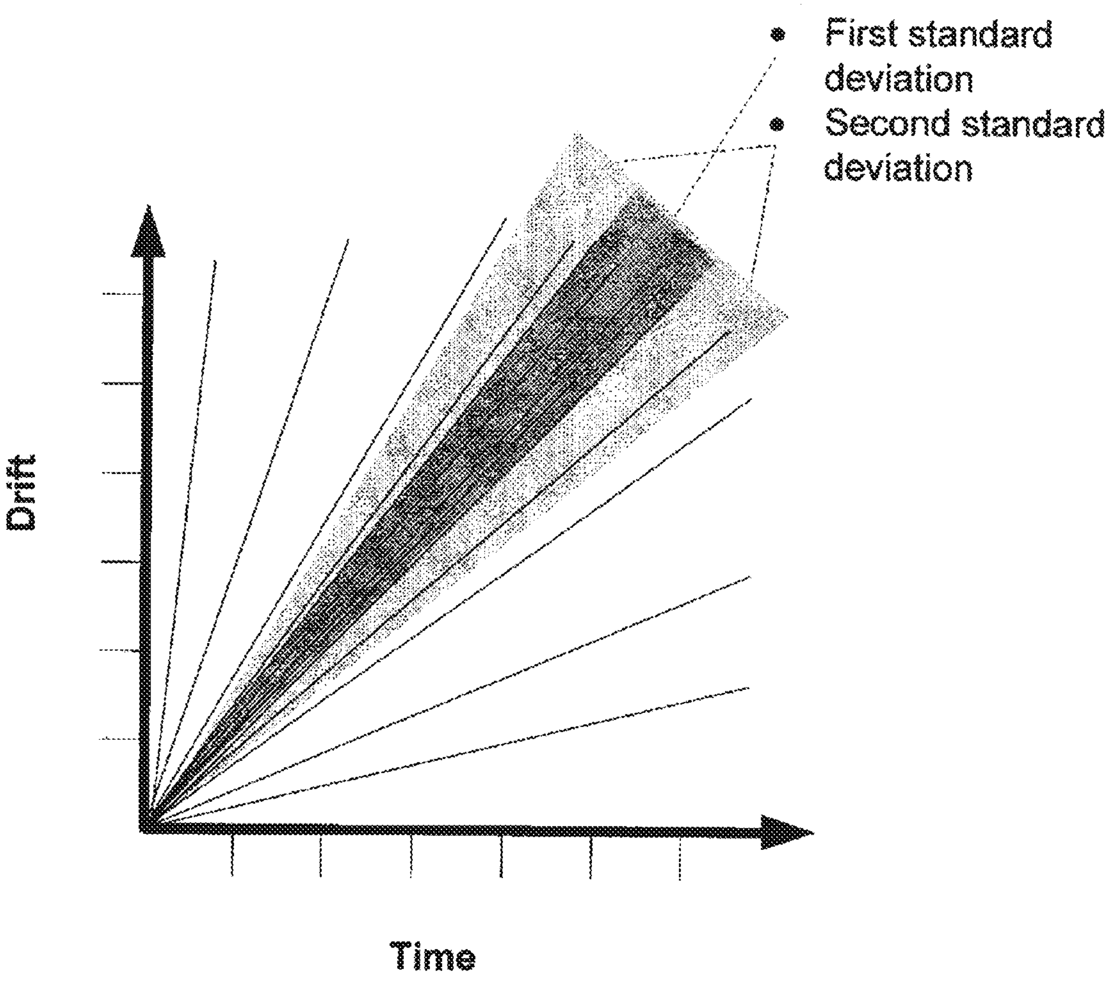
FIG. 25 is a graph showing first, second, and additional standard deviations of for the chart of drift versus time, for use with the systems and methods of the present invention.

By way of example, for temperature or environmental-factor controlling devices as power consuming devices, FIG. 24 provides a graph showing at least three (3) dimensions for factors associated with load consumption and devices managing temperature control for corresponding power consuming devices, including the change in factors over time. FIG. 25 is a graph showing first, second, and additional standard deviations of for the chart of drift versus time, for use with the systems and methods of the present invention. When the ALD is automatically considering load curtailment, preferably a search algorithm provides the most load against the least amount of consumers impacted. Based upon the thermal drift of structures, additional structures are identified and selected, to provide required curtailment for grid stability. Each structure has its own factors, as illustrated in FIG. 24. Thus, the ALD selects and provides instructions to the ALCs and/or power consuming devices based upon profiles and attributes. Preferably, the system stores in memory on the server computer associated with the database for storing information relating to the energy management system and its various components described in the specification, identification of the last power consuming device(s) used for satisfying a load curtailment event, and automatically shifts their categorization for the ALD for purposes of selection for the next curtailment event.

Figure 27:
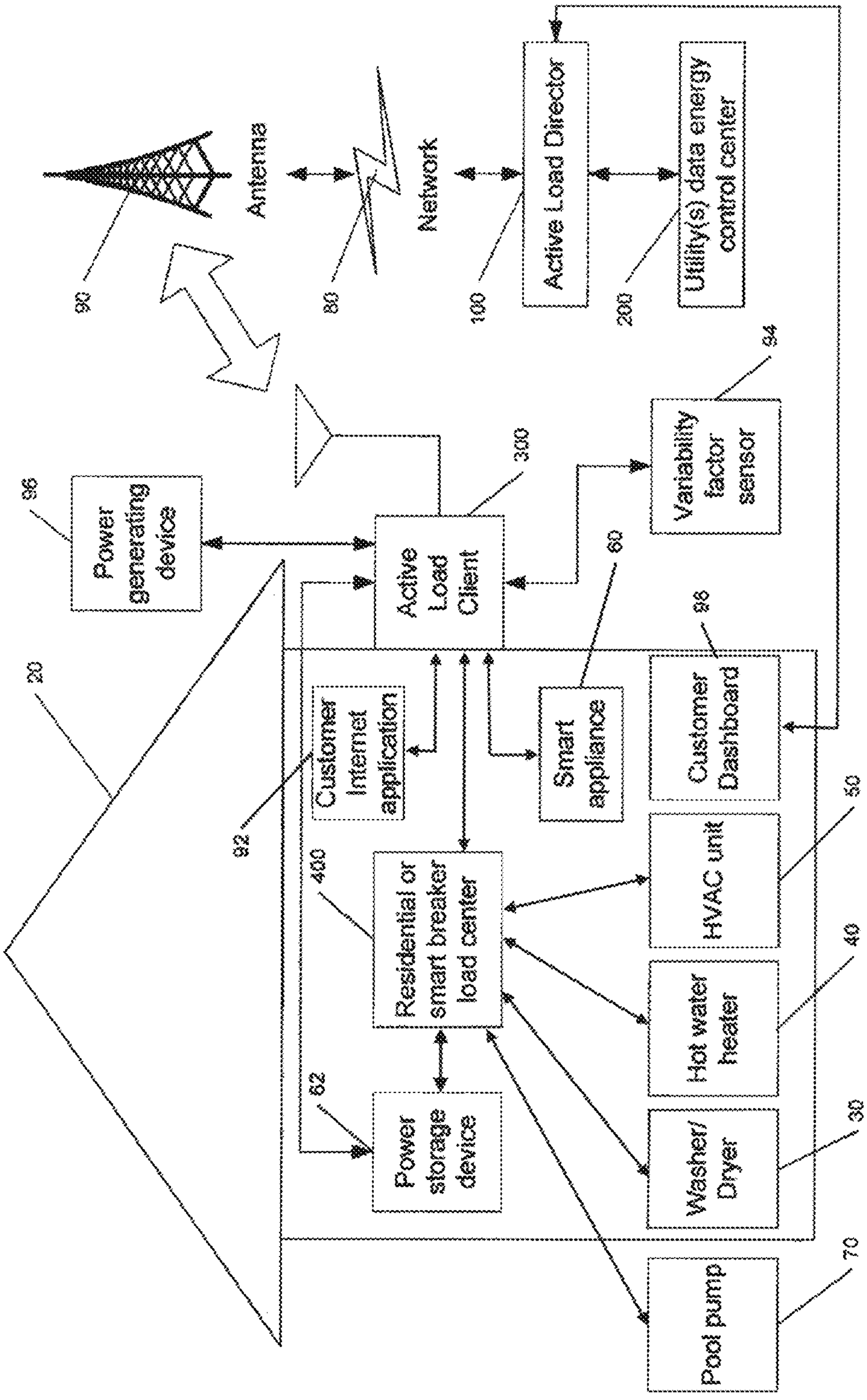
FIG. 27 is a schematic diagram illustrating exemplary IP-based active power load management system in accordance with one embodiment of the present invention.

Additionally, the following figures, in which like reference numerals designate like items. FIG. 27 depicts an exemplary IP-based active power load management system 10 in accordance with one embodiment of the present invention. The exemplary power management system 10 monitors and manages power distribution via an active load director (ALD) server 100 connected between one or more utility control centers (UCCs) 200 (one shown) and one or more active load clients (ALCs) 300 (one shown). The ALD server 100 may communicate with the utility control center 200 and each active load client 300 either directly or through a network 80 using the Internet Protocol (IP) or any other connection-based protocols. For example, the ALD server 100 may communicate using RF systems operating via one or more base stations 90 (one shown) using one or more wireless communication protocols, such as Global System for Mobile communications (GSM), Enhanced Data GSM Environment (EDGE), High Speed Packet Access (HSDPA), Time Division Multiple Access (TDMA), or Code Division Multiple Access data standards, including CDMA 2000, CDMA Revision A, and CDMA Revision B.

Alternatively, or additionally, the ALD server 100 may communicate via a digital subscriber line (DSL) capable connection, cable television based IP capable connection, or any combination thereof. In the exemplary embodiment shown in FIG. 1, the ALD server 100 communicates with one or more active load clients 300 using a combination of traditional IP-based communication (e.g., over a trunked line) to a base station 90 and a wireless channel implementing the WiMax protocol for the "last mile" from the base station 90 to the active load client 300.

Each active load client 300 is accessible through a specified address (e.g., IP address) and controls and monitors the state of individual smart breaker modules or intelligent appliances 60 installed in the business or residence 20 to which the active load client 300 is associated (e.g., connected or supporting). Each active load client 300 is associated with a single residential or commercial customer. In one embodiment, the active load client 300 communicates with a residential load center 400 that contains smart breaker modules, which are able to switch from an "ON" (active) state to an "OFF" (inactive), and vice versa, responsive to signaling from the active load client 300. Smart breaker modules may include, for example, smart breaker panels manufactured by Schneider Electric SA under the trademark "Square D" or Eaton Corporation under the trademark "Cutler-Hammer" for installation during new construction. For retro-fitting existing buildings, smart breakers having means for individual identification and control may be used. Typically, each smart breaker controls a single appliance and may be embedded in circuits or individual appliances or appliance controls or appliance control devices, whether internal to the device housing, or external thereto (e.g., a washer/dryer 30, a hot water heater 40, an HVAC unit 50, or a pool pump 70).

Additionally, the active load client 300 may control individual smart appliances directly (e.g., without communicating with the residential load center 300) via one or more of a variety of known communication protocols (e.g., IP, Broadband over PowerLine (BPL) in its various forms, including through specifications promulgated or being developed by the HOMEPLUG Powerline Alliance and the IEEE, Ethernet, Bluetooth, ZigBee, Wi-Fi, WiMax, etc.). Typically, a smart appliance 60 includes a power control module (not shown) having communication abilities. The power control module is installed in-line with the power supply to the appliance, between the actual appliance and the power source (e.g., the power control module is plugged into a power outlet at the home or business and the power cord for the appliance is plugged into the power control module). Thus, when the power control module receives a command to turn off the appliance 60, it disconnects the actual power supplying the appliance 60. Alternatively, a smart appliance 60 may include a power control module integrated directly into the appliance, which may receive commands and control the operation of the appliance directly (e.g., a smart thermostat may perform such functions as raising or lowering the set temperature, switching an HVAC unit on or off, or switching a fan on or off).

Figure 28:
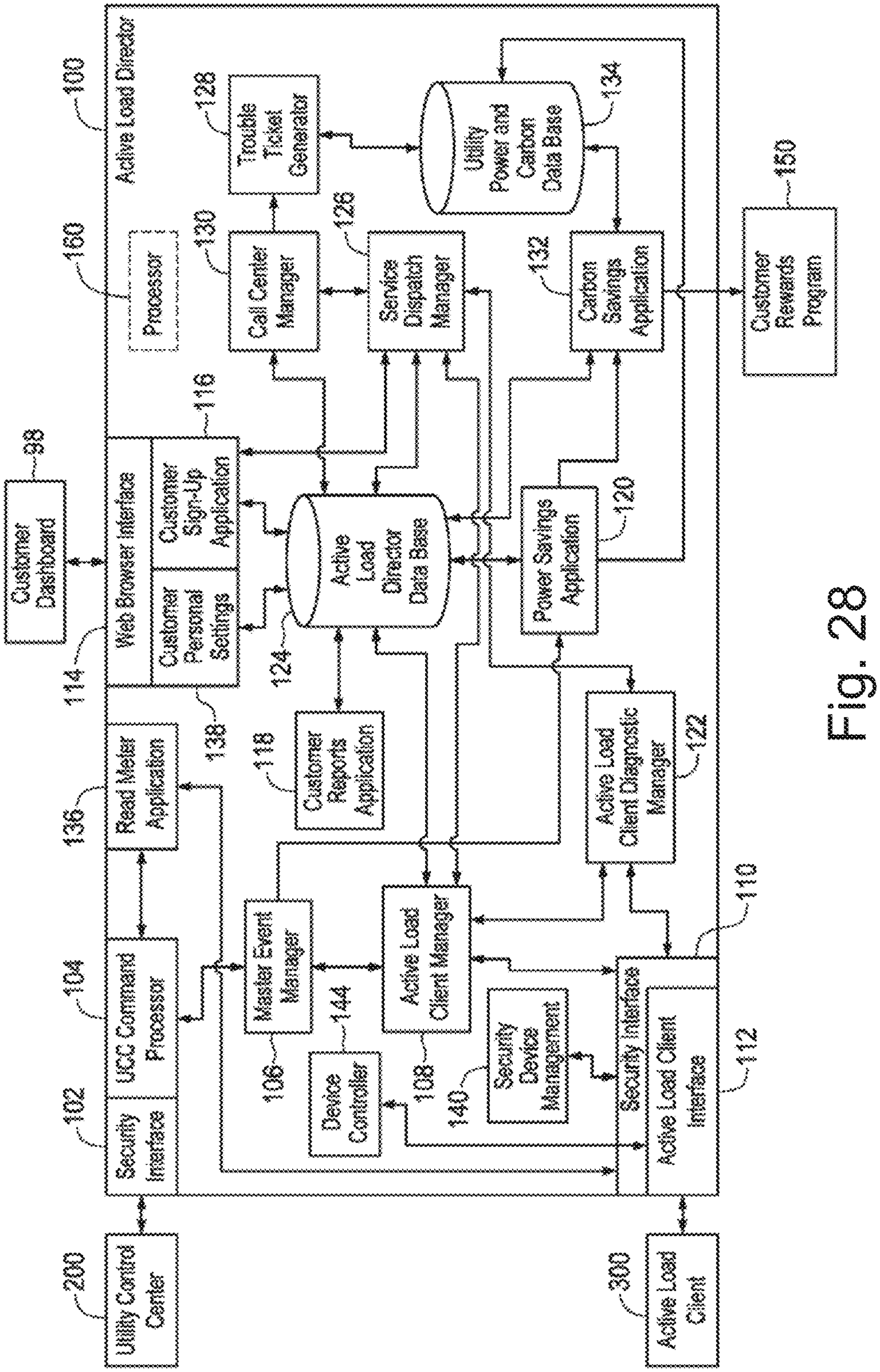
FIG. 28 is a schematic diagram illustrating a schematic diagram of an exemplary active load director in accordance with one embodiment of the present invention.

Referring now to FIG. 28, the ALD server 100 may serve as the primary interface to customers, as well as to service personnel. In the exemplary embodiment depicted in FIG. 28, the ALD server 100 includes a utility control center (UCC) security interface 102, a UCC command processor 104, a master event manager 106, an ALC manager 108, an ALC security interface 110, an ALC interface 112, a web browser interface 114, a customer sign-up application 116, customer personal settings 138, a customer reports application 118, a power savings application 120, an ALC diagnostic manager 122, an ALD database 124, a service dispatch manager 126, a trouble ticket generator 128, a call center manager 130, a carbon savings application 132, a utility P & C database 134, a read meter application 136, and a security device manager 140.

Using the web browser interface 114, in one embodiment, customers interact with the ALD server 100 and subscribe to some or all of the services offered by the power load management system 10 via a customer sign-up application 116. In accordance with the customer sign-up application 116, the customer specifies customer personal settings 138 that contain information relating to the customer and the customer's residence or business, and defines the extent of service to which the customer wishes to subscribe. Additional details of the customer sign-up application 116 are discussed below. Customers may also use the web browser interface 114 to access and modify information pertaining to their existing accounts or information pertaining to their load consuming devices (by way of example and not limitation, the information includes consumption, efficiency, and the like).

The ALD server 100 also includes a UCC security interface 102 which provides security and encryption between the ALD server 100 and a utility company's control center 200 to ensure that no third party is able to provide unauthorized directions to the ALD server 100. A UCC command processor 104 receives and sends messages between the ALD server 100 and the utility control center 200. Similarly, an ALC security interface 110 provides security and encryption between the ALD server 100 and each active load client

300 on the system 10, ensuring that no third parties can send directions to, or receive information from, the active load client 300. The security techniques employed by the ALC security interface 110 and the UCC security interface 102 may include conventional symmetric key or asymmetric key algorithms, such as Wireless Encryption Protocol (WEP), Wi-Fi Protected Access (WPA and WPA2), Advanced Encryption Standard (AES), Pretty Good Privacy (PGP), or proprietary encryption techniques or embodiments approved by the governing bodies pertaining to critical infrastructure protection (CIP).

In one embodiment, the commands that can be received by the UCC command processor 104 from the electric utility's control center 200 include a "Cut" command, or reduce command, a "How Much" command, or PSV, PTB, priority-based command, an "End Event" command, and a "Read Meters" command. The "Cut" command instructs the ALD server 100 to reduce a specified amount of power for a specified amount of time. The specified amount of power may be an instantaneous amount of power or an average amount of power consumed per unit of time. The "Cut" command may also optionally indicate general geographic areas or specific locations for power load reduction. The "How Much" command requests information for the amount of power (e.g., in megawatts, and/or PSV by PTB) that can be reduced by the requesting utility control center 200. The "End Event" command stops the present ALD server 100 transaction. The "Read Meters" command instructs the ALD server 100 to read the meters for all customers serviced by the requesting utility.

The UCC command processor 104 may send a response to a "How Much" command or an "Event Ended" status confirmation to a utility control center 200. A response to a "How Much" command returns an amount of power, particularly relating to PSV and/or PTB, that can be cut or reduced. An "Event Ended" acknowledgement message confirms that the present ALD server transaction has ended.

The master event manager 106 maintains the overall status of the power load activities controlled by the power management system 10. The master event manager 106 maintains a separate state for each utility that is controlled and tracks the current power usage within each utility. The master event manager 106 also tracks the management condition of each utility (e.g., whether or not each utility is currently being managed). The master event manager 106 receives instructions in the form of transaction requests from the UCC command processor 104 and routes instructions to components necessary to complete the requested transaction, such as the ALC manager 108 and the power savings application 120.

The ALC manager 108 routes instructions between the ALD server 100 and each active load client 300 within the system 10 through an ALC interface 112. For instance, the ALC manager 108 tracks the state of every active load client 300 serviced by specified utilities, grid operators and/or market participants, by communicating with the active load client 300 through an individual IP address. The ALC interface 112 translates instructions (e.g., transactions) received from the ALC manager 108 into the proper message structure understood by the targeted active load client 300 and then sends the message to the active load client 300. Likewise, when the ALC interface 112 receives messages from an active load client 300, it translates the message into a form understood by the ALC manager 108 and routes the translated message to the ALC manager 108.

The ALC manager 108 receives from each active load client 300 that it services, either periodically or responsive to polling messages sent by the ALC manager 108, messages containing the present power consumption, PSV, PTB, and combinations thereof, and the status (e.g., "ON" or "OFF" or state) of each device controlled by the active load client 300. Alternatively, if individual device metering is not available, then the total power consumption via PSV, and load management status for the entire active load client 300 may be reported. The information contained in each status message is stored in the ALD database 124 in a record associated with the specified active load client 300. The ALD database 124 contains all the information necessary to manage every customer account and power distribution. In one embodiment, the ALD database 124 contains customer contact information, such as names, addresses, phone numbers, email addresses, and associated utility or market participant companies for all customers having active load clients 300 installed at their residences or businesses, as well as a description of specific operating instructions for each managed device (e.g., IP-addressable smart breaker, load control ALC, or appliance), device status, and device diagnostic history.

There are several types of messages that the ALC manager 108 may receive from an active load client 300 and process accordingly. One such message is a security alert message. A security alert message originates from an optional security or safety monitoring system installed in the residence or business and coupled to the active load client 300 (e.g., wirelessly or via a wired connection). When a security alert message is received, the ALC manager 108 accesses the ALD database 124 to obtain routing information for determining where to send the alert, and then sends the alert as directed. For example, the ALD manager 108 may be programmed to send the alert or another message (e.g., an electronic mail message or a pre-recorded voice message) to a security monitoring service company and/or the owner of the residence or business.

Another message communicated between an active load client 300 and the ALC manager 108 is a report trigger message. A report trigger message alerts the ALD server 100 that a predetermined amount of power, PSV, PTB, and combinations thereof has been consumed by a specific device monitored by an active load client 300. When a report trigger message is received from an active load client 300, the ALC manager 108 logs the information contained in the message in the ALD database 124 for the customer associated with the information-supplying active load client 300. The power consumption information, including PSV, PTB, and combinations thereof, is then used by the ALC manager 108 to determine the active load client(s) 300 to which to send a power reduction or "Cut" or reduce message during a power reduction event to satisfy the operating reserve requirement.

Yet another message exchanged between an active load client 300 and the ALC manager 108 is a status response message. A status response message reports the type and status of each device controlled by the active load client 300 to the ALD server 100. When a status response message is received from an active load client 300, the ALC manager 108 logs the information contained in the message in the ALD database 124.

In one embodiment, upon receiving instructions (e.g., a "Cut" or reduce instruction) from the master event manager 106 to reduce power consumption for a specified utility, the ALC manager 108 determines which active load clients 300 and/or individually controlled devices to switch to the "OFF" or reduced state based upon present power consumption data stored in the ALD database 124, and in combination with customer interface. The ALC manager 108 then sends a message to each selected active load client 300 containing instructions to turn off or reduce all or some of the devices under the active load client's (ALC's) control.

In another embodiment, a power savings application 120 may be optionally included to calculate the total amount of power saved by each utility or market participant during a power reduction event (referred to herein as a "Cut event" or "reduce event"), as well as the amount of power saved, PSV, PTB, and combinations for each customer whose active load client 300 reduced the amount of power delivered, PSV, PTB, and combinations thereof, and matched against a baseline stored at either the ALC and/or ALD. The power savings application 120 accesses the data stored in the ALD database 124 for each customer serviced by a particular utility and stores the total cumulative power savings, or PSV (e.g., in megawatts per hour, or kWH/MWH) accumulated by each utility for each Cut or reduce event, i.e., curtailment or load control event, in which the utility participated as an entry in the utility Power and Carbon ("P&C") database 134.

In a further embodiment, an optional carbon savings application 132 uses the information produced by the power savings application 120, including PSV, PTB, and combinations, to determine the amount of carbon saved by each utility and by each customer for every Cut or reduce event. Carbon savings information (e.g., type of fuel that was used to generate power for the customer set that was included in the just completed event, power, PSV, PTB, and/or combinations saved in the prior event, governmental standard calculation rates, and/or other data, such as generation mix per serving utility and geography of the customer's location and the location of the nearest power source) is stored in the ALD database 124 for each active load client 300 (customer) and in the utility P&C database 134 for each utility. The carbon savings application 132 calculates the total equivalent carbon credits saved for each active load client 300 (customer) and utility participating in the previous Cut or reduce event, and stores the information in the ALD database 124 and the utility P&C database 134, respectively.

Additionally, the ALC manager 108 automatically provides for smooth operation of the entire power load management system 10 by optionally interacting with a service dispatch manager 126. For example, when a new customer subscribes to participate in the power load management system 10, the service dispatch manager 126 is notified of the new subscription from the customer sign-up application 116. The service dispatch manager 126 then sends an activation request to the ALC manager 108. Upon receiving the activation request from the service dispatch manager 126, the ALC manager 108 may sends a query request for information to the new active load client 300 and, upon receipt of the information, provides it to the service dispatch manager 126. Additionally, if at any time the ALC manager 108 detects that a particular active load client 300 is not functioning properly, the ALC manager 108 may send a request for service to the service dispatch manager 126 to arrange for a service call to correct the problem. The ALCs and/or load consuming devices may automatically discover and/or join a network of ALC devices, automatically add customer profile(s).

In another embodiment, the service dispatch manager 126 may also receive requests for service from a call center manager 130 that provides support to an operations center (not shown), which receives telephone calls from customers of the power load management system 10. When a customer calls the operations center to request service, the call center manager 130 logs the service call in the ALD database 124 and sends a "Service" transaction message to the service dispatch manager 126. When the service call has been completed, the call center manager 130 receives a completed notification from the service dispatch manager 126 and records the original service call as "closed" in the ALD database 124.

In yet another embodiment, the service dispatch manager 126 may also instruct an ALC diagnostic manager 122 to perform a series of diagnostic tests for any active load client 300 for which the service dispatch manager 126 has received a service request. After the ALC diagnostic manager 122 has performed the diagnostic procedure, it returns the results to the service dispatch manager 126. The service dispatch manager 126 then invokes a trouble ticket generator 128 to produce a report (e.g., trouble ticket) that includes information (some of which was retrieved by the service dispatch manager 126 from the ALD database 124) pertaining to the required service (e.g., customer name, address, any special consideration for accessing the necessary equipment, and the results of the diagnostic process). A residential customer service technician may then use the information provided in the trouble ticket to select the type of equipment and replacement parts necessary for performing a service call.

A read meter application 136 may be optionally invoked when the UCC command processor 104 receives a "Read Meters" or equivalent command from the utility control center 200. The read meter application 136 cycles through the ALD database 124 and sends a read meter message or command to each active load client 300, or those active load clients 300 specifically identified in the UCC's command, via the ALC manager 108. The information received by the ALC manager 108 from the active load client 300 is logged in the ALD database 124 for each customer. When all the active load client meter information has been received, the information is sent to the requesting utility control center 200 using a business to business (e.g., ebXML) or other desired protocol, or other protocols established by ANSI or governing body related to the grid.

The optional security device management block 140 includes program instructions for handling security system messages received by the security interface 110. The security device management block 140 includes routing information for all security system messages and may further include messaging options on a per customer or service company basis. For example, one security service may require an email alert from the ALD server 100 upon the occurrence of a security event; whereas, another security service may require that the message sent from the in-building system be passed on by the active load client 300 and the ALD server 100 directly to the security service company.

In a further embodiment, the ALD server 100 also includes a customer reports application 118 that generates reports to be sent to individual customers detailing the amount of power saved, PSV, PTB, and/or combinations, including against a baseline, during a previous billing cycle. Each report may contain a cumulative total of power savings over the prior billing cycle, details of the amount of power saved per controlled device (e.g., breaker or appliance), power savings from utility directed events, power savings from customer directed events, devices being managed, total carbon equivalents used and saved during the period, and/or specific details for each Cut or curtailment or reduce event in which the customer's active load client 300 participated. Customers may also receive incentives and awards for participation in the power load management system 10 through a customer rewards program 150. For example, the utilities or a third party system operator may enter into agreements with product and/or service providers to offer system participants discounts on products and services offered by the providers based upon certain participation levels or milestones. The rewards program 150 may be setup in a manner similar to conventional frequent flyer programs in which points are accumulated for power saved (e.g., one point for each megawatt saved or deferred) and, upon accumulation of predetermined levels of points, the customer can select a product or service discount. Alternatively, a serving utility may offer a customer a rate discount for participating in the system 10.

Figure 29:
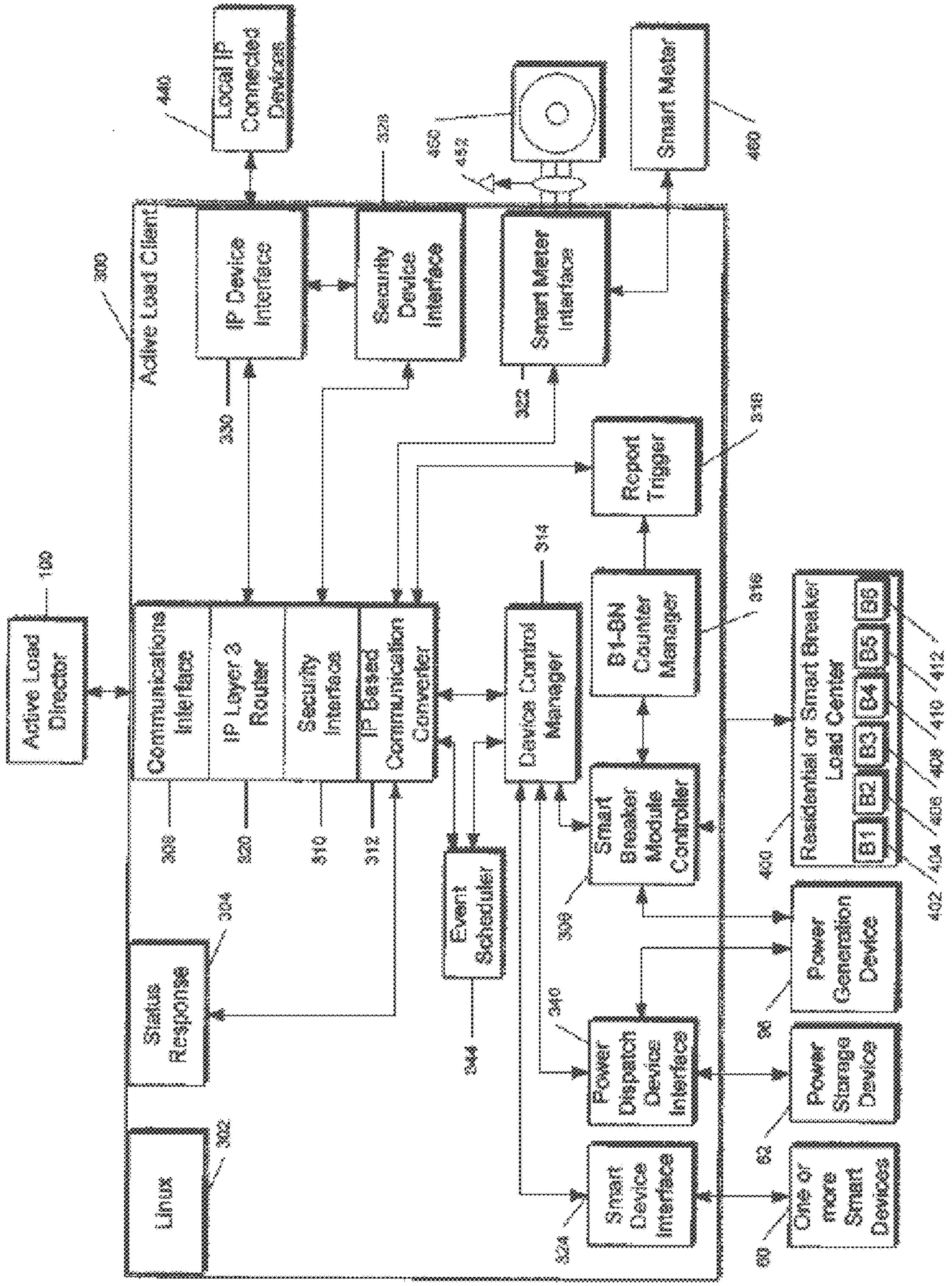
FIG. 29 is a schematic diagram illustrating a schematic diagram of an exemplary active load client in accordance with one embodiment of the present invention.

FIG. 29 illustrates a schematic diagram of an exemplary active load client 300 in accordance with one embodiment of the present invention. The depicted active load client 300 includes a Linux-based operating system 302, a status response generator 304, a smart breaker module controller 306, a smart device interface 324, a communications interface 308, a security interface 310, an IP-based communication converter 312, a device control manager 314, a smart breaker (B1-BN) counter manager 316, a report trigger application 318, an IP router 320, a smart meter interface 322, a security device interface 328, and an IP device interface 330. The active load client 300, in this embodiment, is a computer or processor-based system located on-site at a customer's residence or business. The primary function of the active load client 300 is to manage the power load levels of controllable devices located at the residence or business, which the active load client 300 oversees on behalf of the customer. In an exemplary embodiment, the software running on the active load client 300 operates using the Linux embedded operating system 302 to manage the hardware and the general software environment. One skilled in the art will readily recognize that other operating systems, such as Microsoft's family of operating systems, Mac OS, and Sun OS, C++, machine language, among others, may be alternatively used. Additionally, the active load client 300 may include DHCP client functionality to enable the active load client 300 to dynamically request IP addresses for itself and/or one or more controllable devices 402-412, 420, 460 managed thereby from a DHCP server on the host IP network facilitating communications between the active load client 300 and the ALD server 100. The active load client 300 may further include router functionality and maintain a routing table of assigned IP addresses in a memory of the active load client 300 to facilitate delivery of messages from the active load client 300 to the controllable devices 402-412, 420, 460.

A communications interface 308 facilitates connectivity between the active load client 300 and the ALD server 100. Communication between the active load client 300 and the ALD server 100 may be based on any type of IP or other connection protocol, including but not limited to, the WiMax protocol, and equivalents or alternatives, as discussed in the foregoing. Thus, the communications interface 308 may be a wired or wireless modem, a wireless access point, or other appropriate interface.

A standard IP Layer-3 router 320 routes messages received by the communications interface 308 to both the active load client 300 and to any other locally connected device 440. The router 320 determines if a received message is directed to the active load client 300 and, if so, passes the message to a security interface 310 to be decrypted. The security interface 310 provides protection for the contents of the messages exchanged between the ALD server 100 and the active load client 300. The message content is encrypted and decrypted by the security interface 310 using, for example, a symmetric encryption key composed of a combination of the IP address and GPS data for the active load client 300 or any other combination of known information. If the message is not directed to the active load client 300, then it is passed to the IP device interface 330 for delivery to one or more locally connected devices 440. For example, the IP router 320 may be programmed to route power load management system messages as well as conventional Internet messages. In such a case, the active load client 300 may function as a gateway for Internet service supplied to the residence or business instead of using separate Internet gateways or routers.

An IP based communication converter 312 opens incoming messages from the ALD server 100 and directs them to the appropriate function within the active load client 300. The converter 312 also receives messages from various active load client 300 functions (e.g., a device control manager 314, a status response generator 304, and a report trigger application 318), packages the messages in the form expected by the ALD server 100, and then passes them on to the security interface 310 for encryption.

The device control manager 314 processes power management commands and/or command messages for various controllable devices logically connected to the active load client 300. The devices can be either smart breakers, smart meters, load control appliances, building control systems, and the like, 402-412 or other IP based devices 420, such as smart appliances with individual control modules (not shown). The device control manager 314 also processes "Query Request" or equivalent commands or messages from the ALD server 100 by querying a status response generator 304 which maintains the type and status of each device controlled by the active load client 300, and providing the statuses to the ALD server 100. The "Query Request" message may include information other than mere status requests, such as temperature set points for thermally controlled devices, time intervals during which load control is permitted or prohibited, dates during which load control is permitted or prohibited, and priorities of device control (e.g., during a power reduction event, hot water heater and pool pump are turned off before HVAC unit is turned off), PSV, PTB, and/or combinations thereof. If temperature set points or other non-status information are included in a "Query Request" message and there is a device attached to the active load client 300 that can process the information, the temperature set points or other information are sent to that device 420 via a smart device interface 324.

The status response generator 304 receives status messages from the ALD server 100 and, responsive thereto, polls each controllable device 402-412, 420, 460 under the active load client's control to determine whether the controllable device 402-412, 420, 460 is active and in good operational order. Each controllable device 402-412, 420, 460 responds to the polls with operational information (e.g., activity status and/or error reports) in a status response message. The active load client 300 stores the status responses in a memory associated with the status response generator 304 for reference in connection with power reduction events.

The smart device interface 324 facilitates IP or other address-based communications to individual devices 420 (e.g., smart appliance power control modules) that are attached to the active load client 300. The connectivity can be through one of several different types of networks, including but not limited to, BPL, ZigBee, Wi-Fi, Bluetooth, or direct Ethernet communications. Thus, the smart device interface 324 is a modem adapted for use in or on the network connecting the smart devices 420 to the active load client 300. The smart device interface 324 also allows the device control manager 314 to manage those devices that have the capability to sense temperature settings and respond to temperature variations.

The smart breakers, smart meters, load control appliances, building control systems, and the like, module controller 306 formats, sends, and receives messages, including power control, PSV, PTB, and/or combinations thereof, instructions, to and from the smart breaker module 400. In one embodiment, the communications is preferably through a BPL connection. In such embodiment, the smart breaker module controller 306 includes a BPL modem and operations software. The smart breaker module 400 contains individual smart breakers, smart meters, load control appliances, building control systems, and the like, 402-412, wherein each smart breaker 402-412 includes an applicable modem (e.g., a BPL modem when BPL is the networking technology employed) and is preferably in-line with power supplied to a single appliance or other device. The B1-BN counter manager 316 determines and stores real time power usage for each installed smart breaker 402-412. For example, the counter manager 316 tracks or counts the amount of power or PSV, PTB, and/or combinations used by each smart breaker 402-412 and stores the counted amounts of power in a memory of the active load client 300 associated with the counter manager 316. When the counter for any breaker 402-412 reaches a predetermined limit, the counter manager 316 provides an identification number corresponding to the smart breaker 402-412 and the corresponding amount of power (power number), PSV, PTB, and combinations thereof, to the report trigger application 318. Once the information is passed to the report trigger application 318, the counter manager 316 resets the counter for the applicable breaker 402-412 to zero so that information can once again be collected. The report trigger application 318 then creates a reporting message containing identification information for the active load client 300, identification information for the particular smart breaker 402-412, and the power number, and sends the report to the IP based communication converter 312 for transmission to the ALD server 100.

The smart meter interface 322 manages either smart meters 460 that communicate using the communications methods or a current sensor 452 connected to a traditional power meter 450. When the active load client 300 receives a "Read Meters" command or message from the ALD server 100 and a smart meter 460 is attached to the active load client 300, a "Read Meters" command is sent to the meter 460 via the smart meter interface 322 (e.g., a BPL modem). The smart meter interface 322 receives a reply to the "Read Meters" message from the smart meter 460, formats this information along with identification information for the active load client 300, and provides the formatted message to the IP based communication converter 312 for transmission to the ALD server 100.

A security device interface 328 transfers security messages to and from any attached security device. For example, the security device interface 328 may be coupled by wire or wirelessly to a monitoring or security system that includes motion sensors, mechanical sensors, optical sensors, electrical sensors, smoke detectors, carbon monoxide detectors, and/or other safety and security monitoring devices. When the monitoring system detects a security or safety problem (e.g., break-in, fire, excessive carbon monoxide levels), the monitoring system sends its alarm signal to the security interface 328, which in turn forwards the alarm signal to the IP network through the ALD server 100 for delivery to the target IP address (e.g., the security monitoring service provider).

The security device interface 328 may also be capable of communicating with the attached security device through the IP device interface to recognize a notification message from the device that it has lost its line based telephone connection. Once that notification has been received, an alert message is formatted and sent to the ALD server 100 through the IP based communication converter 312.

Operation of the power management system 10 in accordance with exemplary embodiments will now be described. In one embodiment, customers initially sign up for power load management services using a web browser, or any web-enabled device. Using the web browser, the customer accesses a power management system provider's website through the web browser interface 114 and provides his or her name and address information, as well as the type of equipment he or she would like to have controlled by the power load management system and/or ALD 10 to save energy at peak load times and to accumulate power savings or carbon credits (which may be used to receive reward incentives based upon the total amount of power, PSV, or carbon saved by the customer). The customer may also agree to allow management of power consumption via PTBs during non-peak times to sell back excess power to the utility, while simultaneously accumulating power savings or carbon credits.

The customer sign up application 116 creates a database entry for each customer in the ALD database 124. Each customer's contact information and load management preferences are stored or logged in the database 124. For example, the customer may be given several simple options for managing any number of devices or class of devices, including parameters for managing the devices (e.g., how long each type of device may be switched off, reduced, and/or define hours when the devices may not be switched off at all) in a building control system a plurality of options exists. In particular, the customer may also be able to provide specific parameters for HVAC operations (e.g., set control points for the HVAC system specifying both the low and high temperature ranges). Additionally, the customer may be given an option of receiving a notification (e.g., an email message, Instant Message, Text Message, or recorded phone call, or any combination thereof) when a power management event occurs. When the customer completes entering data, a "New Service" or equivalent transaction message or command is sent to the service dispatch manager 126.

Referring now again to FIG. 28 an exemplary operational flow diagram is illustrated providing steps executed by the ALD server 100 (e.g., as part of the service dispatch manager 126) to manage service requests in the exemplary power load management system 10, in accordance with one embodiment of the present invention. The steps of FIG. 28 are preferably implemented as a set of computer instructions (software) stored in a memory (not shown) of the ALD server 100 and executed by one or more processors (not shown) of the ALD server 100. Pursuant to the logic flow, the service dispatch manager 126 receives a transaction message or command and determines the type of transaction. Upon receiving a "New Service" transaction message, the service dispatch manager 126 schedules a service person (e.g., technician) to make an initial installation visit to the new customer. The service dispatch manager 126 then notifies the scheduled service person, or dispatcher of service personnel, of an awaiting service call using, for example, email, text messaging, and/or instant messaging notifications.

Alternatively, a technician can use a "joining" device such as a PC, computer, tablet computer, smartphone, etc.

In one embodiment, responsive to the service call notification, the service person obtains the new customer's name and address, a description of the desired service, and a service time from a service dispatch manager service log. The service person obtains an active load client 300, all necessary smart breaker modules 402-412, and all necessary smart switches and/or ALCs to install at the customer location. The service person notes any missing information from the customer's database information (e.g., the devices being controlled, type make and model of each device, and any other information the system will need to function correctly). The service person installs the active load client 300 and smart breakers 402-412 at the new customer's location. A global positioning satellite (GPS) device may optionally be used by the service person to determine an accurate geographic location of the new customer building, which will be added to the customer's entry in the ALD database 124 and may be used to create a symmetric encryption key to facilitate secure communications between the ALD server 100 and the active load client 300. The physical location of the installed active load client 300 is also entered into the customer's entry. Smart switch devices may be installed by the service person or left at the customer location for installation by the customer. After the active load client 300 has been installed, the service dispatch manager 126 receives a report from the service person, via a service log, indicating that the installation is complete. The service dispatch manager 126 then sends an "Update" or equivalent transaction message to the ALC manager 108.

When a "Service" or similar transaction message or command is received, the service dispatch manager 126 schedules (512) a service person to make a service call to the specified customer. The service dispatch manager 126 then sends a "Diagnose" or similar transaction to the ALC diagnostic manager 122. The ALC diagnostic manager 122 returns the results of the diagnostic procedure to the service dispatch manager 126, which then notifies the service person of the service call and provides him or her with the results of the diagnostic procedure using a conventional trouble ticket. The service person uses the diagnostic procedure results in the trouble ticket to select the type of equipment and replacement parts necessary for the service call including a "join", "rejoin", or "network" command to form an ALC-enabled load control network.

Preferably, the systems and methods of the present invention provide for automated remote updating of ALCs, including but not limited to software, firmware, chipsets, kernels, and combinations thereof. Updating through the ALD(s) and/or central server, and/or dedicated server for updating ALCs is provided by the present invention. Also, commands are sent for purposes for updating PSV, PTB by a central and/or remote device or server, or processor, meant to enhance for update PSV, PTB, or location of PTB server point ASIC within an IP message or proprietary message that deal with table spaces, pricing, changes in acceptable time increments, status messages, location of market (LMP, node, electrical bus, etc.) for the load for marketing, aggregated, settled, and combinations thereof. The updating is for purposes of PSV, PTB, or ability to know the health and/or status of any zone within the electric power grid. Thus, the systems and methods of the present invention provide for automatic updating by remote server or dedicated device(s), through ALD(s) and/or directly to ALC(s) that affect any aspect of updating of ALCs relating to software, firmware, rules, metrology, ASICs, chipsets, machine code, operating systems, and combinations thereof. Furthermore, ALCs may be updated for improved or increased accuracy of ALCs to qualify PSV and PTB associated therewith. Also, the present invention provides for ALCs with smart cross-communication that provide for at least one ALC to transmit commands to at least one other ALC within the network associated with the electric power grid.

Figure 30:
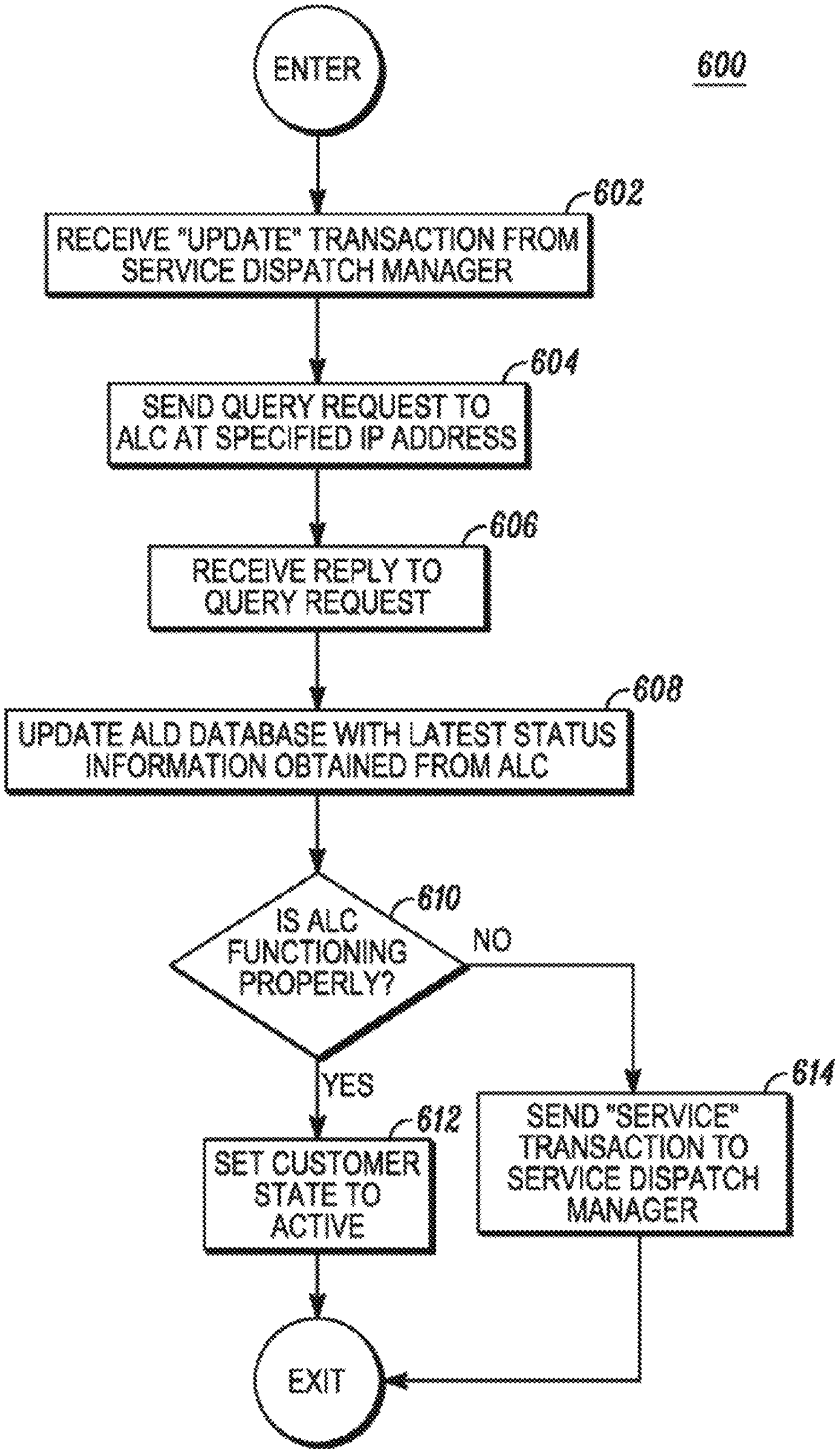
FIG. 30 is a flow diagram illustrating steps in a method for updating information relating to ALCs and/or ALD database.

FIG. 30 illustrates an exemplary operational flow diagram 600 providing steps executed by the ALD server 100 (e.g., as part of the ALC manager 108) to confirm customer sign-up to the power load management system 10, in accordance with one embodiment of the present invention. The steps of FIG. 5 are preferably implemented as a set of computer instructions (software) stored in a memory (not shown) of the ALD server 100 and executed by one or more processors (not shown) of the ALD server 100. In accordance with the logic flow, the ALC manager 108 receives (602) an "Update" or similar transaction message or command from the service dispatch manager 126 and uses the IP address specified in the "Update" message to send (604) out a "Query Request" or similar message or command to the active load client 300. The "Query Request" message includes a list of devices the ALD server 100 expects to be managed. If the customer information input at customer sign-up includes temperature set points for one or more load-controllable devices, that information is included in the "Query Request" message. Updating software, firmware, or any code embodiment via communication network via IP messages after the ALC are installed via the ALD or other operations processor/database. The ALC manager 108 receives (606) a query reply containing information about the active load client 300 (e.g., current IP network, operational state (e.g., functioning or not), setting of all the counters for measuring current usage (e.g., all are set to zero at initial set up time), status of devices being controlled (e.g., either switched to the "on" state or "off" state)). The ALC manager 108 updates (608) the ALD database 124 with the latest status information obtained from the active load client 300. If the ALC manager 108 detects (610), from the query reply, that the active load client 300 is functioning properly, it sets (612) the customer state to "active" to allow participation in ALD server activities. However, if the ALC manager 108 detects (610) that the active load client 300 is not functioning properly, it sends (614) a "Service" or similar transaction message or command to the service dispatch manager 126.

Referring now again to previously described FIG. 1C, an exemplary operational flow diagram 700 is illustrated providing steps executed by the ALD server 100 (e.g., as part of the master event manager 106) to manage events in the exemplary power load management system 10, in accordance with one embodiment of the present invention. The steps of FIG. 6 are preferably implemented as a set of computer instructions (software) stored in a memory (not shown) of the ALD server 100 and executed by one or more processors (not shown) of the ALD server 100. Pursuant to the logic flow, the master event manager 106 tracks (702) current power usage and/or PSV within each utility being managed by the ALD server 100. When the master event manager 106 receives (704) a transaction message or command from the UCC command processor 104 or the ALC manager 108, the master event manager 106 determines (706) the type of transaction received. Upon receiving a "Cut" or "reduce" transaction from the UCC command processor 104 (resulting from a "Cut" or "reduce" command issued by the utility control center 200), the master event manager 106 places (708) the utility in a managed logical state. The master event manager then sends (710) a "Cut" or "reduce" transaction or event message or command to the ALC manager 108 identifying the amount of power and/or PSV and/or PTB (e.g., in megawatts) that must be removed from the power system supplied by the utility. The amount of power specified for reduction in a "Cut" or "reduce" command may be an instantaneous amount of power and/or PSV and/or PTB or an average amount of power and/or PSV and/or PTB per unit time. Finally, the master event manager 106 notifies (711) every customer that has chosen to receive a notification (e.g., through transmission of an email or other pre-established notification technique) that a power management event is in process.

Returning to block 706, when the master event manager 106 receives a "How Much" or other equivalent power inquiry transaction message or command from the UCC command processor 104 (resulting from a "How Much" and/or PSV and/or PTB or equivalent power inquiry command issued by the utility control center 200), the master event manager 106 determines (712) the amount of power and/or PSV and/or PTB that may be temporarily removed from a particular utility's managed system by accessing the current usage information for that utility. The current usage information is derived, in one embodiment, by aggregating the total available load for the serving utility, as determined from the customer usage information for the utility stored in the ALD database 124, based on the total amount of power and/or PSV and/or PTB that may have to be supplied to the utility's customers in view of the statuses of each of the active load clients 300 and their respectively controllable load devices 402-412, 420, 460 during the load control interval identified in the "How Much" and/or PSV and/or PTB message.

Each utility may indicate a maximum amount of power or maximum percentage of power to be reduced during any power reduction event. Such maximums or limits may be stored in the utility P&C database 134 of the ALD server 100 and downloaded to the master event manager 106. In one embodiment, the master event manager 106 is programmed to remove a default one percent (1%) of the utility's current power consumption during any particular power management period (e.g., one hour). In alternative embodiments, the master event manager 106 may be programmed to remove other fixed percentages of current power consumption or varying percentages of current power consumption based on the current power consumption (e.g., 1% when power consumption is at system maximum and 10% when power consumption is at only 50% of system maximum). Based on the amount of power to be removed, the master event manager 106 sends (710) a "Cut" or equivalent event message to the ALC manager 108 indicating the amount of power (e.g., in megawatts) that must be removed from the utility's power system (e.g., 1% of the current usage), and notifies (711) all customers that have chosen to receive a notification that a power management event is in process. The master event manager 106 also sends a response to the utility control center 200 via the UCC command processor 104 advising the utility control center 200 as to the quantity of power that can be temporarily reduced by the requesting utility.

Returning once again to block 706, when the master event manager 106 receives an "End Event" or equivalent transaction message or command from the UCC command processor 104 (resulting from an "End Event" command issued by the utility control center 200), the master event manager 106 sets (714) the state of the current event as "Pending" and sends (716) an "End Event" or equivalent transaction message or command to the ALC manager 108. When the ALC manager 108 has performed the steps necessary to end the present event (e.g., a power reduction or Cut event), the master event manager 106 receives (718) an "Event Ended" or equivalent transaction from the ALC manager 108 and sets (720) the utility to a logical "Not Managed" state. The master event manager 106 then notifies (722) each customer that has chosen to receive a notification (e.g., through transmission of an email or other pre-established notification mechanism) that the power management event has ended. Finally, the master event manager 106 sends an "Event Ended" or equivalent transaction message or command to the power savings application 120 and the utility control center 200 (via the UCC command processor 104).

Turning now again to FIG. 1D, also previously described, exemplary operational flow diagram 800 illustrates steps executed by the ALD server 100 (e.g., as part of the ALC manager 108) to manage power consumption in the exemplary power load management system 10, in accordance with one embodiment of the present invention. The steps of FIG. 1D are preferably implemented as a set of computer instructions (software) stored in a memory of the ALD server 100 and executed by one or more processors of the ALD server 100. In accordance with the logic flow, the ALC manager 108 tracks (802) the state of each managed active load client 300 by receiving messages, periodically or responsive to polls issued by the ALC manager 108, from every active load client 300 that the ALC manager 108 manages. These messages indicate the present states of the active load clients 300. The state includes the present consumption of power for each controllable device 402-412, 420 controlled by the active load client 300 (or the total power consumption for all controllable devices 402-412, 420 controlled by the active load client 300 if individual device metering is not available) and the status of each device 402-412, 420 (e.g., either "Off" or "On" or "Reduce"). The ALC manager 108 stores or logs (804) the power consumption and/or PSV and/or PTB and device status information in the ALD database 124 in a record corresponding to the specified active load client 300 and its associated customer and serving utility. Note that there may be distributed throughout the grid a multiplicity of ALCs and ALDs that are networked and responsive to the grid operator, EMS, utility, market participant, and combinations thereof. Furthermore, ALCs aggregate corresponding PSVs and/or PTBs, preferably at the electrical bus level, LMP, RTO, BA, etc. at appropriate PTBs for settlement purposes and other EMS requirements.

When the ALC manager 108 receives (806) a transaction message from the master event manager 106, the ALC manager 108 first determines (808) the type of transaction received. If the ALC manager 108 receives a "Cut" or equivalent transaction message or command from the master event manager 106, the ALC manager 108 enters (810) a "Manage" logical state. The ALC manager 108 then determines (812) which active load clients 300 and associated devices 402-412, 420 operating on the utility specified in the "Cut" message to switch to the "Off" state (or reduce). If a location (e.g., list of GPS coordinates, a GPS coordinate range, a geographic area, or a power grid reference area) is included in the "Cut" or reduce transaction message, only those active load clients 300 within the specified location are selected for switching to the "Off" or reduce state. In other words, the ALC manager 108 selects the group of active load client devices 300 to which the issue a "Turn Off" or reduce transaction message based at least partially on the geographic location of each active load client 300 as such location relates to any location identified in the received "Cut" or reduce transaction message. The ALD database 124 contains information on the present power consumption (and/or the average power consumption and/or PSV and/or PTB) for each controllable device 402-412, 420 connected to each active load client 300 in the system 10. The ALC manager 108 utilizes the stored power consumption information and/or PSV and/or PTB to determine how many, and to select which, devices 402-412, 420 to turn off to achieve the power reduction required by the "Cut" message. The ALC manager 108 then sends (814) a "Turn Off" or equivalent transaction message or command to each active load client 300, along with a list of the devices to be turned off and a "change state to off or reduce" indication for each device 402-412, 420 in the list. The ALC manager 108 then logs (816) the amount of power (either actual or average), as determined from the ALD database 124, saved for each active load client 300, along with a time stamp indicating when the power was reduced and/or target PSV and/or PTB was achieved. The ALC manager 108 then schedules (818) transactions for itself to "Turn On" each turned-off device after a predetermined period of time, including customer profile, or "drift" (e.g., which may have been set from a utility specified default, set by instructions from the customer, or otherwise programmed into the ALC manager 108).

Returning back to block 808, when the ALC manager 108 receives a "Turn On" or equivalent transaction message or command from the master event manager 106 for a specified active load client 300, and the ALC manager's state is currently in a "Manage" state, the ALC manager 108 finds (820) one or more active load clients 300 that are in the "On" state and do not have any of their managed devices 402-412, 420 turned off (and are in the specified location if so required by the original "Cut" or reduce transaction message), which, when one or more of such devices 402-412, 420 are turned off or reduced, will save the same or substantially the same amount of power and/or PSV and/or PTB that is presently being saved by the specified active load clients that are in the "Off" or reduce state. Upon identifying new active load clients 300 from which to save power, the ALC manager 108 sends (822) a "Turn Off" or reduce or equivalent transaction message or command to each active load client 300 that must be turned off or power thereto reduced in order to save the same amount of power and/or PSV and/or PTB, as the active load client(s) (ALCs) to be turned on (i.e., to have its or their managed devices 402-412, 420 turned on) or to save an otherwise acceptable amount of power and/or PSV and/or PTB (e.g., a portion of the power previously saved by the active load client(s) to be turned back on). The ALC manager 108 also sends (824) a "Turn On" or equivalent transaction message or command to each active load client 300 to be turned back on. The "Turn On" message instructs all active load clients 300 to which the message was directed to turn on any controllable devices that have been turned off, and causes the affected active load clients 300 to instruct their controllable devices 402-412, 420 to enable the flow of electric power to their associated power consuming devices (e.g., appliance, HVAC unit, and so forth). Finally, the ALC manager 108 logs (826) the time that the "Turn On" transaction message is sent in the ALD database 124.

Returning once again to block 808, when the ALC manager 108 receives an "End Event" or equivalent transaction message or command from the master event manager 106, the ALC manager 108 sends (828) a "Turn On" or equivalent transaction message or command to every active load client 300 which is currently in the "Off" or reduce state and is served by the serving utility identified in the "End Event" message or to which the "End Event" message relates. Upon determining (830) that all the appropriate active load clients 300 have transitioned to the "On" state, the ALC manager 108 sends (832) an "Event Ended" or equivalent transaction message or command to the master event manager 106.

An exemplary operational flow of steps executed by the ALD server 100 (e.g., through operation of the power savings application 120) to calculate and allocate power savings in the power load management system 10, in accordance with one embodiment of the present invention is further described herein. The power savings application 120 calculates the total amount of power saved by each utility for each Cut or reduce event and the amount of power saved by each customer possessing an active load client (ALC) 300, against a baseline.

According to the logic flow of FIG. 26, the power savings application 120 receives (902) an "Event Ended" or equivalent transaction message or command from the master event manager 106 each time a "Cut" or reduce or power savings event has ended. The power savings application 120 then accesses (904) the ALD database 124 for each active load client 300 involved in the "Cut" or reduce event. The database record for each active load client 300 contains the actual amount (or average amount) of power and/or PSV and/or PTB that would have been used by the active load client 300 during the last "Cut" or reduce event, along with the amount of time that each controllable device 402-412, 420 associated with the active load client 300 was turned off. The power savings application 120 uses this information to calculate the amount of power (e.g., in megawatts per hour) that was saved for each active load client 300. The total power savings and/or PSV and/or PTB for each active load client 300 is stored in its corresponding entry in the ALD database 124. A running total of power saved is kept for each "Cut" or reduce transaction. Each utility that is served by the ALD server 100 has an entry in the utility P&C database 134. The power savings application 120 stores (906) the total amount of power and/or PSV and/or PTB (e.g., in megawatts per hour) saved for the specific utility in the utility's corresponding entry in the utility or market participant P&C database 134, along with other information related to the power savings event (e.g., the time duration of the event, the number of active load clients (ALCs) required to reach the power savings and/or PSV and/or PTB, average length of time each device was in the off state, plus any other information that would be useful in fine tuning future events and in improving customer experience). When all active load client entries have been processed, the power savings application 120 optionally invokes (908) the carbon savings application 132 or, analogously, a sulfur dioxide savings application or a nitrogen dioxide savings application, to correlate the power savings with carbon credits, sulfur dioxide credits or nitrogen dioxide credits, respectively, based on the geographic locations of the particular serving utility or market participant and customer. Additionally, in one embodiment, the carbon savings application 132 determines carbon credits based on government approved or supplied formulas and stores the determined carbon credits and/or PSV and/or PTB on a per customer and/or per utility basis.

As described above, the present invention encompasses a method for managing and distributing power within a power management system based on real-time feedback from addressable and remotely controllable devices including the actual amount of power currently being individually or collectively consumed by the addressable devices. With this invention, a power management system may pinpoint specific areas of high power usage and more accurately distribute power loads to utilities in need. Additionally, the present invention provides optional participation incentives for customers based on the amount of their actual participation in the power management system.

Additionally, customer profiles for power consumption are included in the present invention. The embodiments described utilize concepts disclosed in published patent application US 2009/0062970, entitled "System and Method for Active Power Load Management" which is incorporated by reference in its entirety herein. The following paragraphs describe the Active Management Load System (ALMS), which includes at least one Active Load Director (ALD), and at least one Active Load Client (ALC) in sufficient detail to assist the reader in the understanding of the embodiments described herein. More detailed description of the ALMS, ALD, and ALC can be found in US 2009/0062970, which is incorporated herein by reference in its entirety.

Embodiments described herein utilize the Active Load Management System (ALMS) that is fully described in published patent application US 2009/0062970. The ALMS captures energy usage data at each service point and stores that data in a central database. This data describes all of the energy consumed by devices owned by each customer, as well as additional information, such as customer preferences. Other embodiments of the ALMS and/or ALC/ALD combination focus on use of this information in the calculation of carbon credits or for the trading of unused energy.

In one embodiment, a system and method are provided for creating and making use of customer profiles, including energy consumption patterns. Devices within a service point, using the active load director, may be subject to control events, often based on customer preferences. These control events cause the service point to use less power. Data associated with these control events, as well as related environment data, are used to create an energy consumption profile for each service point. This can be used by the utility to determine which service points are the best targets for energy consumption. In addition, an additional algorithm determines how to prevent the same service points from being picked first each time the utility wants to conserve power.

In one embodiment, a method is provided for determining and using customer energy profiles to manage electrical load control events on a communications network between a server in communication with an electric utility and a client device at each of a plurality of service points. A customer profile is generated at the server for each of a plurality of customers including at least energy consumption information for a plurality of controllable energy consuming devices at an associated service point. The plurality of customer profiles is stored in a database at the server for use in load control events. The plurality of customer profiles are aggregated into a plurality of groups based on at least one predetermined criterion, for example PSV and/or PTB, grouping by bus, as required.

A candidate list of service points for load control events based on the predetermined criterion is generated at the server. A load control event is sent to at least one selected service point in the candidate list of service points in response to an energy reduction request including a target energy savings received from the electric utility via the communications network. An energy savings for the plurality of controllable energy consuming devices resulting from the load control event at the selected service point is determined at the server. The server determines if the resulting energy savings is at least equal to the target energy savings. The load control event is sent to at least one selected additional service point in the candidate list of service points in order to reach the target energy savings, if the target energy savings has not been reached.

In one embodiment, a system is provided for determining and using customer energy profiles to manage electrical load control events on a communications network between a server in communication with an electric utility and a client device at each of a plurality of service points, including an interface for each customer location that could be an ALC, smart meter, building control, and combinations thereof. The system includes a memory storing a database containing a plurality of customer profiles for load control events wherein each customer profile includes at least energy consumption information for a plurality of controllable energy consuming devices at an associated service point; and a server processor, cooperative with the memory, and configured for managing electrical load control events on the communications network to the plurality of service points by: generating a customer profile for each of a plurality of customers; aggregating the plurality of customer profiles into a plurality of groups based on at least one predetermined criterion; generating a candidate list of service points for load control events based on the predetermined criterion; sending a load control event to at least one selected service point in the candidate list of service points in response to an energy reduction request including a target energy savings received from the electric utility via the communications network; determining an energy savings for the plurality of controllable energy consuming devices resulting from the load control event at the selected service point; determining if the resulting energy savings is at least equal to the target energy savings; and sending the load control event to at least one selected additional service point in the candidate list of service points in order to reach the target energy savings.

Note that control events, command and control messages, and time periods, and combinations thereof, managed by the ALCs and/or ALDs, and other messaging used in embodiments of the invention include regulated load management messages. Regulated load management messages contain information used to apply control of the electric supply to individual appliances or equipment on customer premises. The load to be controlled includes native load and operating reserves including regulating, spinning, and non-spinning types. The embodiments disclosed make use of the "customer profiles" concept. The ALMS and/or ALC/ALD combination(s) enables data to be gathered to generate a profile of each customer, including information about controllable energy consuming devices, and the related individual structures or service points. Customer profiles reside within the Active Load Director Database 124 in the Active Load Director 100. Included in this customer profile is the customer's pattern of energy consumption.

The customer profile includes, but is not limited to, the following: (1) customer name; (2) customer address; (3) geodetic location; (4) meter ID; (5) customer programs (possibly including program history); (6) device information, including device type and manufacturer/brand; (7) customer energy consumption patterns; and (8) connection and disconnection profile. The connection/disconnection profile can include service priority (i.e., elderly, police, etc.) and disconnection instructions. The customer profile is created by using data gathered from within the ALMS. Data gathered or calculated includes, but is not be limited to, the following: (1) set points; (2) energy and average energy used in a given time period; (3) energy and average energy saved in a given time period; (4) drift time per unit temperature and average drift time; and (5) power time per unit temperature and average power time per unit temperature.

In other embodiments, additional data called "variability factors" may be captured by the ALMS or ALC/ALD combination as part of the customer profile, including, but not limited to, the following: (1) outside temperature, (2) sunlight, (3) humidity, (4) wind speed and direction, (5) elevation above sea level, (6) orientation of the service point structure, (7) duty duration and percentage, (8) set point difference, (9) current and historic room temperature, (10) size of structure, (11) number of floors, (12) type of construction (brick, wood, siding etc.) (13) color of structure, (14) type of roofing material and color, (15) construction surface of structure (built on turf, clay, cement, asphalt etc.), (16) land use (urban, suburban, rural), (17) latitude/longitude, (18) relative position to jet stream, (19) quality of power to devices, (20) number of people living in and/or using structure and (21) other environmental factors.

Additional factors may also be deemed necessary for determining unique energy consumption patterns and generating performance curves and data matrices for usage in load control events and other purposes detailed in this and related patent applications.

By way of example, based upon the reduction in consumed power, the systems and methods of the present invention provide for generating at the control center a power supply value (PSV) corresponding to the reduction in consumed power by the power consuming device(s). Importantly, the PSV is an actual value that includes measurement and verification of the reduction in consumed power; such measurement and verification methods may be determined by the appropriate governing body or authority for the electric power grid(s). Power Supply Value (PSV) is calculated at the meter or submeter or at building control system or at any device or controller that measures power within the standard as supplied by the regulatory body(ies) that govern the regulation of the grid. PSV variations may depend on operating tolerances, operating standard for accuracy of the measurement. The PSV enables transformation of curtailment or reduction in power at the device level by any system that sends or receives an IP message to be related to or equated to supply as presented to the governing entity that accepts these values and award supply equivalence, for example of a power generating entity or an entity allowed to control power consuming devices as permitted by the governing body of the electric power grid, e.g., FERC, NERC, etc.

PSV may be provided in units of electrical power flow, monetary equivalent, and combinations thereof. Thus, the PSV provides an actual value that is confirmed by measurement and/or verification, thereby providing for a curtailment value as a requirement for providing supply to the power grid, wherein the supply to the power electric power grid is provided for grid stability, voltage stability, reliability, and combinations thereof, and is further provided as responsive to an energy management system or equivalent for providing grid stability, reliability, frequency as determined by governing authority for the electric power grid and/or grid operator(s).

As part of the Active Load Directory (ALD), the methods described herein consolidate this information creating a historic energy consumption pattern reflecting the amount of energy used by each service point to maintain its normal mode of operation. This energy consumption pattern is part of a customer's profile.

Energy consumption patterns are subject to analysis that may be used for a variety of different types of activities. For example, based on the energy consumption patterns created from this data, the ALD will derive performance curves and/or data matrices for each service point to which the Active Load Management System (ALC/ALD combination(s)) is attached and determine the amount of energy reduction that can be realized from each service point. The ALD will create a list of service points through which energy consumption can be reduced via demand side management, interruptible load, or spinning/regulation reserves. This information can be manipulated by the ALD processes to create a prioritized, rotational order of control, called "intelligent load rotation" which is described in detail below. This rotational shifting of the burden of the interruptible load has the practical effect of reducing and flattening the utility load curve while allowing the serving utility to effectively group its customers within the ALD or its own databases by energy efficiency.

The practical application of this data is that in load control events, a utility can determine the most efficient service points to dispatch energy from, or more importantly derive the most inefficient service points (e.g., homes, small businesses, communities, structures, or devices) within the utility's operating territory. Based on this information, highly targeted conservation programs could have an immediate impact to improve energy efficiency. From a marketing perspective, this is invaluable information because it contains the comfort preference of a service point compared against the capabilities of the service point's energy consuming devices, or the lack of efficiency of those devices. From a national security point of view, the profiles could be used to determine habits of monitored end customers in a similar fashion to how Communications Assistance for Law Enforcement Act (CALEA) is used by law enforcement for wire-tapping. Utilities may use energy consumption patterns to categorize or group customers for service, control event, marketing, sales, or other purposes. Other uses of energy consumption patterns are possible that determine or predict customer behavior.

Generally, the embodiments described encompass a closed loop system and method for creating a customer profile, calculating and deriving patterns of energy drift, and making use of those patterns when implemented through the machinery of a system comprised of load measurement devices combined with the physical communications link and when these inputs are manipulated through a computer, processor, memory, routers and other necessary machines as those who are skilled in the art would expect to be utilized.

The embodiments described also make use of the concept of "drift." The data gathered for the customer profile is used to empirically derive the decay rate or drift, temperature slope, or a dynamic equation (f{x}) whereby the service point (or device) will have a uniquely derived "fingerprint" or energy usage pattern.

Drift occurs when a climate-controlled device begins to deviate from a set point. This may occur both normally and during control events. Customers define the upper and lower boundaries of comfort in customer preferences, with the set point in the middle of those boundaries. During normal operation, a climate controlled device will attempt to stay near the device's set point. However, all devices have a duty cycle that specifies when the device is in operation because many devices are not continuously in operation. For a climate-controlled device, the duty cycle ends when the inside temperature reaches, or is within a given tolerance of, the set point. This allows the device to "drift" (upward or downward) toward a comfort boundary temperature. Once the boundary temperature is reached, the duty cycle begins again until the inside temperature reaches, or is within a given tolerance of, the set point which ends the duty cycle.

Therefore, drift is the time it takes for a climate-controlled device to move from the set point to the upper or lower comfort boundary. Drift is calculated and recorded for each service point and for each device associated with the service point. The inverse of drift is "power time" which is the time it takes for the device to move from the comfort boundary to the set point.

Drift may also occur during a control event. A control event is an action that reduces or terminates power consumption of a device. During a control event, a climate-controlled device will drift toward maximum or minimum control event boundaries (upper or lower) until it reaches that boundary which is normally outside the comfort boundary. Once it reaches the control event boundary, the ALMS returns power to the device to enable it to reach the set point again.

As an example, an HVAC system may have a set point of 72.degree. and a minimum and maximum temperature of 68.degree. and 76.degree., respectively. On a cold day, a control event would cause the HVAC system to begin to lose power and move toward the minimum temperature. Once the structure reaches the minimum temperature, the control event would end, and power would be restored to the HVAC system, thus causing the temperature to rise toward the preferred temperature. A similar but opposite effect would take place on a warm day.

In some embodiments, drift, as well as other measurements available from the active load director data base 124, are used to create an energy consumption pattern for each service point. Additional measurements may include vacancy times, sleep times, times in which control events are permitted, as well as variability factors referred to previously.

A device that resides within an energy-efficient structure will have a tendency to cool or heat more slowly, thus exhibiting a lower rate of drift. These devices may be subject to control events for longer periods of time, commensurate with the rate of drift, because it takes them longer to drift to a comfort boundary.

In another embodiment, the active load director server 100 identifies service points that have an optimum drift for power savings. The power savings application 120 calculates drift for each service point and saves that information in the active load director data base 124.

The embodiments disclosed also make use of the "intelligent load rotation" concept. Intelligent load rotation uses machine intelligence to ensure that the same service points are not always selected for control events, but distributes control events over a service area in some equitable way.

There are a variety of ways in which intelligent load rotation may be implemented. In one embodiment of intelligent load rotation, service points are simply selected in a sequential list until the end is reached, after which selection starts at the top of the list again. This is a fairly straightforward approach that may be implemented by any one skilled in the art.

The present invention further includes a basic intelligent load rotation algorithm. In general, the algorithm goes through each service point within a group of service points, and sends control events to each of those service points until enough energy savings have been obtained.

In its most basic form, the algorithm first identifies a group selection criteria as indicated in logic block. This may be as simple as all service points or may be more complex, such as selecting service points within a specified drift or within a specified geographic area. The group selection criteria may include, but is not limited to, any of the following: (1) random selection of service points; (2) drift; (3) grouping of logical geodetic points by a utility; (4) efficiency rating of appliances; (5) ALD customer preferences; (6) capacity of devices; (7) proximity to transmission lines; (8) pricing signals (both dynamic and static); and (9) service priority, based upon an emergency situation (i.e. fire, police, hospital, elderly, etc.), the required level of operating reserves from market participant, grid operator, EMS, and equivalent.

The algorithm then identifies an individual service point selection criterion as indicated in logic block. This is the criterion for selecting individual service points within a group. In its simplest embodiment, this criterion involves sequential selection of service points within the group. Other criteria may include random selection, selection based on number of previous control events, or other criteria.

Next, the algorithm creates a candidate list of service points based on the group selection criteria as indicated in logic block. From this list, the algorithm selects a service point based on the individual service point selection criteria as indicated in logic block. The ALMS then sends a control event to the selected service point as indicated in logic block, and calculates the energy savings of that control event based on drift calculation as indicated in block. The algorithm then determines if more energy savings are needed to reach the savings target as indicated in decision block. If not, then the ALMS records where the algorithm ended in the candidate list as indicated in block 1824 and exits. If more energy savings are needed, then the ALMS determines if any more service points are in the candidate list as indicated in decision block. If there are no more service points in the candidate list, then the algorithm returns to the beginning of the candidate list again in logic block. Otherwise, if there are more service points in the candidate list, the algorithm simply returns to logic block.

In an alternate embodiment, decision block may be modified to determine if more service points are to be selected from this group.

There are many other embodiments of intelligent load rotation. Many embodiments are based on the group selection criteria. Service points may be grouped by geography or some other common characteristic of service points. For example, groups might include "light consumers" (because they consume little energy), "daytime consumers" (because they work at night), "swimmers" (for those who have a pool and use it), or other categories. These categories are useful to the utility or market participant, grid operator, EMS, or equivalent for quickly referring to customers with specific energy demographics. The utility or market participant, grid operator, EMS, or equivalent may then select a number of service points in each group for control events to spread control events among various groups.

In another embodiment, optimum drift can be used as the group selection criteria. Because those service points will use the least energy, the utility may want to select those service points that are the most energy efficient.

In another embodiment, a group of service points is selected that have had the fewest control events in the past. This ensures that service points with the most control events in the past will be bypassed in favor of those who have received fewer control events.

In another embodiment, with reference to FIGS. 24-25, drift is used as a means of intelligent load rotation. As data is collected by the ALMS or ALC/ALD combinations, it is possible to calculate the total drift of a device over time, as shown in FIG. 24. The calculation for one service point represents one vector on the graph. Each vector represents the drift for a single service point. To identify the service points with the optimal drift, the ALD 100 determines the median drift and all service points having a drift that is within one standard deviation away from that median. That represents the shaded area in the graph depicted in FIG. 25. If sufficient service points cannot be found that are within one standard deviation, then the second standard deviation can be selected.

In another embodiment, energy consumption patterns in customer profiles are used to identify service points that are the best targets for excess power sharing. This would occur when renewable energy such as solar or wind is added to the grid, resulting in power that cannot be compensated for by the grid. This could occur, for example, on very windy days. When this happens, utilities or market participant, grid operator, EMS, or equivalent are faced with the problem of what to do with the excess energy. Instead of cutting power to service points in order to affect power savings, a utility, market participant, grid operator, EMS, or equivalent could add energy to service points in order to effect power dissipation. The service points selected by the utility may be different (or even the inverse) of those selected for power savings. The devices at these service points would be turned on if they were off or set points for climate-controlled devices would be adjusted to heat or cool more than normal. Spread out over many control points, this can provide the energy dissipation needed.

In a further embodiment, energy consumption patterns within customer profiles could be used to identify opportunities for up selling, down selling, or cross selling. These opportunities may be determined by the power utility or by its partners. Data from customer profiles may be used to provide insights on inefficient devices, defective devices, or devices that require updating to meet current standards. Customer profile data may also be used to identify related sales opportunities. For example, if energy consumption patterns suggest that the customer may be very interested in personal energy conservation, then sales efforts could be directed toward that individual concerning products related to that lifestyle. This information can be used by the utility or its partners to provide incentives to customers to buy newer, updated devices, or obtain maintenance for existing devices. The customer is given the option to opt out of having his customer profile used for sales and marketing efforts, or for regulating energy conservation. The customer profile makes use of open standards (by way of example and not limitation, the CPExchange standard) that specify a privacy model with the customer profile. The use of consumption patterns in this manner is governed by national, state, or local privacy laws and regulations.

A further embodiment of using customer profiles to identify sales opportunities involves the use of device information to create incentives for customers to replace inefficient devices. By identifying the known characteristics and/or behavior of devices within a service point, the invention identifies those customers who may benefit from replacement of those devices. The invention estimates a payback period for replacement. This information is used by the ALC/ALD operator to create redemptions, discounts, and campaigns to persuade customers to replace their devices.

Furthermore, customer profiles when combined with characteristics about the load consuming devices, the structure or building that consumes electricity, or a combination of many human & thermodynamic factors, weather (both forecasted & actual), can assist utilities, REPs, market participants, or Demand Response Aggregators (commonly referred to as Curtailment Service Providers or “CSPs” who are themselves Market Participants) form unique energy consumption data and “curves” that would provide a utility, REP, Market Participant, CSP or any other entity that has been granted permission by the Grid Operator or governing body of the electric utility grid, to create estimated and actual Power Supply Values for how much power is available to remove from the grid under the positive control of both the consumer and the utility, REP, CSP, Market Participant or grid operators. The system uses the information and selects based upon the profiles and quality of the devices to give the most PSV for operating reserves back to the grid with minimized tangible impact on the consumer or the device following a curtailment event.

Figure 31:
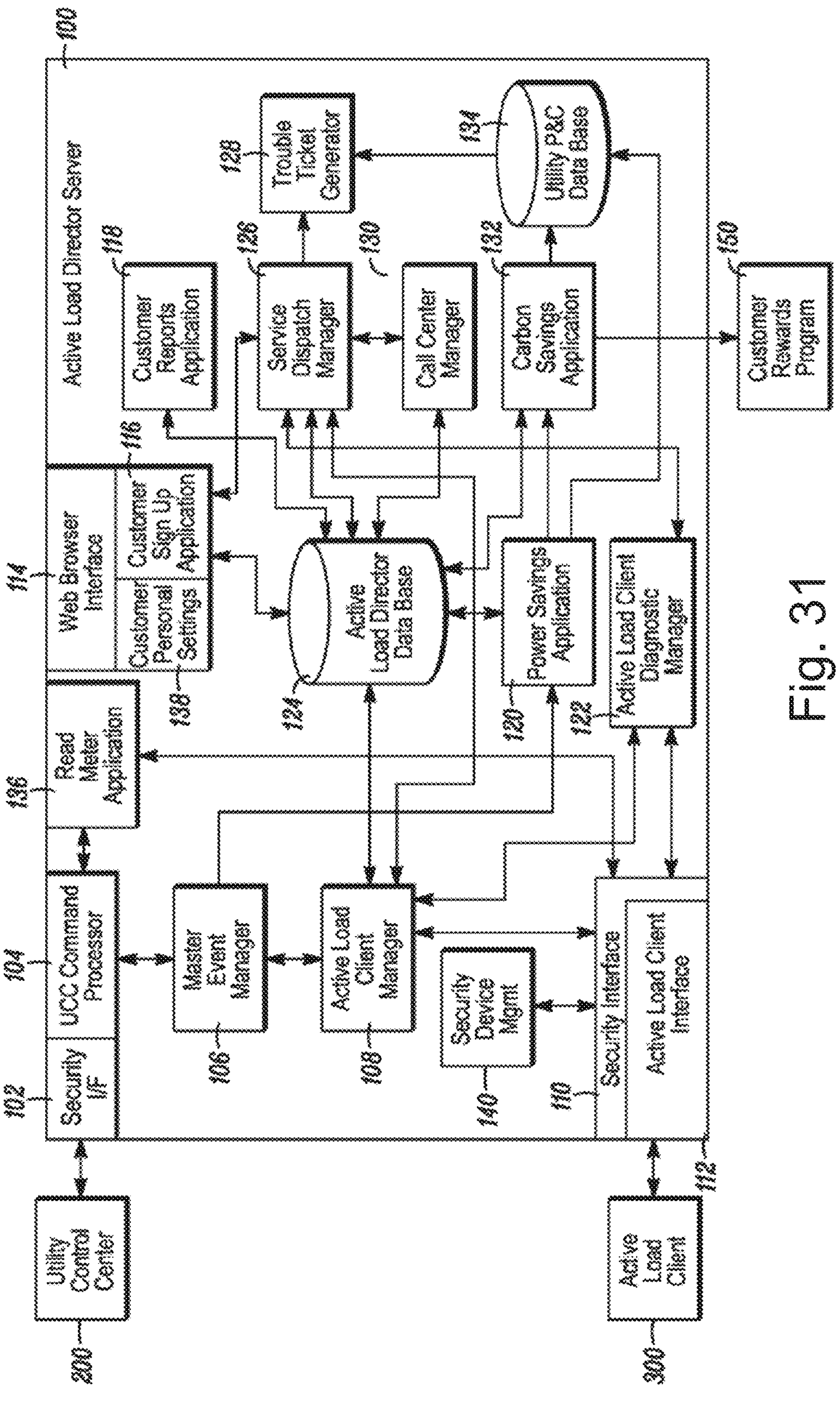
FIG. 31 provides a schematic diagram illustrating analytics for how the system and methods of the present invention provides additional operating (e.g., regulating, spinning and/or non-spinning) reserve to a power utility, market participant, grid operator, etc.
Figure 32:
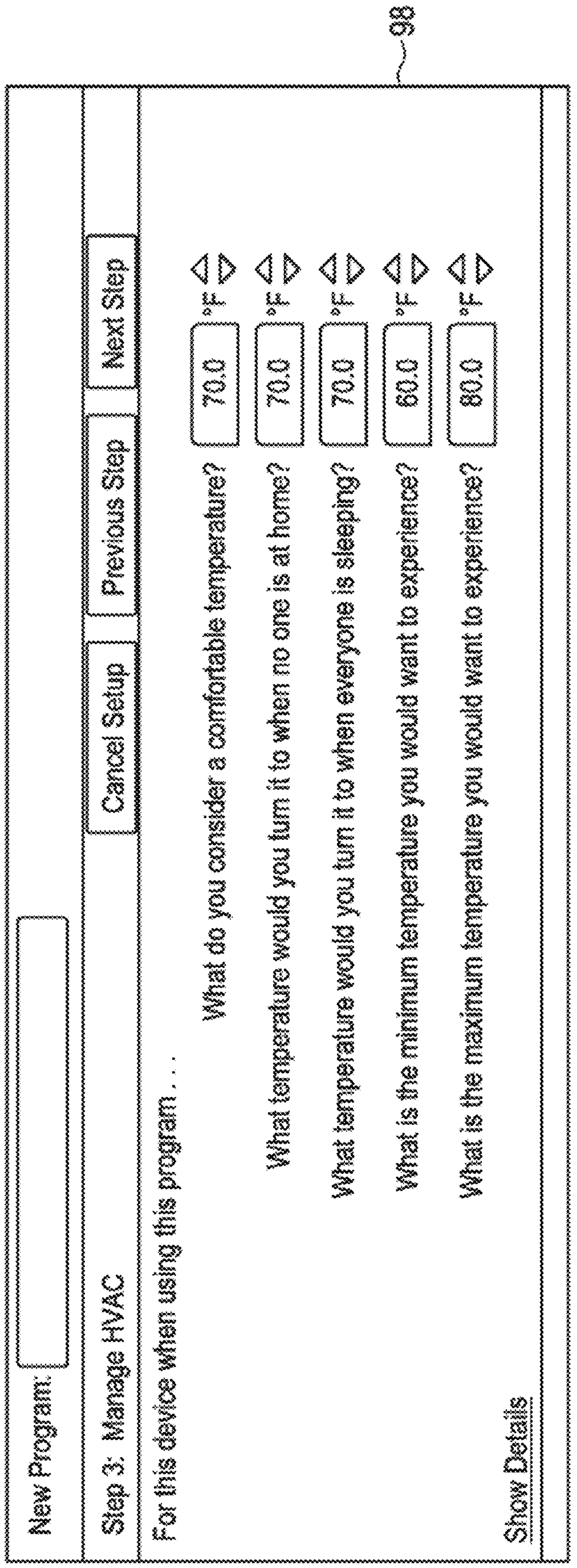
FIG. 32 illustrates a screen shot of an exemplary web browser interface through which a customer may designate his or her device performance and energy saving preferences for an environmentally-dependent, power consuming device in accordance with one embodiment of the present invention.
Figure 33:
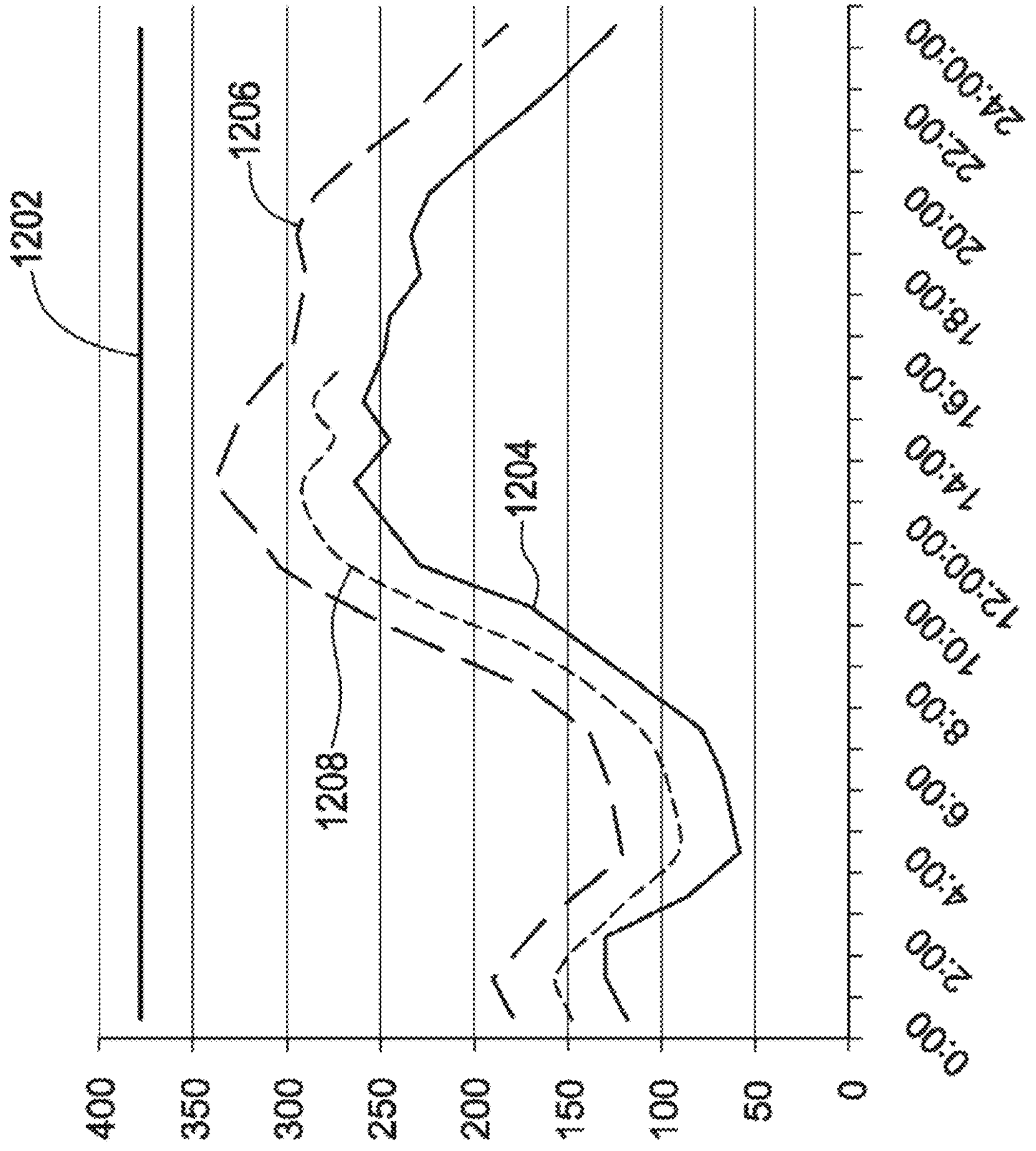
FIG. 33 is a graph that depicts a load profile of a utility during a projected time period, showing actual energy usage as well as projected energy usage determined with and without a control event, in accordance with an exemplary embodiment of the present invention.

FIG. 31 provides a schematic diagram illustrating analytics for how the system and methods of the present invention provides additional operating (e.g., regulating, spinning and/or non-spinning) reserve to a power utility, market participant, grid operator, etc. FIG. 32 illustrates a screen shot of an exemplary web browser interface through which a customer may designate his or her device performance and energy saving preferences for an environmentally-dependent, power consuming device in accordance with one embodiment of the present invention; FIG. 33 is a graph that depicts a load profile of a utility during a projected time period, showing actual energy usage as well as projected energy usage determined with and without a control event, in accordance with an exemplary embodiment of the present invention; automated computer program allows for determination of which devices for curtailment as FIG. 24 is a diagram illustrating an exemplary curve for power consuming devices within the system, wherein each device has its own curve based upon factors; and FIG. 25 illustrating generation of an exemplary sampling repository at the active load director associated with the devices and the curve of FIG. 24 to determine which buildings or homes are more energy efficient; these are better targets because they maintain conditions at curtailment longer without deterioration (e.g., heat loss, cool loss of home, etc.) power efficiency, thermodynamic efficiency, then control based upon the reserve that is being dispatched, thereby creating “bands” of operating reserves based upon prioritization within the system.

According to the present invention, PSV may be generated by methods including information relating to baselining historical load, estimating based upon curves, real-time or near-real-time value, and combinations thereof. Advantageously, the present invention provides active load management metrics, including PSV, much better than merely statistical estimate for a command as with prior art; PSV also further provides for steps of measurement and settlement. FERC requires that the settlement credits provide at point where it occurs; so then settlement information follows the transaction; most preferably, according to the present invention, settlement occurs in real time or near real time, as in financial transactions or other commodity transactions, such as for natural gas supply. Also, preferably, there is a defined interval that is accepted or acceptable by the governing entity for the electric power grid, wherein each transaction is recorded as it occurs. Furthermore, the present invention provides for IP real-time communications that provide for settlement of the curtailment by load-consuming devices at or approximate to the time of the transaction, i.e., the curtailment. Also, preferably, there is data that provides supporting evidence attached with the IP real-time communication of the acceptance of the load control event, and then automatically recorded in a settlement database. Also, some information related to this transaction and its settlement is transmitted to the energy/curtailment purchaser, and then also the seller is paid according to the PSV and/or PTB related to the curtailment event.

These Power Supply Values (PSVs) and Curves created by the consumer, the consumption habits, data mining and the thermodynamic properties of the load consuming devices and whatever these load consuming devices are attached to provide a method and apparatus such that the consumer experience is not negatively impacted and that small amounts of electric consumption can be collected from the profiles and provided to a utility, grid operator, market participant, REP or CSP and sold back to the electric grid in the form of Operating Reserves or other Demand Response/Curtailment Programs where the individual profiles when combined with a plurality of profiles created marketable Power Trading Blocks as so long as these blocks can meet the operational requirements of the grid operators/utilities and are utilized either by an processor, database, and active load intelligence that supplies the grid operator, utility with sufficient information so that the profile derived Operating Reserve can be monetized as directed by FERC Order 745 or any subsequent FERC Orders that result in curtailment/demand response to have economic value to the consumer and the utility, market participant, CSP, REP or any other entity that is authorized to aggregate and monetize curtailment and operating reserves back to the electric utility grid.

Power Trading Blocks (PTBs) are dependent upon the grid operator or ISO; there must be enough curtailment or supply for the grid operator to accept, settle, and monetize. At this time, the PTB is 100 kWatts in most electric power grids, such as a conventional utility or independent system operator or grid or microgrid operator. Generally, the power available as operating reserves is traded in larger amounts, PTB size, to be significant enough to beneficially stabilize the grid and its operating reserves. At this time, the regional trading organization or geographic-specific grid and corresponding regulations therefor, determine the PTB size, which typically requires the aggregation of load from a multiplicity of consumers, residential or commercial, to reach a minimum PTB size or PTB unit. The PTB unit, combined with the PSV, and the real-time secure communications used with ALC/ALD function to lower the size of the minimum PTB required to form a PTB unit for grid reception and settlement purposes. The commercial impact determines the minimum PTB size, which corresponds to a PTB unit, due to cost and timing of communication of the information related to the curtailment event(s) and response by the device(s), and how aggregation of load curtailment by the multiplicity of devices is managed to ensure maximum compensation to the customer(s) associated with the device(s) for the curtailment event, with minimum negative physical impact to those consumers and/or devices from the curtailment event.

Customer profiles may also be dynamic. An example of this would be the ability for a consumer (commercial or residential) to utilize real time communications from an electric utility grid, market, market participant, utility, REP, CSP or any other entity authorized on behalf of the consumer to act on their behalf to control load consuming devices owned by the consumer and connected to the electric utility grid. A consumer may receive this information through a plurality of methods utilizing IP based communications methods and web based devices such as smart phones, computers, text messages, paging messages, or even voice response units or live customer service agents. Under this real time scenario, a consumer could dynamically "Opt In" to a pre-determined customer profile or "Opt Out" or more importantly change the profile dynamically to take advantage of real time market pricing of electricity being sold by the utility, market participant, REP or any entity authorized to buy, sell and trade electric commodity or demand response products on behalf of the consumer.

Alternative methods that may also be considered is a processor based consumer profiles where multiple "what if" scenarios based upon time of use, pricing, pricing triggers, comfort and unforeseen events such as natural disasters are contemplated. Under these scenarios, the customer profile may automatically be changed by the processor/database apparatus, the end devices themselves or a "learning" algorithm whereby the consumer allows an intelligent programming "Artificial Intelligence" capability to predict and act on the consumer's behalf without any intervention by the consumer required, but with the corresponding Operating Reserves and Power Supply Values communicated in real time or near real time sufficient for the utility, REP, Market Participant, CSP or other authorized entity to act and trade these Operating Reserves created by the aggregation of the consumer profiles through the plurality of systems and apparatus' to act individually or connected and networked together to act as one resource through an energy management system or some other approved processor/database/cloud based system that can aggregate the sum of the profiles, determine the Power Supply Values, create the operating reserves via the profiles and send the appropriate command & control commands through various IP based communications methods to effect the devices, permitted through these profiles, to perform either curtailment (or consumption) to create the appropriate Operating Reserve product.

Customer Profiles are also important in the operation of the new renewable markets to include electric vehicle operations. Charging operations of electric vehicles have the potential effect of negatively impacting the operation of the electric grid by causing unpredictable peaks and distribution system stress if too many vehicles are charging simultaneously, so then billing from different charging locations but associated with a specific electric vehicle provide for settlement therefor. Furthermore, the problem of settlement of charging in foreign locations from the consumers "home" charging station has not been addressed. Consumer profiles are a very important component of this solution as the location of the EV, the cost of power at the point of a re-charging event, the remaining capacity of the on-board batteries and the ability to dispatch excess capacity to the electric grid via an Active Load Director or intelligent charging station are all components of Customer Profiles that can also be utilized for the economic advantage of both the consumer, the utility, market participant, REP or CSP. Dynamic pricing transmitted to the car via an IP message or via a "smart phone", text or through the charging station directly combined with set or dynamic profiles as previously described when aggregated with other EVs.

It should be noted that many terms and acronyms are used in this description that are well-defined in the telecommunications and computer networking industries and are well understood by persons skilled in these arts. Complete descriptions of these terms and acronyms, whether defining a telecommunications standard or protocol, can be found in readily available telecommunications standards and literature and are not described in any detail herein.

It will be appreciated that embodiments or components of the systems described herein may be comprised of one or more conventional processors and unique stored program instructions that control the one or more processors to implement, in conjunction with certain non-processor circuits, some, most, or all of the functions for managing power load distribution, and tracking and controlling individual subscriber power consumption and savings in one or more power load management systems. The non-processor circuits may include, but are not limited to, radio receivers, radio transmitters, antennas, modems, signal drivers, clock circuits, power source circuits, relays, meters, smart breakers, current sensors, and customer input devices. As such, these functions may be interpreted as steps of a method to distribute information and control signals between devices in a power load management system. Alternatively, some or all functions could be implemented by a state machine that has no stored program instructions, or in one or more application specific integrated circuits (ASICs), in which each function or some combinations of functions are implemented as custom logic. Of course, a combination of the two approaches could be used. Thus, methods and means for these functions have been described herein. Further, it is expected that one of ordinary skill in the art, notwithstanding possibly significant effort and many design choices motivated by, for example, available time, current technology, and economic considerations, when guided by the concepts and principles disclosed herein, will be readily capable of generating such software instructions, programs and integrated circuits (ICs), and appropriately arranging and functionally integrating such non-processor circuits, without undue experimentation.

Additionally, measurement, verification, settlement for the PSV for those market participants involved in the power management of the system is further included in the application of the present invention.

FIG. 34 is an example embodiment of the present invention, generally described as 1300. FIG. 34 reveals relations between the following elements:

1301 Σ N! Active Load Client or Grid Elements (GE). These are loads with ALC control devices, controlled by ALC control elements such as PCTs, building control, etc. Loads are resistive or inductive and measured by a plurality of means to revenue grade for operating reserves

1302 Public or Private IP address
1303 Static or DHCP
1304 2G/3G
1305 LTE
1306 Ethernet or TDM (TI)/EI or analog
1307 Carrier Cellsite
1308 Fiber or TDM
1309 Router
1310 TELCO or Private Network
1311 Carrier cloud that includes VPNs, private or public networks
1312 Random or static M2M or TCPIP Messaging
1313 Carrier Paging or Private network
1314 Paging/Carrier
1315 Proprietary collector (SSN)
1316 Wired from collectors
1317 Proprietary Industrial, Scientific and Medical (ISM) Network with IP Encapsulation
1318 World wide web
1319 Inbound/Outbound messages
1320 Proprietary, IP encapsulated messaging
1321 Defined Ports
1322 Carrier Network Boundary
1323 Router with Firewall
1324 Defined Ports ALD Network Boundary
1325 Analog M2M, Sync, Async, TDM, IP
1326 Note: ALC Messages were NOT defined as M2M
1327 Network Bound Firewall
1328 Balancer/Router
1329 Network Monitoring APP
1330 3rd Party Application for ALC, Device Health; Interfaces with Application
1331 Message Broker layer, for example, MQ Series (IBM). See the specification for other examples
1333 Cache or Persistence layer, including Currently Cached
1335 ALD Application layer, including Profiles, Load Available, AMI Cust/Device Info, Control, Action
1337 Middleware layer, including Currently Websphere Applications (WAS)
1339 High Performance Database, which stores All Profile data, AMI DAT Load Data, Load Profile Data, Predictive Algorithm, Data (N) Grounding, Advanced. In Application Dispatch
1341 Utility or MP
1342 Scheduled Updates
1343 Enterprise Service Bus Meter Data Management, VEE, CIS, GIS, TDSP
1344 SOA Layer
1345 Java Layer
1346 Utility GUI
1347 Secure web interfaces with authentication ΣN!, Load Available Status
1348 Consumer GUI
1349 Secure web interfaces with authentication & profiles, device status
1350 Provisioning
1351 Application layer that provisions all ALCs, devices, Control, meters, tables, registrations
1352 Provisioning, CIS Interface, Manual or Automatic
1353 Immediate or Scheduled ETL
1354 Feeds monitoring application & other
1355 Replication DB
1356 Metadata/Report Generator
1357 BI/Reports APP
1358 Settlement Info FIG. 35 is an example embodiment of an Advanced FERC 745 Load Curtailment System Level Interaction with Market Participant & Market, generally described as 1400. Furthermore, FIG. 35 reveals relationships between the following elements:

1401 Information "Bus" Published to MPs, TDSPs, Generator, SOA or Db published through proprietary Interfaces
1402 Generator
1403 Microgenerator/solar/wind
1404 Load controllers
1405 Market Participant
1406 Load acting as a resource under FERC 745 or market rules
1407 Scheduling entities, QSEs, traders, LSEs Loads/Customers and any MP or customer who is authorized to receive grid stability data, market price information
1408 Market
1409 Grid Reliability

1410 RTO/ISO/Grid OP

1411 Subsystem includes energy management system (EMS)

1412 Market Forecast

1413 Sources of information to RTO/ISO/GO/TDP/MP [1407], that impacts and ensures reliability, grid stability, FERC/NERC compliance and any information to reliably operate an electric power grid or microgrid, including, but not limited to: supply and reserves (operating); generation (macro); generation (DER); load curtailment under 745; solar/wind/storage EV under control of market participant under reliability/G.S. Rules of the grid operator, RTO, ISO; reserves (operating) responsive according to telemetry, metrology & settlement according to the rules established by FERC, NERC, ISO, etc.; one-way curtailment (DR) with limited or no response to grid operator or MP, G.O., ISO E Load, Grid stability, transmission telemetry, price, AGC, SCADA; transmission information of flows and capacities, reservations, sales, exchanges etc.; sub-station/electrical bus information necessary for reliability/G.S.; grid element information deploy according to industry-standard practices for TDSP reliability/G.S.; load information (real-time or delay); and/or LMP.

1414 Telemetry/control/settlement metrology, interval data, registers from meters, RTUS or tables or any GE needed to provide to the MP→RTO, ISO, G.O. etc., that aggregates to the market for providing reliability, grid stability, supply or LAARs to achieve settlement grade information

1415 Preparations to settlement

In the foregoing specification, the present invention has been described with reference to specific embodiments. However, one of ordinary skill in the art will appreciate that various modifications and changes may be made without departing from the spirit and scope of the present invention as set forth in the appended claims. For example, the present invention is applicable for managing the distribution of power from utility companies to subscribing customers using any number of IP-based or other communication methods.

Additionally, the functions of specific modules within the ALD server 100 and/or active load client 300 may be performed by one or more equivalent means. Accordingly, the specification and drawings are to be regarded in an illustrative rather than a restrictive sense, and all such modifications are intended to be included within the scope of the present invention.

Benefits, other advantages, and solutions to problems have been described above with regard to specific embodiments of the present invention. However, the benefits, advantages, solutions to problems, and any element(s) that may cause or result in such benefits, advantages, or solutions to become more pronounced are not to be construed as a critical, required, or essential feature or element of any or all the claims. The invention is defined solely by the appended claims including any amendments made during the pendency of this application and all equivalents of those claims as issued.

Certain modifications and improvements will occur to those skilled in the art upon a reading of the foregoing description. The above-mentioned examples are provided to serve the purpose of clarifying the aspects of the invention and it will be apparent to one skilled in the art that they do not serve to limit the scope of the invention. All modifications and improvements have been deleted herein for the sake of conciseness and readability but are properly within the scope of the present invention.

The invention claimed is:

1. A system for managing power on an electric power grid, the system comprising:

at least one active load client associated with a respective at least one service point and configured to transmit at least one power reduction command to at least one power consuming device in response to power reduction messages; and at least one server configured to:

send the power reduction messages to the at least one active load client based on market participant dispatch commands;

based on information associated with the at least one service point, including charge status, set points, and/or customer preferences, generate a charging profile for the at least one service point;

based at least in part on the charging profile for the at least one service point, generate a value for the at least one power consuming device and/or the at least one active load client;

aggregate the value for the at least one power consuming device and/or the at least one active load client into at least one Power Trade Block (PTB) unit able to be sold on an energy settlement marketplace, with a clearing price based on a geodetic location of the at least one service point where the value is generated;

receive a request for a respective amount of at least one type of operating reserves; and send the at least one power reduction message to the at least one active load client, causing the at least one active load client to transmit the at least one power reduction command to the at least one power consuming device based on the request for the respective amount of the at least one type of operating reserves, wherein the value is utilized as contingency reserves for a power utility and/or grid operator, and wherein the at least one power reduction command is configured to cause the at least one power consuming device to curtail power consumption in near real time.

2. The system of claim 1, wherein the at least one server is further configured to generate at least one consumer profile associated with the at least one active load client via interaction with at least one user application, wherein the customer preferences are included in the at least one consumer profile.

3. The system of claim 1, wherein the at least one server is further configured to provide energy financial settlements based on the value for the at least one power consuming device and/or the at least one active load client.

4. The system of claim 1, wherein the market participant dispatch commands are directed to individual power consuming devices or for individual service points.

5. The system of claim 1, wherein the at least one server comprises at least one database configured to store the charge status, the set points, and/or the customer preferences.

6. The system of claim 1, wherein the at least one active load client comprises at least one electric vehicle charging station.

7. The system of claim 1, wherein the value is confirmed by at least one meter data management system.

8. The system of claim 1, wherein the power reduction messages comprise an amount of power to be reduced.

9. A system for managing power on an electric power grid, comprising:

at least one server configured to:

send power reduction messages to at least one active load client associated with at least one service point based on market participant dispatch commands;

based on information associated with the at least one service point, including charge status, set points, and/or customer preferences, generate a charging profile for the at least one service point;

based at least in part on the charging profile, generate a value;

aggregate the value for the at least one power consuming device into at least one Power Trade Block (PTB) unit able to be sold on an energy settlement marketplace, with a clearing price based on a geodetic location of the at least one service point where the value is generated;

receive a request for a respective amount of at least one type of operating reserves;

determine when and to which of the at least one power consuming device to send at least one power reduction command based on the requested amount of the at least one type of operating reserves; and send at least one power reduction message to at least one active load client based on the request for the respective amount of the at least one type of operating reserves, wherein the at least one power consuming device includes at least one electric vehicle;

wherein, in response to the power reduction messages, the at least one active load client transmits at least one power reduction command to the at least one power consuming device;

wherein the at least one power reduction command causes the at least one power consuming device to curtail power consumption in near real time; and wherein the value is utilized as contingency reserves for a power utility and/or grid operator.

10. The system of claim 9, wherein the at least one server generates at least one consumer profile associated with the at least one active load client via interaction with at least one user application, and wherein the customer preferences are included in the at least one consumer profile.

11. The system of claim 9, wherein the at least one active load client communicates with the at least one server via a WI-FI network and/or an ethernet network.

12. The system of claim 9, wherein the market participant dispatch commands are directed to individual power consuming devices or for individual service points.

13. The system of claim 9, wherein the value is confirmed by at least one meter data management system.

14. The system of claim 9, wherein the at least one active load client includes at least one electric vehicle charging station.

15. The system of claim 9, wherein the power reduction messages include an amount of power to be reduced.

16. The system of claim 9, wherein the at least one server includes at least one database configured to store the charge status, the set points, and/or the customer preferences.

17. A method for managing power on an electric power grid, the method comprising:

based on market participant dispatch commands, at least one server sending power reduction messages to at least one active load client associated with a respective at least one service point and at least one power consuming device;

based on information associated with the at least one service point, including charge status, set points, and/or customer preferences, the at least one server generating a charging profile for the at least one service point;

based at least in part on the charging profile, the at least one server generating a value for at least one device located at the at least one service point;

the at least one server aggregating the value for the at least one device located at the at least one service point into at least one Power Trade Block (PTB) unit able to be sold on an energy settlement marketplace, with a clearing price based on a geodetic location of the at least one service point where the value is generated;

the at least one server receiving a request for a respective amount of at least one type of operating reserves;

based on the request for the respective amount of the at least one type of operating reserves, the at least one server sending the at least one power reduction command to the at least one power consuming device to cause the at least one power consuming device to curtail power consumption in near real time; and utilizing the value as contingency reserves for a power utility and/or grid operator.

18. The method of claim 17, further comprising the at least one server generating at least one consumer profile associated with the at least one active load client via interaction with at least one user application, wherein the customer preferences are included in the at least one consumer profile.

19. The method of claim 17, further comprising the at least one server communicating with the at least one active load client via a WI-FI network and/or an ethernet network.

20. The method of claim 17, wherein the at least one active load client includes at least one electric vehicle charging station.

* * * * *